(12) United States Patent
Leventis et al.

(10) Patent No.: US 10,822,466 B2
(45) Date of Patent: Nov. 3, 2020

(54) POROUS POLYURETHANE NETWORKS AND METHODS OF PREPARATION

(71) Applicant: Aerogel Technologies, LLC, Glendale, WI (US)

(72) Inventors: Nicholas Leventis, Rolla, MO (US); Chariklia Sotiriou-Leventis, Rolla, MO (US); Chakkaravarthy Chidambareswarapattar, Rolla, MO (US)

(73) Assignee: Aerogel Technologies, LLC, Boston, MA (US)

( * ) Notice: Subject to any disclaimer, the term of this patent is extended or adjusted under 35 U.S.C. 154(b) by 12 days.

(21) Appl. No.: 16/220,091

(22) Filed: Dec. 14, 2018

(65) Prior Publication Data

US 2019/0359787 A1 Nov. 28, 2019

Related U.S. Application Data

(63) Continuation of application No. 15/727,301, filed on Oct. 6, 2017, now abandoned, which is a continuation
(Continued)

(51) Int. Cl.
 *C08J 9/28* (2006.01)
 *B01J 20/20* (2006.01)
 (Continued)

(52) U.S. Cl.
 CPC ............ *C08J 9/286* (2013.01); *B01J 20/20* (2013.01); *B01J 20/267* (2013.01);
 (Continued)

(58) Field of Classification Search
 CPC .................... C08J 9/286; C08J 2205/026; C08J 2205/042; C08J 2375/04; C08J 2201/04;
 (Continued)

(56) References Cited

U.S. PATENT DOCUMENTS

| 5,302,634 A | 4/1994 | Mushovic |
| 5,484,818 A | 1/1996 | De Vos et al. |

(Continued)

OTHER PUBLICATIONS

Biesmans et al., Polyurethane based organic aerogels and their transformation into carbon aerogels. J Non-Cryst Solids. Apr. 1998; 225:64-68. Doi: 10.1016/S0022-3093(98)00010-6.
(Continued)

*Primary Examiner* — Michael C Miggins
(74) *Attorney, Agent, or Firm* — Wolf, Greenfield & Sacks, P.C.

(57) ABSTRACT

Nanoporous three-dimensional networks of polyurethane particles, e.g., polyurethane aerogels, and methods of preparation are presented herein. Such nanoporous networks may include polyurethane particles made up of linked polyisocyanate and polyol monomers. In some cases, greater than about 95% of the linkages between the polyisocyanate monomers and the polyol monomers are urethane linkages. To prepare such networks, a mixture including polyisocyanate monomers (e.g., diisocyanates, triisocyanates), polyol monomers (diols, triols), and a solvent is provided. The polyisocyanate and polyol monomers may be aliphatic or aromatic. A polyurethane catalyst is added to the mixture causing formation of linkages between the polyisocyanate monomers and the polyol monomers. Phase separation of particles from the reaction medium can be controlled to enable formation of polyurethane networks with desirable nanomorphologies, specific surface area, and mechanical properties. Various properties of such networks of polyurethane particles (e.g., strength, stiffness, flexibility, thermal conductivity) may be tailored depending on which monomers are provided in the reaction.

6 Claims, 21 Drawing Sheets

Related U.S. Application Data of application No. 14/554,477, filed on Nov. 26, 2014, now Pat. No. 9,809,694, which is a continuation of application No. 13/687,990, filed on Nov. 28, 2012, now Pat. No. 8,927,079.

(51) Int. Cl.

| | |
|---|---|
| *B01J 20/26* | (2006.01) |
| *B01J 20/30* | (2006.01) |
| *B01J 20/28* | (2006.01) |
| *C08G 18/76* | (2006.01) |
| *C08G 18/79* | (2006.01) |
| *C08G 18/32* | (2006.01) |
| *C08G 18/38* | (2006.01) |
| *C04B 38/00* | (2006.01) |
| *C08G 18/06* | (2006.01) |
| *C08G 18/78* | (2006.01) |
| *C01B 32/00* | (2017.01) |
| *C01B 32/05* | (2017.01) |
| *C08G 101/00* | (2006.01) |

(52) U.S. Cl.
CPC ... *B01J 20/28011* (2013.01); *B01J 20/28042* (2013.01); *B01J 20/28047* (2013.01); *B01J 20/28057* (2013.01); *B01J 20/28078* (2013.01); *B01J 20/3078* (2013.01); *C01B 32/00* (2017.08); *C01B 32/05* (2017.08); *C04B 38/0032* (2013.01); *C08G 18/06* (2013.01); *C08G 18/3215* (2013.01); *C08G 18/3872* (2013.01); *C08G 18/7657* (2013.01); *C08G 18/7664* (2013.01); *C08G 18/7893* (2013.01); *C08G 18/792* (2013.01); *C08G 2101/0091* (2013.01); *C08J 2201/04* (2013.01); *C08J 2201/0502* (2013.01); *C08J 2205/026* (2013.01); *C08J 2205/042* (2013.01); *C08J 2375/04* (2013.01); *Y10T 428/1376* (2015.01); *Y10T 428/21* (2015.01); *Y10T 428/24149* (2015.01); *Y10T 428/249953* (2015.04); *Y10T 428/249978* (2015.04); *Y10T 428/249986* (2015.04); *Y10T 428/2982* (2015.01); *Y10T 428/31547* (2015.04)

(58) Field of Classification Search
CPC .. C08J 2201/0502; B01J 20/20; B01J 20/267; B01J 20/3078; B01J 20/28057; B01J 20/28042; B01J 20/28078; B01J 20/28047; B01J 20/28011; C08G 18/7657; C08G 18/792; C08G 18/3215; C08G 18/3872; C08G 18/06; C08G 18/7664; C08G 18/7893; C08G 2101/0091; C04B 38/0032; C01B 32/00; C01B 32/05; Y10T 428/1376; Y10T 428/2982; Y10T 428/21; Y10T 428/24149; Y10T 428/249978; Y10T 428/249986; Y10T 428/249953; Y10T 428/31547

See application file for complete search history.

(56) References Cited

U.S. PATENT DOCUMENTS

| | | |
|---|---|---|
| 5,869,545 A | 2/1999 | Biesmans et al. |
| 5,942,553 A | 8/1999 | Biesmans et al. |
| 5,990,184 A | 11/1999 | Biesmans |
| 8,067,480 B2 | 11/2011 | Schmidt et al. |
| 8,927,079 B2 | 1/2015 | Leventis et al. |
| 9,809,694 B2 | 11/2017 | Leventis et al. |
| 2015/0267026 A1 | 9/2015 | Leventis et al. |
| 2018/0251623 A1 | 9/2018 | Leventis et al. |

OTHER PUBLICATIONS

Biesmans et al., Polyurethane-based organic aerogels' thermal performance. J Non-Cryst Solids. Apr. 1998; 225:36-40. Doi: 10.1016/S0022-3093(98)00103-3.

Chidambareswarapattar et al., Fractal Multiscale Nanoporous Polyurethanes: Flexible to Extremely Rigid Aerogels from Multifunctional Small Molecules. Chemistry of Materials. 2013;25(15):3205-24.

Yang et al., Hollow carbon nanospheres prepared by carbonizing polymethylmethacrylate/polyacrylonitrile core/shell polymer particles. New Carbon Materials. 2008;23(3):205-8.

Triisocyanates

TIPM        N3300A

Triols

HPE        POL

Diols

RES        SDP

BPA        DHB

POROUS POLYURETHANE NETWORKS AND METHODS OF PREPARATION

RELATED APPLICATIONS

This application is a continuation of U.S. application Ser. No. 15/727,301, filed Oct. 6, 2017, which is a continuation of U.S. application Ser. No. 14/554,477 (now U.S. Pat. No. 9,809,694), filed Nov. 26, 2014, which is a continuation of U.S. application Ser. No. 13/687,990 (now U.S. Pat. No. 8,927,079), filed Nov. 28, 2012, each of which is incorporated herein by reference in its entirety for all purposes.

FEDERALLY SPONSORED RESEARCH

Research leading to various aspects of embodiments presented herein were sponsored, at least in part, by the National Science Foundation under Grant No. CHE-0809562 and the Army Research Office under Grant No. W911NF-10-1-0476. The United States Government may have certain rights in the invention.

BACKGROUND

1. Field

Aspects herein relate to porous three-dimensional networks of polyurethane, uses thereof, and methods of preparation. For example, the porous networks of polyurethane may include a polyurethane aerogel material.

2. Discussion of Related Art

Aerogels are three-dimensional assemblies of nanoscale, nanostructured, or nanofeatured particles that are highly porous materials exhibiting ultra-low densities. Aerogel materials are typically produced by forming a gel containing a liquid component and a porous solid component and removing the liquid by supercritically or subcritically drying the wet gel to leave behind the porous solid. Supercritical drying involves the solvent being transformed into a vapor above its critical point and allowing the vapor to escape in a way that leaves the porous solid structure intact.

The large internal void space in aerogels generally provides for a material with low dielectric constant, low thermal conductivity, and high acoustic impedance. Aerogels have been considered for a number of applications including thermal insulation, lightweight structures, and impact resistance.

SUMMARY

The inventors have recognized that previous methods of preparing three-dimensional porous polyurethane networks (e.g., polyurethane aerogels) resulted in mechanically weak networks having undesirably large pores and low surface areas. Such methods were unable to form a gel network in which a substantial portion of the linkages between isocyanate and hydroxyl groups of the constituent monomers or oligomers are urethane linkages. Such methods were also generally unable to control early phase separation of nanoparticles from the solvent solution to form a gel network with a high surface area. Furthermore, previous methods were unable to control the density of reactive surface functional groups on the nanoparticles to form strong interparticle connections and thus form a network with strong mechanical properties. Accordingly, the inventors have developed methods of preparing a high-surface-area (e.g., greater than about 100 $m^2/g$, greater than about 200 $m^2/g$, between about 100 $m^2/g$ and about 500 $m^2/g$) mechanically robust three-dimensional porous polyurethane network where linkages between monomers of the network are primarily urethane linkages.

Porous polyurethane networks may include polyurethane particles made up of linked polyisocyanate and polyol monomers. In some embodiments, more than about 95% of the linkages between the polyisocyanate monomers and the polyol monomers are urethane linkages. Porous polyurethane networks in accordance with the present disclosure may also have a mean pore diameter of less than about 35 nm. Further, the particles of the porous polyurethane network may have a mean diameter of less than about 30 nm. In some embodiments, the porous polyurethane networks may have a mean pore diameter of less than about 20 nm (e.g., between about 5 nm and about 20 nm), and particles comprising the polyurethane network may have a mean diameter of less than about 10 nm (e.g., between about 1 nm and about 10 nm).

To prepare such networks, a mixture including polyisocyanate monomers (e.g., diisocyanates, triisocyanates), polyol monomers (e.g., diols, triols), and a solvent may be provided. The polyisocyanate and polyol monomers may be aliphatic or aromatic. A polyurethane catalyst is added to the mixture causing formation of linkages between the polyisocyanate monomers and the polyol monomers. The catalyst may also facilitate phase separation of polyurethane particles (e.g., having a mean diameter of less than about 50 nm) from the reaction solution. Various properties of such networks of polyurethane particles (e.g., strength, stiffness, flexibility, morphology, thermal conductivity, surface area), and combinations thereof, may be suitably tailored depending on which monomers are provided in the reaction. Various porous solid-phase three-dimensional networks of polyurethane particles presented herein may be aerogels, as are known in the art.

In an embodiment, a composition comprising a porous solid-phase three-dimensional network of polyurethane particles is provided. The particles comprise linked polyisocyanate and polyol monomers, wherein greater than about 95% of linkages between the polyisocyanate and polyol monomers are urethane linkages.

In another embodiment, a method for preparing a porous solid-phase three-dimensional network of polyurethane particles is provided. The method includes providing a mixture including polyisocyanate monomers, polyol monomers, and a solvent; adding a polyurethane catalyst to the mixture causing formation of linkages between the polyisocyanate monomers and the polyol monomers; and forming a gel material comprising the linked polyisocyanate and polyol monomers, wherein greater than about 95% of the linkages between the polyisocyanate monomers and the polyol monomers are urethane linkages.

Advantages, novel features, and objects of the invention will become apparent from the following detailed description of the invention when considered in conjunction with the accompanying drawings, which are schematic and which are not intended to be drawn to scale. For purposes of clarity, not every component is labeled in every figure, nor is every component of each embodiment of the invention shown where illustration is not necessary to allow those of ordinary skill in the art to understand the invention.

BRIEF DESCRIPTION OF THE DRAWINGS

Various embodiments of the present disclosure will now be described, by way of example, with reference to the accompanying figures, in which.

DETAILED DESCRIPTION

Figure 1:
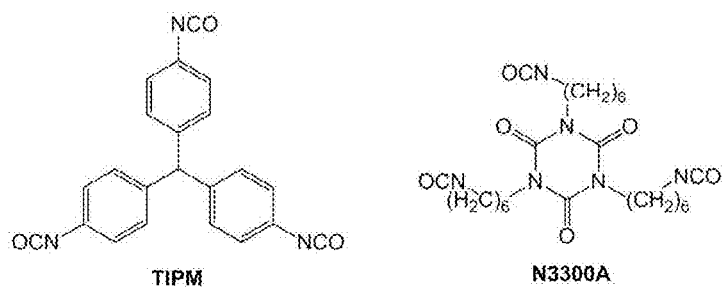
FIG. 1 depicts various monomers for forming a polyurethane network in accordance with some embodiments.
Figure 1:
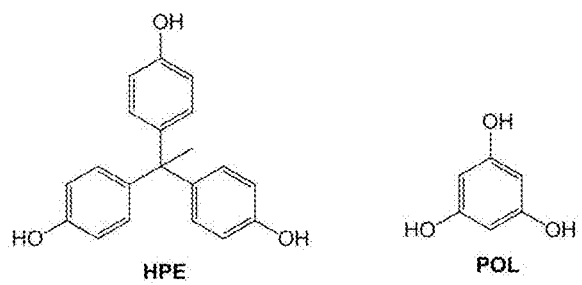
Figure 1:
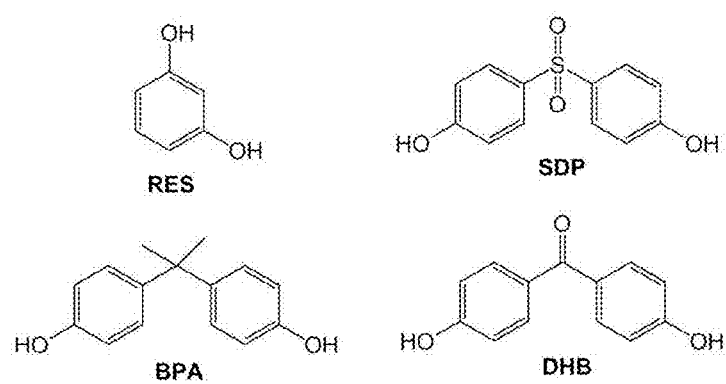

Aerogels are a diverse class of low-density nanoporous solid materials comprised of three-dimensional assemblies of nanostructured elements that combine a plurality of disparate and extreme materials properties into a single material envelope. Silica aerogels, for example, combine ultralow thermal conductivity (as low as 15 mW m$^{-1}$ K$^{-1}$) with extremely low density (as low as 0.001 g cm$^{-3}$), high specific surface area (500-1500 m$^2$ g$^{-1}$), low dielectric constant (as low as 1.02), and optical transparency. While aerogels may be used for high-performance thermal insulation applications, numerous other materials properties benefits of aerogel architectures make them valuable for applications requiring lightweight structural components, high-surface-area electrodes, impact dampening, and high-definition surface functionality. While the term "aerogel" has often been used to refer specifically to silica aerogels, aerogels are not limited in composition to any one particular substance and can in fact be comprised of numerous different substances including metal and metalloid oxides, non-oxide ceramics, carbon, nanoparticles and nanostructures, and organic polymers.

Most materials that are considered aerogels generally exhibit a minimum of ~50% porosity and possess primarily mesoporous pore networks (i.e., pores 2-50 nm in diameter). However, other porous networks with less than ~50% porosity and/or substantial populations of pore diameters outside of what is typically considered mesoporous also offer many of the materials properties advantages of aerogels and can provide additional advantages such as enhanced mechanical properties and improved mass transport through their pore networks over aerogel media. Thus porous solid networks in general, and nanostructured porous polymer networks in particular, are also potentially valuable materials for thermal insulation, lightweight structural materials, and impact dampening applications.

Historically, most aerogel materials and related nanostructured porous networks have been impractically brittle for industrial applications due to poor fracture toughness and relatively low compressive strength. However, it has been found that the mechanical properties of silica and other oxide-based aerogels can be improved dramatically via post-gelation crosslinking of the skeletal nanoparticles of the aerogel framework with isocyanate-derived polyureas (so-called "x-aerogels"). Such work demonstrates that the nanomorphology and interparticle connectivity of the aerogel architecture dictates the macroscopic mechanical properties of the resulting material. Further, aerogels have been developed with nanoarchitectures similar to polymer-crosslinked inorganic aerogels but based on pure polymers instead and exhibit similar enhanced mass-normalized mechanical properties. Examples of such materials include strong polymeric aerogels based on polyimides, polyureas, polyamides (aramids), and acrylic aerogels synthesized using emulsion polymerization.

In accordance with aspects presented herein, mechanical properties and other characteristics of aerogels and porous networks may be engineered by invoking high-definition nanostructured polymer architectures, depending on the structure of the monomers and nanostructured particles involved in the formation of the precursor gel network. When forming porous polyurethane networks (e.g., polyurethane aerogels), crosslinking at the molecular level may induce early phase separation of active primary particles that link together into a network of higher aggregates, which can be subsequently dried into aerogels and other dry porous networks. In other words, early phase separation yields generally smaller particles, with higher densities of surface functional group per unit volume, leading to more interparticle bonds and thus more robust 3D networks.

Compositions and methods described herein provide for the production of a wide variety of attractive multifunctional true-polyurethane aerogels (i.e., polyurethane aerogels where linkages between monomers in the network are primarily urethane linkages) that can combine one or more of high flexibility, high mass-normalized stiffness, high mass-normalized compressive strength, high specific energy absorption, low speed of sound, and low thermal conductivity in a single material. Further, polyurethane aerogels based on aromatic isocyanates can be converted to carbon aerogels with conversion yields up to ~50% w/w. By tailoring the density, modulus, and nanomorphology of the precursor polyurethane aerogel used, carbon aerogels with properties and morphologies not easily attained with other precursors can be prepared.

Polyurethanes provide a versatile polymeric system useful for applications including foams, elastomers, fibers, sealants, adhesives, and coatings. Polyurethanes are the reaction product of isocyanates and polyols and their properties can be tailored by varying the chemical identity of the reagents with chain extenders and/or crosslinkers.

Polyurethane (PU) foams in particular are well established for use as thermal insulation. Since aerogels themselves are also highly desirable for thermal insulation, PU aerogels are a natural area of interest. While previous reports describing so-called "polyurethane aerogels" exist, aerogels based primarily on urethane linkages between isocyanate and polyol monomers, as opposed to a mixture of urethane, urea, amide, biuret, etc. linkages (such mixtures referred to herein as "PU-containing") have not been previously reported. For example, >95%, >98%, >99%, >99.9% of the linkages between isocyanate and polyol monomers of polyurethane aerogels described herein may be urethane linkages.

PU-containing aerogels were first reported without chemical evidence by Biesmans et al., who used Suprasec DNR (an aromatic oligomeric isocyanate) with 1,4-diazabicyclo[2.2.2]octane (DABCO) as a catalyst. At 0.21 g cm$^3$, the resultant materials possessed exceptionally low thermal conductivity values (0.0085 W m$^{-1}$ K$^{-1}$ for evacuated and 0.015 W m$^{-1}$ K$^{-1}$ for air-filled samples) and were carbonizable with ~40% w/w yield upon pyrolysis under inert atmosphere. Silica-polyurethane hybrid aerogels reported by Yim et al. showed a thermal conductivity of 0.0184 W m$^{-1}$ K$^{-1}$ at 1 torr for a material with a bulk density of 0.07 g cm$^{-3}$. However, this approach has not been found to provide the mechanical strength advantages of x-aerogels or strong polymer aerogels. Rigacci et al. produced PU-containing aerogels with an emphasis on thermal superinsulation applications, synthesizing materials from the diisocyanate Lupranat M20S (4,4-methylenebis(phenylisocyanate)) and two aliphatic polyols, saccharose and pentaerythritol, using DABCO as catalyst in DMSO/ethyl acetate mixtures. This approach produces linkages other than urethane and relies on oligomerization of the diisocyanate with DABCO. Both supercritical and subcritical drying routes were used and the resultant materials were compared in terms of bulk density, pore volume, and thermal conductivity, revealing that the thermal conductivity of the latter was less than that of standard polyurethane foam (0.022 versus 0.030 W m$^{-1}$ K$^{-1}$ at room temperature and atmospheric pressure). In general, they found the morphology of the resulting dried materials depends on the solubility of the precursors as well as the solubility parameter ($\delta_m$) of the reaction medium. If $\delta_m$ was smaller than the solubility parameter of PU ($\delta_{PU}$), the system formed aggregates of micron-sized particles; if $\delta_m > \delta_{PU}$ smaller sized particles and mesoporous structures were reported. Lee et al. synthesized PU-containing aerogels from methylene diphenyl diisocyanates (MDI) and polyether polyol (Multranol 9185) using triethylamine (TEA) as a catalyst and compared these aerogels with polyurea aerogels synthesized from MDI or poly(MDI) with polyamines. The PU-containing aerogels exhibited a specific surface area of 47 m$^2$ g$^{-1}$ with an average pore diameter of 13 nm and a thermal conductivity of 27 mW m$^{-1}$K$^{-1}$. This approach relied on oligomeric species as opposed to small-molecule monomers, however, and the chemical identity of these aerogels is not primarily polyurethane, though, since tertiary amines are also catalysts for the reaction of water with isocyanates, which gives polyurea. In general, previous studies have lacked structure-property relationships and methods that enable synthesis of true-PU aerogels and nanostructured porous networks with desirable mechanical properties and high specific surface areas in addition to low thermal conductivities and other valued properties.

Accordingly, previous PU-containing aerogel production processes adopt bulk polyurethane polymer synthetic routes and use either oligomeric isocyanates or high molecular weight ($M_w$) polyols that may result in compositions with a substantial percent (>5%, >10%, >15%, >20%, >25%, >50%, >99%) non-urethane linkages between monomers. While there may be some process advantages in working with industrial polyurethane approaches to prepare PU-containing aerogels, there are also three distinct disadvantages from a bottom-up perspective: (a) oligomeric reagents such as those used in previous works lead to give more soluble products which in turn delays phase separation and thereby yields larger particles, (b) surface-to-volume ratio of materials produced through these approaches is relatively low, resulting in low-surface-area (<25 m$^2$ g$^{-1}$, <50 m$^2$ g$^{-1}$, <100 m$^2$ g$^{-1}$) aerogels, and, (c) oligomeric starting materials used in these approaches in general result in low functional group densities on the surface of phase-separated nanoparticles thus limiting interparticle crosslinking and thereby resulting in aerogels with generally poor mechanical properties.

Aspects of the present disclosure generally relate to nanostructured polyurethane networks comprising primarily urethane linkages between monomers including, but not limited to, true polyurethane aerogels. Such polyurethane networks may be synthesized from small molecule monomers, such as those described further below. Certain characteristics of the polyurethane network will vary depending on the type of monomers used in the reaction resulting in formation of the polyurethane network. For instance, mechanical properties of the polyurethane network may be correlated with monomer rigidity and functionality, giving rise to structure-property relationships.

Three-dimensional porous nanostructured polyurethane networks (e.g., polyurethane aerogels) and methods for preparing them are described herein. Polyurethane networks of the present disclosure generally comprise a network of interconnected particles. In some embodiments, isocyanate and alcohol monomers react to form urethane linkages, resulting in a particle (a polyurethane particle). Particles may also comprise oligomers and other non-monomeric species.

In some embodiments, polyurethane particles may agglomerate and form urethane linkages between each other, in turn forming larger particles or aggregates. In some embodiments, polyurethane aerogels are produced that exhibit a hierarchy of particle sizes including primary and secondary particles. As such, primary particles may be smaller than secondary particles and may interconnect with other primary particles or monomers to form secondary particles.

In some embodiments, primary particles may exhibit characteristic dimensions (e.g., diameter) greater than about 1 nm, 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 150 nm. For example, primary particles may exhibit characteristic dimensions of between about 1 nm and about 150 nm, between about 10 nm and about 100 nm, between about 20 nm and about 90 nm, or between about 30 nm and about 80 nm. In some cases, secondary particles may be comprised of primary particles, and thus may be larger than primary particles, and may have characteristic dimensions (e.g., diameter) greater than about 1 nm, 5 nm, 10 nm, 15 nm, 20 nm, 25 nm, 30 nm, 35 nm, 40 nm, 45 nm, 50 nm, 55 nm, 60 nm, 65 nm, 70 nm, 75 nm, 80 nm, 85 nm, 90 nm, 95 nm, 100 nm, 150 nm, 200 nm, 300 nm, 400 nm, 500 nm, 1 µm, 10 µm. For example, secondary particles may exhibit characteristic dimensions of between about 1 nm and about 200 nm, between about 10 nm and about 300 nm, between about 100 nm and about 500 nm, between about 500 nm and about 1 µm, or between about 1 µm and about 10 µm.

One with ordinary skill in the art would be able to determine differences between primary particles and secondary particles based on the hierarchical nature of a polyurethane network using techniques including but not limited to gas sorption analysis, small-angle X-ray scattering (SAXS), scanning electron microscopy (SEM), and transmission electron microscopy (TEM). As such, secondary particles generally comprise a plurality of primary particles and are therefore not only comprised of constituent subparticles but also exhibit a larger mean diameter than primary particles in a given composition. Based on morphology and particle size distributions, one of skill in the art would be able to identify primary particles and secondary particles in a polyurethane network. Polyurethane networks are not limited to that presented herein.

In preparing nanoporous polyurethane networks described herein, a number of appropriate monomers may be used. In some embodiments, each of the monomers to be incorporated into the nanoporous polyurethane network may be aromatic; although, some of the monomers to be used in forming the nanoporous polyurethane network may be aliphatic. The monomers used to prepare the nanoporous polyurethane networks may include a suitable combination of polyisocyanates and polyols.

Porous solid-phase three-dimensional networks of polyurethane particles may be prepared by mixing a polyisocyanate (e.g., a triisocyanate, a diisocyanate) and a polyol (e.g., a diol, a triol) in a solvent as a reaction mixture. A polyisocyanate is a chemical compound containing a number of isocyanate functional groups (e.g., a diisocyanate has two isocyanate groups, a triisocyanate has three isocyanate groups, etc.). A polyol is a chemical compound containing a number of hydroxyl functional groups (e.g., a diol has two hydroxyl groups, a triol has three hydroxyl groups, etc.). The functional groups of the polyisocyanates or polyols are positioned in such a manner where linkages may be formed with other functional groups. For instance, an isocyanate group of a polyisocyanate monomer may form a urethane linkage with a hydroxyl group of a polyol. The polyol may have an aromatic or an aliphatic molecular structure, or contain both aromatic and aliphatic components. The polyisocyanate may also be aliphatic and/or aromatic, or contain both aromatic and aliphatic components.

FIG. 1 shows a number of examples of suitable monomers that may be used with varying degrees of concentration for preparing a nanoporous polyurethane network. While polyisocyanates and polyols are only shown to have isocyanate and hydroxyl functional groups, respectively, it can be appreciated that monomers having an appropriate combination of different types of functional groups may also be used. Similarly, it can be appreciated than any suitable polyisocyanate or polyol monomer may be used. In the context of the present disclosure, small-molecule monomers may include molecules with less than 10 repeating subunits, e.g., a disaccharide a trisaccharide.

As discussed, in the preferred embodiments, the isocyanate may be trifunctional, although difunctional and other polyfunctional isocyanates may also be used. In some embodiments, an aromatic isocyanate monomer such as Desmodur RE (tris(isocyanatophenyl)methane, TIPM) or an aliphatic monomer such as Desmodur N3300A (N3300A) may be used. The functionality (i.e., number of reactive groups per molecule) and the molecular size and shape of the alcohols used may also be varied. Polyisocyanate monomers used to prepare the nanoporous polyurethane networks may have multiple functional groups, e.g., isocyanates or other suitable functional groups.

As also discussed, polyol monomers used to prepare the nanoporous polyurethane networks may also have multiple exposed functional groups, e.g., hydroxyl groups or other suitable functional groups. For instance, suitable monomers may include triols, which have three exposed hydroxyl functional groups, and diols, which have two exposed hydroxyl functional groups. In some embodiments, aromatic alcohols that are used as monomers may have different numbers of hydroxyl groups per aromatic ring. In preferred embodiments, aromatic alcohols may be used, however non-aromatic alcohols may also be used. In some embodiments, suitable aromatic triols include tris(hydroxyphenyl) ethane (HPE) and 1,3,5-trihydroxybenzene (phloroglucinol, POL). Suitable aromatic diols include 1,3-dihydroxybenzene (resorcinol, RES), sulfonyldiphenol (SDP), 2,2-Bis(4-hydroxyphenyl)propane (bisphenol A, BPA) and dihydroxybenzophenone (DHB). In yet another set of embodiments, polyols including but not limited to sugars such as sucrose, glycerol, pentaerythritol, and other polyols may be used to prepare PU aerogels. In some embodiments, combinations of different isocyanates and different alcohols may be used.

In some cases, the solvent within which the polyisocyanate and the polyol are mixed is substantially unreactive with the polyisocyanate and polyol. Phase separation may be controlled by providing a dilution solvent for the monomers and adjusting the polarity of the dilution solution, adjusting the concentrations of monomers in the dilution solvent, and/or using a polyurethane catalyst and adjusting the concentration of the polyurethane catalyst. In some embodiments, the solvent may comprise anhydrous acetone, acetone, acetonitrile, ethyl acetate, dimethylformamide, tetrahydrofuran, any other suitable solvent, or a combination thereof. In other embodiments, other solvents may be used is well.

Nanoporous polyurethane networks may be prepared using a catalyst, such as an organotin complex, an organometallic complex, a tin compound, or an alkylamine. An organic or inorganic catalyst with good selectivity towards urethane bond formation may be used. In some embodiments, dibutyltin dilaurate (DBTDL) may be used as a catalyst in forming nanoporous polyurethane networks described herein. DBTDL is a catalyst that provides for substantially exclusive polyurethane formation and has never before been used to form a polyurethane aerogel material. In some embodiments, nearly all of the linkages between monomers of polyurethane aerogels described herein may comprise urethane bonds. The gel material may be further dried so as to result in a polyurethane aerogel. That is, the use of DBTDL as a catalyst significantly lowers the chances for non-urethane reactions to occur.

DBTDL may be helpful as a catalyst in reactions that result in polyurethane aerogels in that it allows for phase separation control in the reaction mixture. In conjunction with suitable monomers, DBTDL provides for early phase separation of polyurethane particles from the reaction solution as well as polyurethane particles with a high density of surface functional groups, thereby enabling polyurethane aerogels with high specific surface area and enhanced compressive strength, compressive modulus, and/or flexibility. For instance, as monomers react with one another to form larger particles of a three-dimensional network, DBTDL facilitates phase separation of the secondary particles from the sol to form a gel. In addition, a DBTDL catalyst also provides for a relatively fast reaction to occur. For instance, where use of a DABCO catalyst may take several hours, use of a DBTDL catalyst may result in a more pure polyurethane network in less than 30 minutes (e.g., 20 minutes). In addition, a suitable amount of polyurethane catalyst may be added to the reaction mixture such that phase separation of polyurethane particles with a mean diameter less than about 50 nm occurs from the reaction solution.

The inventors have developed a systematic study of structure-property relationships for polyurethane networks, useful for designing materials to particular properties specifications. Accordingly, polyurethane aerogels are made useful not only as a model system for elucidating the molecular features that lead to aerogel monoliths that are anywhere from flexible to extremely rigid in stiffness, but suitable for a wide variety of real-world applications where robust mechanical properties are desirable. The inventors have synthesized and characterized aerogels comprised of assemblies of true polyurethane (PU) nanoparticles (i.e., containing primarily urethane linkages) prepared from small molecule monomers and correlated the mechanical properties of these aerogels with monomer rigidity and functionality to elucidate such structure-property relationships.

PU aerogels were synthesized through polymerization of various aromatic polyols with aliphatic and aromatic isocyanates employing dibutyltin dilaurate (DBTDL) as a catalyst to facilitate selective urethane bond formation and to facilitate production of a broad window of particle sizes and surface activities. These aerogels were then characterized at the molecular level using FTIR, $^{13}$C NMR, and XRD. Using rheology, SAXS, and SEM, the inventors determined the initial phase separation of PU nanoparticles into higher aggregates of secondary particles proceeds via reaction limited cluster-cluster aggregation and have characterized this aggregation mechanism.

The work presented herein provides a method for preparing strength-enhanced PU aerogels in which early phase separation of PU nanoparticles allows for the engineering of aerogel architectures comprised of finer nanoparticles. The primary particle size of PU networks decreases as the concentration of monomers in the sol increases. In some embodiments, at low monomer concentrations, assembly of PU nanoparticles proceeds via reaction-limited cluster-cluster aggregation and subsequently transitions into monomer-cluster aggregation. In some embodiments, at high monomer concentrations, the assembly of PU nanoparticles proceeds via diffusion-limited cluster-cluster aggregation.

The aggregation mechanism also depends on the functionality of monomers as particle size. By controlling the aggregation mechanism, both low-density ($\leq$0.3 g cm$^{-3}$), low-modulus PU aerogels as well as high-density, high-modulus PU aerogels with nanomorphology similar to polymer-crosslinked silica aerogels can be prepared. Highly flexible, wrappable PU aerogels can be prepared by adjusting the polarity of the reaction medium and the nanomorphology of the PU nanoparticle network. Low-density, low-modulus PU aerogels may be useful in high-performance acoustic attenuation applications, as the speed of sound through these materials may be quite low. High-density PU aerogels may be useful in impact-dampening applications, as these aerogels are found to exhibit high specific energy absorption (in excess of ~100 J g$^{-1}$ at densities of ~0.5 g cm$^{-3}$).

In accordance with the present disclosure, true polyurethane aerogels ("PU aerogels") may be synthesized from small-molecule monomers in a way that controls the onset of phase separation, in turn translating into control of the particle size, morphology, and pore structure and thus the mechanical properties of the resulting aerogels. In some embodiments, the small-molecule monomers may be inexpensive. Molecular parameters that are controlled in this approach include the molecular rigidity of the isocyanate (rigid aromatic monomers, aR, vs. flexible aliphatic monomers, aL).

In some embodiments, the concentration of polyisocyanate or polyol monomers may be less than about 0.025 M, less than about 0.05 M, less than about 0.10 M, less than about 0.15 M, less than about 0.20 M, less than about 0.30 M, less than about 0.40 M, less than about 0.50 M, or less than about 0.80 M. In other embodiments, the concentration of polyisocyanate or polyol monomers may be less than about 1% w/w of the reaction solution, less than about 2% w/w, less than about 5% w/w, less than about 10% w/w, less than about 15% w/w, less than about 20% w/w, less than about 25% w/w, less than about 50% w/w, less than about 75% w/w. Other concentrations may be used as well.

Characterizations of example compositions of the present invention during the gelled stage are provided at 1) the molecular level, which may provide information about the completeness of reactions at various stages; 2) the nanoscopic level, which may provide information about particle size; 3) the microscopic level, which may provide information about hierarchical network morphologies and pore structure; and 4) the macroscopic level, which may provide information about mechanical properties and thermal conductivities. The latter set of characterizations may also provide indirect information about interparticle connectivity.

Materials prepared in accordance with aspects of the present disclosure include numerous potential compositions. Example compositions are described herein but do not represent all potential compositions. Various embodiments provide certain advantages. Not all embodiments of the present disclosure share the same advantages and those that do might not share them under all circumstances.

Figure 2:
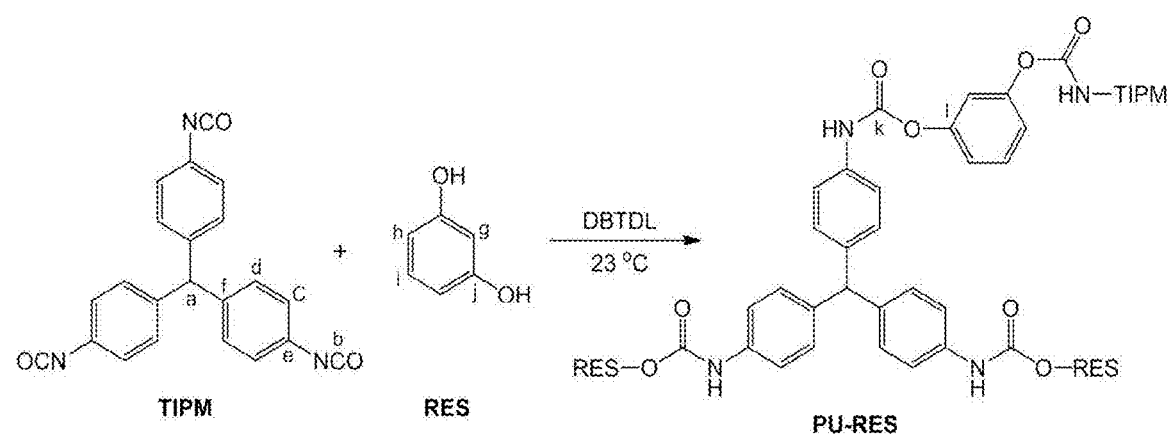
FIG. 2 shows a synthesis reaction of a polyurethane network from small molecule monomers in accordance with some embodiments.
Figure 3:
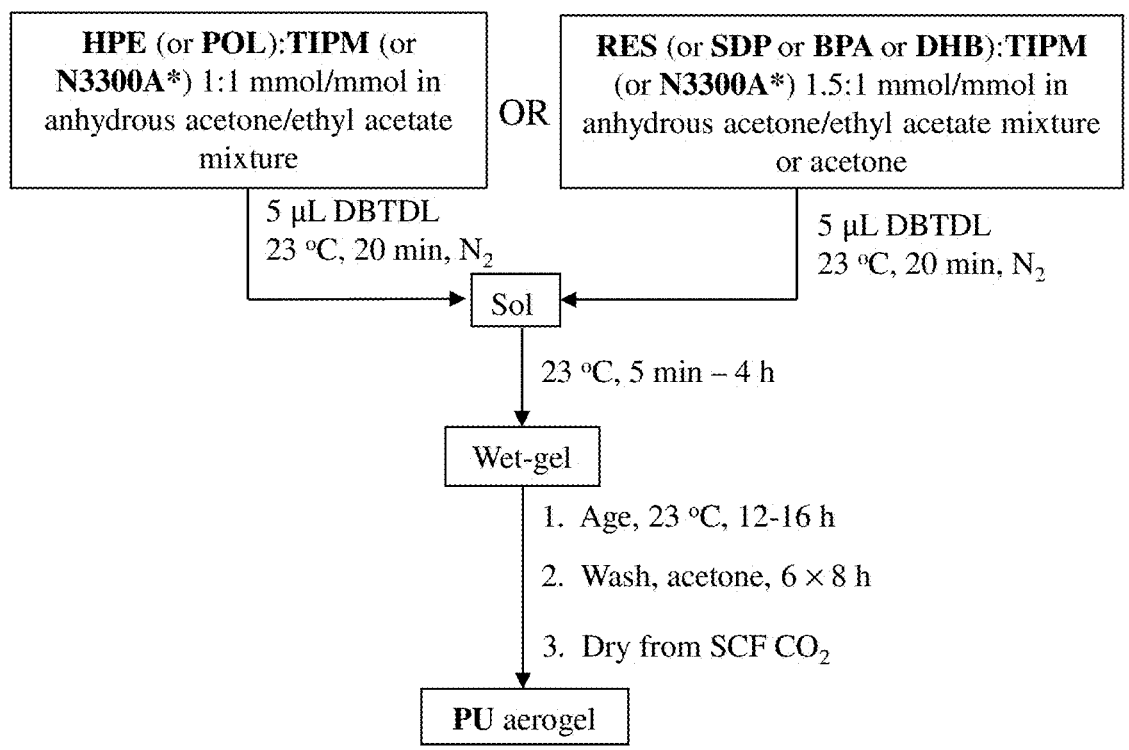
FIG. 3 illustrates a flow chart for the preparation of polyurethane network from small molecule monomers in accordance with some embodiments.

FIGS. 2 and 3 show examples of reactions through which a polyurethane network, such as a polyurethane aerogel, is formed. In FIG. 2, TIPM (a polyisocyanate) and RES (a polyol) are monomers placed in a solvent that is relatively non-reactive with either of the monomers to form a reaction mixture. A DBTDL catalyst is added to the reaction mixture at room temperature so as to result in a gel network having relatively small secondary particles.

In FIG. 3, relative concentrations of monomers and catalyst materials are provided as an example of forming polyurethane aerogels. In one embodiment, triol monomers (e.g., HPE, POL, or a combination thereof) and triisocyanate monomers (e.g., TIPM, N3300A, or a combination thereof) are added in a 1:1 mmol/mmol ratio to a solvent of anhydrous acetone/ethyl acetate, which is relatively non-reactive with either of the monomers to form a reaction mixture. In another embodiment, diol monomers (e.g., RES, SDP, BPA, DHB, or a combination thereof) and triisocyanate monomers (e.g., TIPM, N3300A, or a combination thereof) are added in a 1.5:1 mmol/mmol ratio to the solvent of anhydrous acetone/ethyl acetate. It can be appreciated that any suitable mmol/mmol ratio of polyisocyanate and polyol monomers may be used to prepare polyurethane aerogels described herein. Use of other solvents are also possible. Various solvents may be used alone, or in combination with other solvents.

A suitable amount of DBTDL (e.g., 5 μL) is added to the reaction mixture at room temperature in an inert $N_2$ atmosphere. After a suitable amount of time (e.g., 20 minutes), a sol is formed within the reaction mixture. After another period of time (e.g., about 5 minutes to an hour), at room temperature, a wet gel is formed. The wet gel is aged at room temperature for several hours (e.g., 12-16 hours), washed with acetone (e.g., for 6-8 hours), and dried to form a polyurethane aerogel. The wet gel may be dried subcritically or supercritically (e.g., under supercritical $CO_2$) to form the aerogel.

It can be appreciated that the rigidity or flexibility of a polyurethane aerogel may be tailored depending on the type and concentration of polyisocyanate(s) and polyol(s) that are used as monomers. For example, by using monomers with certain characteristics, polyurethane aerogels may be prepared having mechanical properties that vary across a spectrum, i.e., some aerogels may be made that are extremely rigid and some aerogels may be made that are rubber-like and flexible. During manufacture, a number of different parameters of the aerogels may be varied, for example: (a) the total number of functional groups on the isocyanate and the alcohol molecule (e.g., monomers having more functional groups that give rise to a reaction that joins them with other monomers may yield a stiffer, stronger network than monomers having comparatively fewer functional groups); (b) the number of functional groups per aromatic ring of the alcohol (e.g., varying the number of functional groups attached to each aromatic ring); (c) the concentration of monomers (e.g., more dilute sols tend to yield more flexible aerogels, more concentrated sols may exhibit a greater degree of rigidity); and (d) the flexibility of the molecular structure of the monomer (e.g., a molecule having a relatively long aliphatic portion may be more flexible than a molecule that is otherwise identical, yet having a shorter aliphatic portion or a molecule that is rigid and planar).

Once the catalyst is added to the reaction mixture, reactions such as that shown in FIG. 2 occur resulting in the joining of monomers with one another. Monomers join together to form ball-like or fiber-like primary particles; and primary particles, in turn, may agglomerate to form secondary particles within a gel network.

Nanoporous polyurethane networks (e.g., PU aerogels) described herein may have a suitable mean pore size and porosity. In some embodiments, the mean pore size of the polyurethane networks is less than about 50 nm, less than about 40 nm (e.g., between about 5 nm and about 35 nm), less than about 30 nm (e.g., between about 5 nm and about 25 nm), or less than about 20 nm (e.g., between about 5 nm and about 20 nm). In some embodiments, the porosity of the polyurethane networks may be less than about 50%. For example, the porosity of the polyurethane networks may be between about 10% and about 50%, or between about 20% and about 40%. In some embodiments, the porosity of the polyurethane networks may be greater than about 50%. For example, the porosity of the polyurethane networks may be between about 50% and 99%, or between about 60% to 85%.

Nanoporous polyurethane networks (e.g., PU aerogels) may have particles having a suitable mean particle diameter. In some embodiments, the mean particle diameter of the polyurethane networks is between about 5 nm and about 100 nm, between about 10 nm and about 50 nm, between about 20 nm and about 40 nm, or between about 25 nm and about 35 nm.

Nanoporous polyurethane networks (e.g., PU aerogels) described herein may exhibit a suitable BET surface area and envelope (bulk) density. In some embodiments, the BET surface area of a polyurethane network as prepared herein is greater than about 100 $m^2/g$ (e.g., between about 100 $m^2/g$ and about 500 $m^2/g$), or greater than 200 $m^2/g$ (e.g., between about 200 $m^2/g$ and about 400 $m^2/g$). In some embodiments, the envelope density (where volume is measured to include pores and small cavities) of a polyurethane network as prepared herein is less than about 1 $g/cm^3$ (e.g., between about 0.5 $g/cm^3$ and about 1 $g/cm^3$), less than about 0.8 $g/cm^3$ (e.g., between about 0.3 $g/cm^3$ and about 0.8 $g/cm^3$), less than about 0.6 $g/cm^3$ (e.g., between about 0.1 $g/cm^3$ and about 0.6 $g/cm^3$), or less than about 0.1 $g/cm^3$ (e.g., between about 0.01 $g/cm^3$ and about 0.1 $g/cm^3$).

Nanoporous polyurethane networks (e.g., PU aerogels) described herein may exhibit a suitable thermal conductivity. In some embodiments, polyurethane networks described herein may have a thermal conductivity of less than about 100 mW/mK, less than about 80 mW/mK, less than about 60 mW/mK (e.g., between about 5 mW/mK and about 30 mW/mK), less than about 50 mW/mK, less than about 40 mW/mK, or less than about 30 mW/mK (e.g., between about 5 mW/mK and about 20 mW/mK).

As discussed herein, depending on the constituents of the polyurethane network (e.g., PU aerogel), the mechanical properties of the network may suitably vary. In some embodiments, the quasi-static uniaxial compressive modulus of the polyurethane network may be greater than about 100 MPa (e.g., between about 100 MPa and about 500 MPa), greater than about 200 MPa (e.g., between about 200 MPa and about 600 MPa), or greater than about 300 MPa (e.g., between about 300 MPa and about 700 MPa). In some embodiments, the quasi-static uniaxial compressive yield strength of the polyurethane network may be greater than about 2 MPa (e.g., between about 2 MPa and about 6 MPa), greater than about 3 MPa (e.g., between about 3 MPa and about 8 MPa), or greater than about 5 MPa (e.g., between about 5 MPa and about 10 MPa).

Low-density, low-modulus polyurethane aerogels and networks may be useful in high-performance acoustic attenuation applications as the speed of sound through these materials may be lower than previously formed polyurethane aerogels. In some embodiments, the speed of sound through the composition may be less than about 1000 m s$^{-1}$ (e.g., between about 40 m s$^{-1}$ and 1000 m s$^{-1}$). Alternatively, high-density polyurethane aerogels may be useful in impact-dampening applications as these aerogels may exhibit high specific energy absorption (e.g., greater than about 100 J/g at densities of ~0.5 $g/cm^3$). The methods described herein permit the production of a wide variety of attractive multifunctional true-polyurethane aerogels (i.e., where most of the linkages between polyisocyanate and polyol monomers are urethane linkages) that can combine one or more of high flexibility, high mass-normalized stiffness, high mass-normalized compressive strength, high specific energy absorption, low speed of sound, and low thermal conductivity in a single material.

In some embodiments, a polyurethane aerogel or network is formed using the methods described herein, resulting in an envelope density of less than about 0.8 g/cm$^3$ (e.g., between about 0.1 g/cm$^3$ and about 0.8 g/cm$^3$), a quasi-static uniaxial compressive modulus of the structure is greater than about 50 MPa (e.g., between about 50 MPa and about 200 MPa), a quasi-static uniaxial compressive yield strength of the structure is greater than about 1 MPa (e.g., between about 1 MPa and about 5 MPa), and a thermal conductivity of the structure is less than about 50 mW/mK (e.g., between about 10 mW/mK and about 50 mW/mK).

Polyurethane aerogels and networks described herein may be useful for a number of applications. For example, polyurethane aerogels may be used for various applications, such as those involving structural materials (e.g., for building and construction materials; such as for a tile, plate, disc, cylinder, honeycomb structure, beam, door, panel, shingle, shutter, etc.), acoustic damping materials, thermal insulating material, a cooler, an article of clothing (e.g., jacket, coat, shirt, pants, hat, facemask, sock, shoe, boot, etc.), an oil-absorbing material, or any other appropriate material.

In some embodiments, polyurethane aerogels and networks prepared according to embodiments described may show a high degree of hydrophobicity and absorb oil or other hydrophobic substances from water. In some cases, the oil may be recovered through mechanical expulsion from the network. In other cases, the oil may be recovered through chemical extraction from the network. In further embodiments, flexible polyurethane aerogels or networks may be used to absorb oil or other hydrophobic substances. In some cases, the flexible polyurethane aerogels or networks may take the form of a blanket, pellet, macroparticle (e.g., a particle with a diameter greater than ~100 μm), microparticle (e.g., a particle with a diameter between ~0.1 μm and ~100 μm), or block. In some embodiments, the polyurethane aerogels or networks may contain magnetic particles to facilitate recollection of the polyurethane aerogel or network with a magnet, electromagnet, or magnetic field.

In some embodiments, polyurethane aerogels prepared according to embodiments described yield higher strength and stiffness characteristics than that of cross-linked vanadia aerogels, making them suitable for structural as well as ballistic applications. In some cases, polyurethane aerogels described herein are stronger than cross-linked silica aerogels as well as other reported organic aerogels. The rigidity of certain polyurethane aerogels makes them suitable for civil-related applications whereas the flexibility of other polyurethane aerogels makes them suitable for acoustic insulation.

Further, polyurethane aerogels produced from aromatic isocyanates can be converted to carbon aerogels via pyrolysis with conversion yields up to ~50% w/w. By tailoring the density, modulus, and nanomorphology of the precursor polyurethane aerogel used, carbon aerogels with properties and morphologies not easily attained with other precursors can be prepared.

EXAMPLES

The following examples are only provided as illustrative embodiments of the present invention and are meant to be non-limiting. As follows, polyurethane aerogels may be prepared using suitable methods described below.

In the following examples, compositions are referenced by a part number that describes the small-molecule isocyanate monomer used, the small-molecule polyol monomer used, and the weight percent of the solution (% w/w) of total monomers used (i.e., the sum of the weight of the isocyanate and the weight of the polyol divided by the total solution weight, which may also include a solvent, a catalyst, etc.). Part numbers are of the form II-PP-xx, where "II" is an abbreviation for the isocyanate monomer used, "PP" is an abbreviation for the polyol monomer (alcohol) used, and "xx" is a number representing the % w/w of all monomers.

"II": The symbol "aR" represents the small-molecule monomer triisocyanate tris(isocyanatophenyl)methane (Desmodur RE, TIPM), whereas the symbol "aL" represents the small-molecule monomer triisocyanate 1,3,5-tris(6-isocyanatohexyl)-1,3,5-triazinane-2,4,6-trione (Desmodur N3300A, N3300A).

"PP": The symbol "RES" represents the small-molecule monomer 1,3-dihydroxybenzene (resorcinol); the symbol "POL" represents 1,3,5-trihydroxybenzene (phloroglucinol); the symbol "HPE" represents tris(hydroxyphenyl)ethane; the symbol "SDP" represents 4,4'-sulfonyldiphenol; the symbol "BPA" represents bisphenol A (2,2-Bis(4-hydroxyphenyl)propane); and the symbol "DHB" represents 4,4'-dihydroxybenzophenone.

Synthesis of PU Aerogels.

PU aerogels of the present invention may be prepared employing methods for polyurethane synthesis as exemplified in the scheme shown in FIG. 2. As an example, the reactants tris(isocyanatophenyl)methane (TIPM) and resorcinol (1,3-dihydroxybenzene, RES) may be used to provide compositions which would be designated herein as aR-RES-xx, where "xx" depends on the concentration of monomers used (example composition labeled PU-RES in the scheme shown in FIG. 2). The scheme shown in FIG. 3 summarizes the practical implementation of the scheme depicted in FIG. 2.

In the preferred embodiment, the process may use a mixture of solvents such as ethyl acetate (EtAc) and acetone for synthesizing aromatic PU, or 100% acetone for synthesizing semi-aromatic PU aerogels. Ethyl acetate may not be necessary but is convenient to use as TIPM is commercially available as a solution in ethyl acetate. Unlike the formation of polyurea, the formation of urethane linkages from the reaction of isocyanates and hydroxyl groups needs a catalyst. The isocyanate/alcohol reaction may be catalyzed with a tin catalyst such as dibutyltin dilaurate (DBTDL), as well as tertiary amines (such as triethylamine). Tin catalysts are found to be more active than the tertiary amines and so DBTDL and other organotin complexes are generally preferred in these examples. Catalyst concentration was optimized using aR-POL-5 (aerogel synthesized from TIPM and POL using a 5% w/w solid formulation). The reaction was carried out as per the scheme of FIG. 3, where different amounts of catalyst were added (0.00169, 0.00844 and 0.0168 mol/mol of TIPM) to the reaction mixture. The sol-gel transition was observed visually by inverting the molds. Results are summarized in Table 1. By considering higher concentration sols and in order to increase the processability, 0.0084 mol catalyst concentration was chosen along with room temperature synthesis.

TABLE 1

Phase separation of aR-POL-5 at two different temperatures

| DBTDL (mol/mol of TIPM) | Gel Time @ 23° C. | Gel Time @ 60° C. |
|---|---|---|
| 0.0017 | Very Long | Very Long |
| 0.0084 | 3 h | 30-40 min |
| 0.017 | 1 h 30 min | 15-20 min |

Monolithic PU aerogels of variable densities were obtained by varying the monomer concentration in the sol. Reaction of TIPM with diols at 5% w/w did not yield gels, but rather soluble oligomers. With DHB, the minimum concentration sol that was able to gel was 15% w/w, which indicates DHB to be a highly soluble precursor. Other aromatic PU aerogels were prepared based on different molar concentrations of isocyanates, using 25% w/w N3300A and polyols (semi-aromatic PU aerogels). Semi-aromatic PU based on difunctional polyols such as RES and DHB did not yield gels, but rather precipitated. Wet gels synthesized from N3300A and BPA (aL-BPA-25) upon drying, swell in the supercritical fluid (SCF). Characterizations reported here with aL-BPA-25 were conducted on deformed aerogels.

The Gelation Process.

Figure 4:
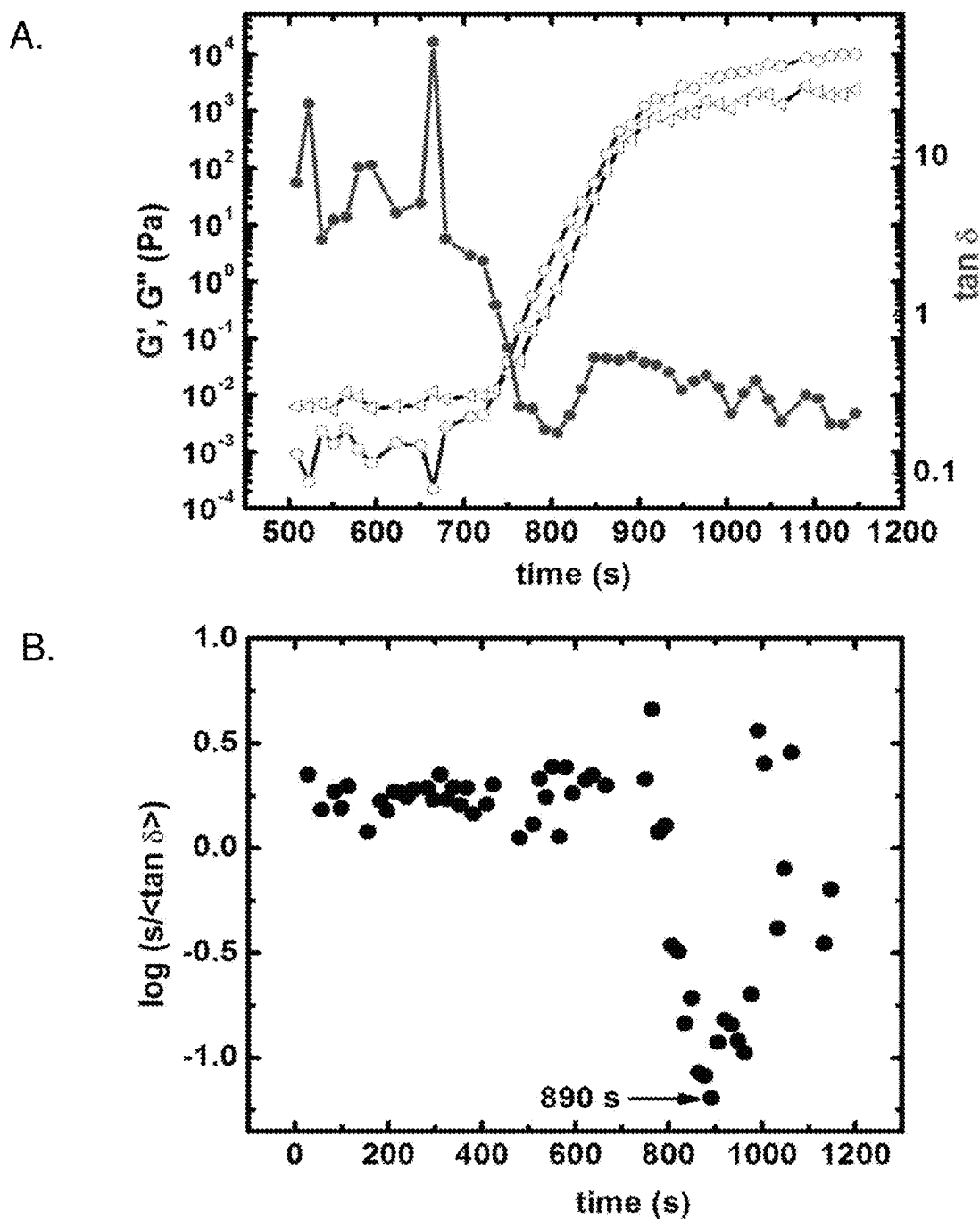
FIG. 4 presents rheology results during gelation of an example of a polyurethane network in accordance with some embodiments.

The transition from sol to gel was monitored by both rheometer as well as with $^{13}$C liquid NMR. The gel structure for the selected formulations of PU was determined using rheology by treating the data statistically, since the crossover of loss modulus and storage modulus vary with the frequency. In the statistical method, the gel point can be determined without error by taking a time at which log(s/tan δ) is minimum as shown in FIG. 4. The predicted gel exponent (n) can be correlated with fractal dimension ($d_f$) according to the formula as follows:

$$n = \frac{d(d + 2 - 2df)}{2(d + 2 - df)}$$

where d=3 for a 3D structure and n can be calculated using $$\delta = \frac{n\pi}{2}$$

Results are tabulated in Table 2.

TABLE 2

Rheometry data from the gelation of the selected PU sols as indicated

| Composition | Aging Time Before Loading into Rheometer (s) | Gel Point, $t_{gel}$ (s) | tan δ at $t_{gel}$ | n | $d_f$ |
|---|---|---|---|---|---|
| aR-POL-5 | 9000 | 10514 | 0.079 | 0.051 | 2.45 |
| aR-POL-10 | 2400 | 3290 | 0.553 | 0.322 | 2.20 |
| aR-POL-15 | 1200 | 2062 | 0.395 | 0.240 | 2.28 |
| aR-POL-20 | 900 | 1734 | 0.572 | 0.331 | 2.19 |
| aR-POL-25 | 660 | 1396 | 0.463 | 0.276 | 2.24 |
| aR-HPE-15 | 1200 | 1667 | 0.263 | 0.164 | 2.35 |
| aR-SDP-25 | 60 | 1193 | 0.187 | 0.171 | 2.34 |

Figure 5:
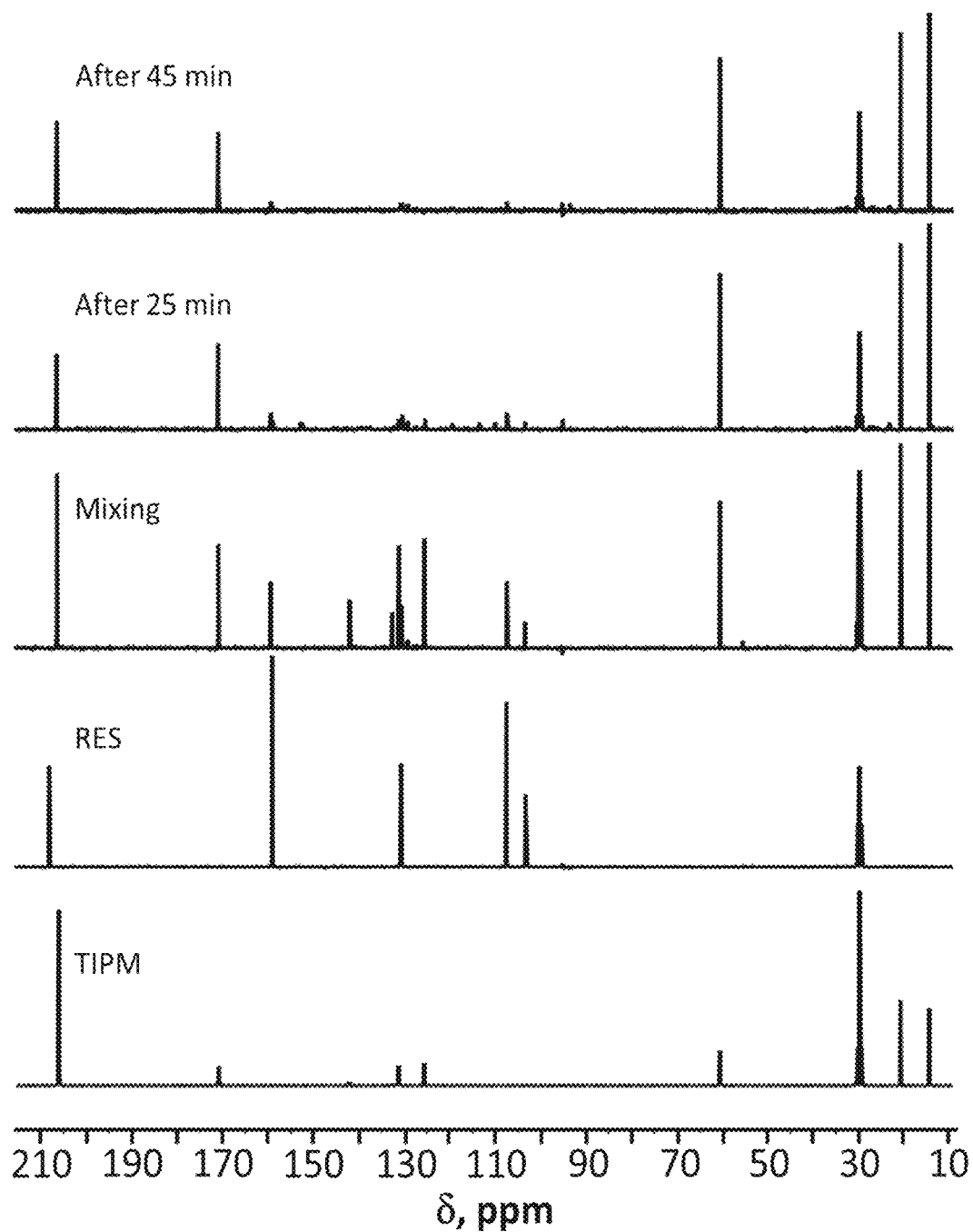
FIG. 5 depicts room temperature liquid $^{13}$C-NMR in acetone-$d_6$ of an example of a polyurethane network in accordance with some embodiments.

The fractal dimension for a spherical aggregation with no void fraction is $d_f$=3. The fractal dimension of the selected PU formulations were in the range of 2-2.5, suggesting that the gel network is formed by mass-fractal particles via reaction-limited cluster-cluster aggregation. After knowing the gel structure was formed by mass fractal particles, the reaction between isocyanates and polyol was followed up to the gel point. FIG. 5 shows the formation of polyurethane followed by $^{13}$C liquid NMR from aR-RES-10. Soluble oligomers were captured with RES which was not possible with other rigid systems like POL that phase separates faster and made the NMR signal weaker. In the case of aR-RES-10, the resonance corresponding to the urethane carbonyl can be seen at 151 ppm and two peaks in the aromatic C region attached to —OH group 20 minutes after addition of DBTDL are observed. It can be concluded that the reaction starts instantaneously after the addition of DBTDL and ~30 min after catalyst addition, the PU has phase separated and made the NMR signal weaker. At the gel point, FIG. 5 shows that monomers remain yet continue to react. Considering the data from the rheology in conjunction with the visual observation of gel point, this indicates that the these compositions may not have gelled after 30 min but are rather still in the form of a viscous liquid.

Figure 6:
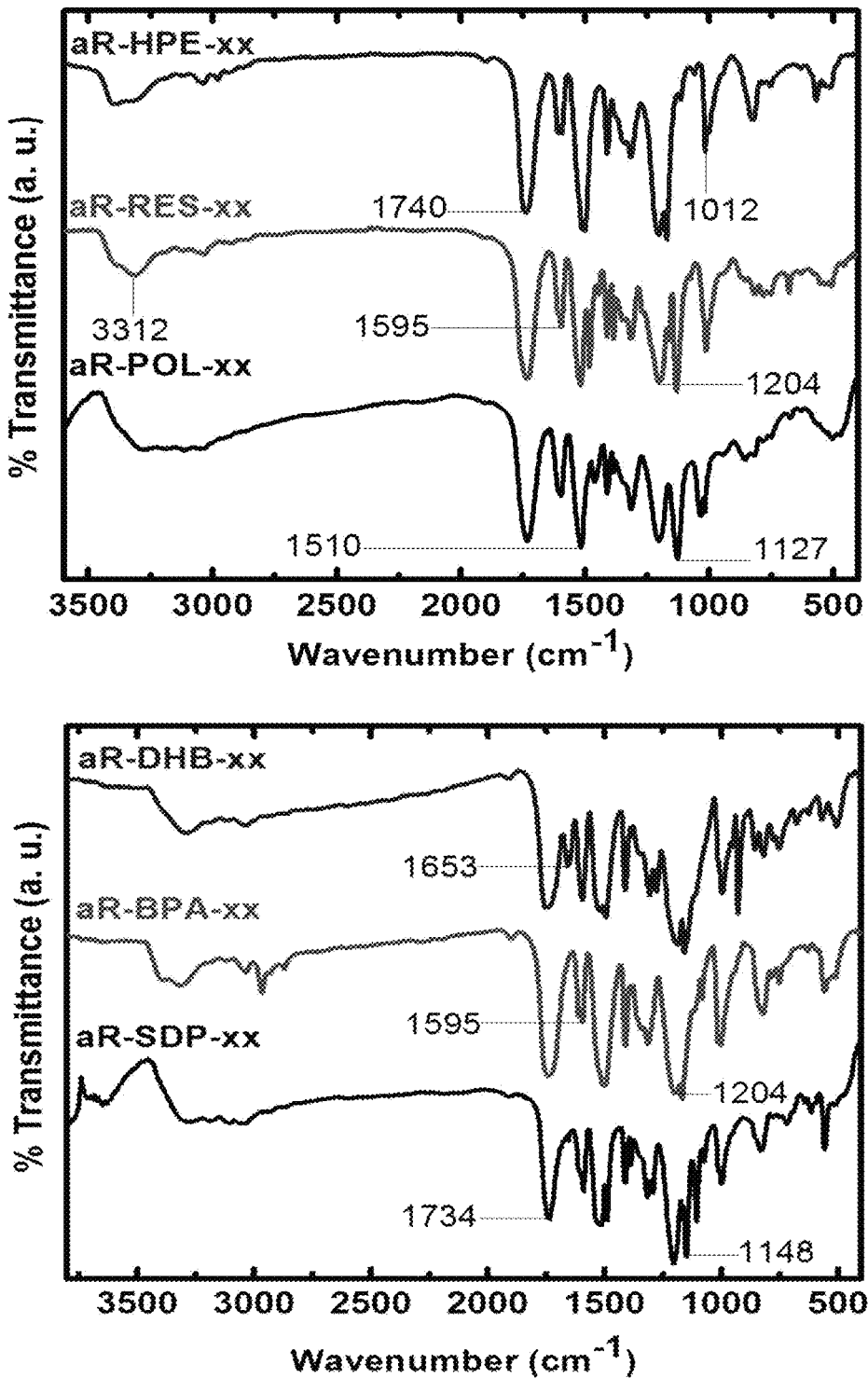
FIG. 6 shows IR data for samples of a polyurethane network in accordance with some embodiments.

Synthesized PU aerogels were chemically characterized by FTIR and solid $^{13}$C NMR. The degree of molecular order within the solid framework was investigated with XRD. FIG. 6 represents the FTIR of PU aerogels synthesized with different small molecule polyols. The data for these compositions are grouped into two sections, namely the effect of functional group per aromatic ring, comparing aR-POL-xx, aR-HPE-xx, and aR-RES-xx, and the effect of bridging between the aromatic rings, comparing aR-SDP-xx, aR-BPA-xx, and aR-DHB-xx. The band at 1740 cm$^{-1}$ is attributed to urethane carbonyl with an N—H stretch is visible at 3312 cm$^{-1}$ and C—N stretch near 1204 cm$^{-1}$. N—H bending and C—H stretching near 1510 cm$^{-1}$ are more prominent than urethane carbonyl, while the observed band at 1590 cm$^{-1}$ is attributed to aromatic C—C stretching and the absorbance at 1127 cm$^{-1}$ is attributed to C—O stretching. Neither unreacted isocyanate at 2273-2000 cm$^{-1}$ (N=C=O stretch), nor urea carbonyl at 1600-1640 cm$^{-1}$ are detectable which confirms complete conversion to PU and thus indicates the presence of a true-polyurethane network.

Figure 7:
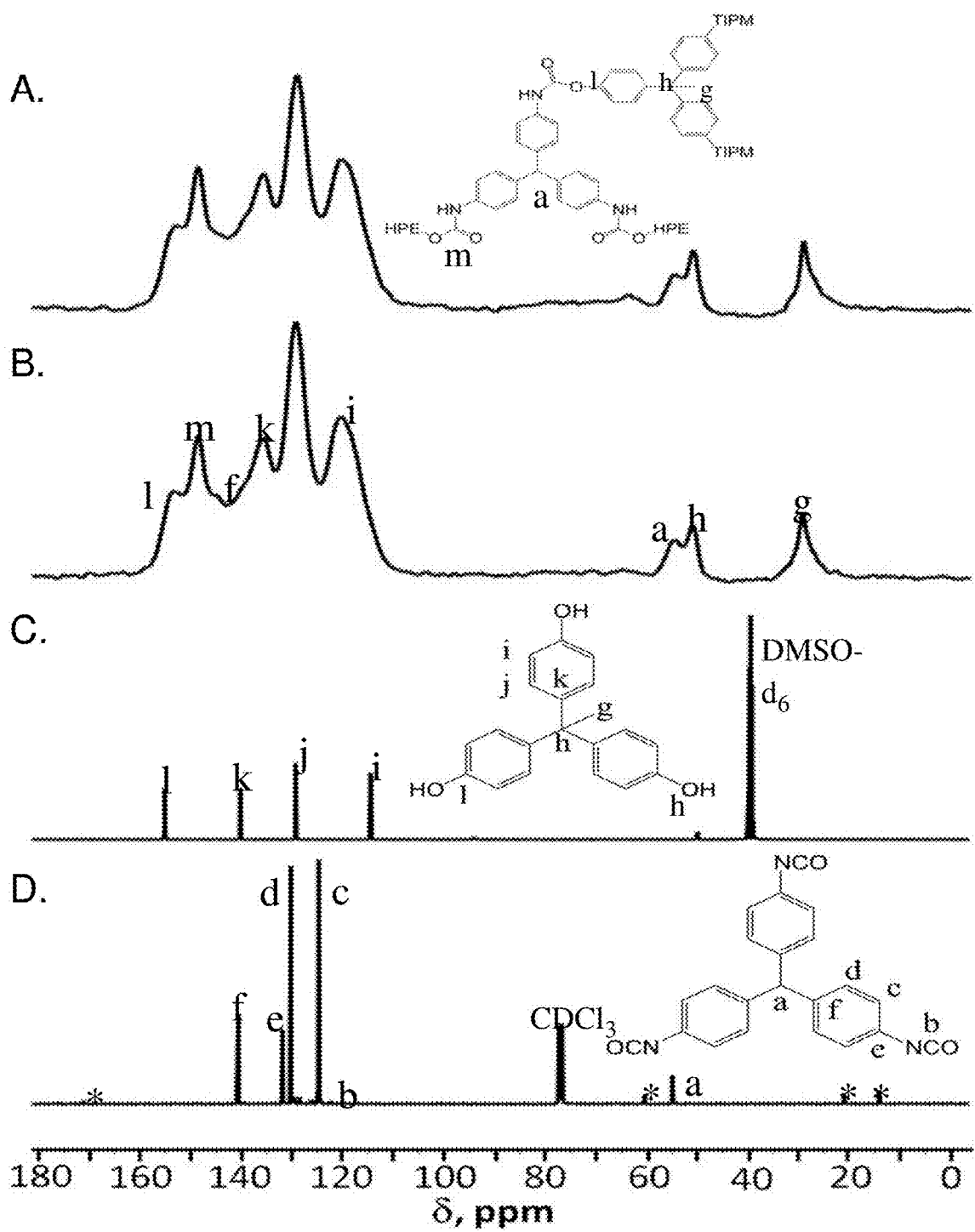
FIG. 7 illustrates solid state and liquid state $^{13}$C NMR spectra for various examples of a polyurethane network in accordance with some embodiments.

Typical CPMAS solids $^{13}$C NMR spectrum of aR-HPE-xx aerogels is shown in FIG. 7. The resonances at 129 ppm, 118 ppm, and 135 ppm are assigned to the aromatic carbons. Two peaks in the 150-155 ppm can be seen. The more downfield peak is due to the ester C (O attached to aromatic C), also evident from liquid-phase $^{13}$C NMR (FIG. 4) which shows an upfield shift for the aromatic carbon attached to the hydroxyl group when it is converted to ester C. The peak close to the aromatic ester C is assigned to the urethane carbonyl (152-154 ppm). The peak at 54 ppm is assigned to the CH of TIPM and the peak at 51 ppm to the quaternary C of HPE. The resonance at 29 ppm is assigned to C—CH$_3$.

Figure 8:
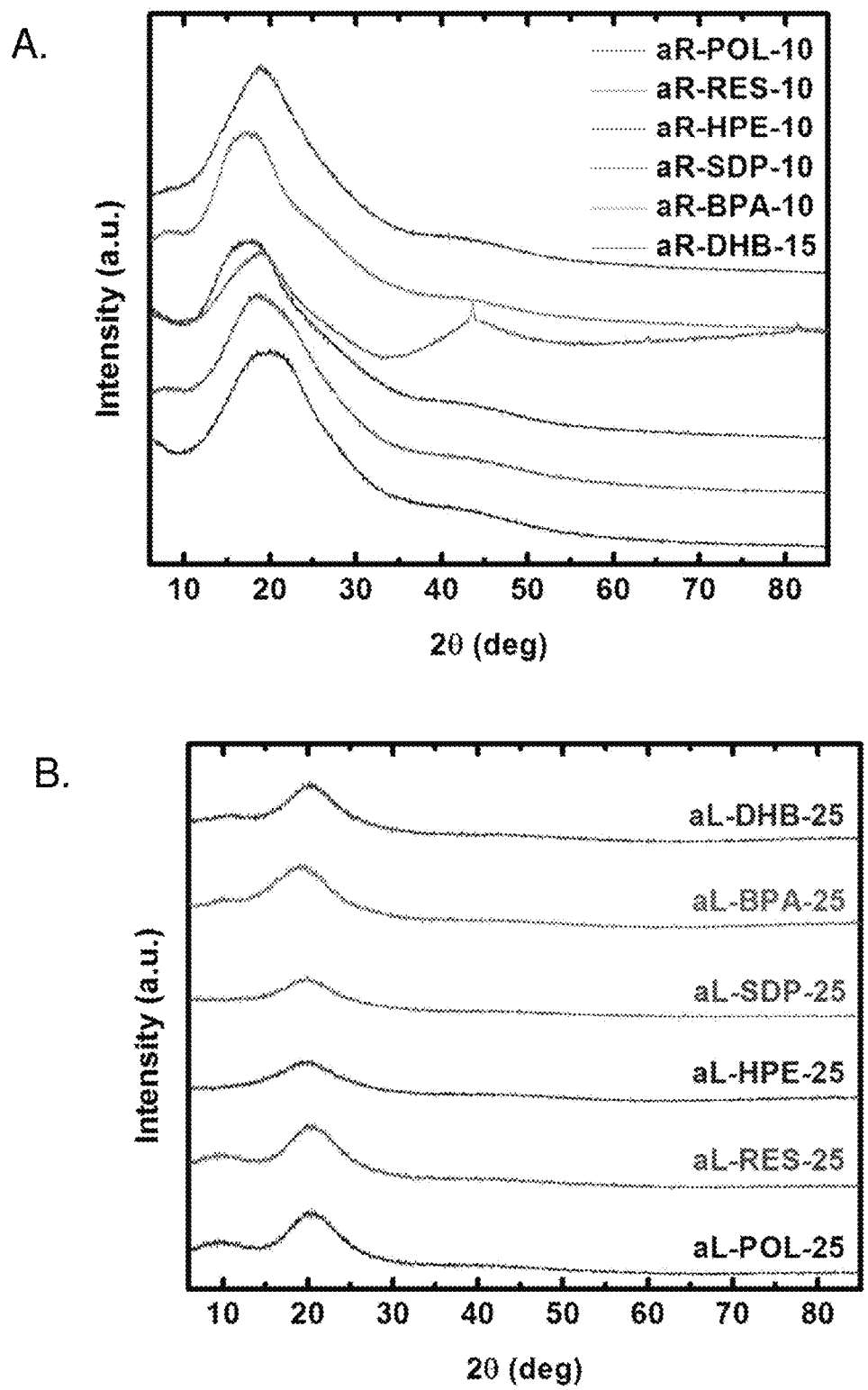
FIG. 8 shows X-ray diffraction patterns of examples of a polyurethane network in accordance with some embodiments.

Selected formulations of PU aerogels based on both TIPM and N3300A were subjected to XRD in order to determine the degree of molecular order within the solid frameworks of these example networks. XRD (FIG. 8) showed broad but well-defined diffraction peaks at 11, 19, and 44, indicating nanocrystallinity. These peaks can be assigned to the scattering from PU chains with regular interplanar spacing. Rigid PU should show a more intense peak at 11° which we can clearly observe in the case of N3300A-based PU aerogels (formulated with 25% w/w monomers). All PU formulations characterized exhibited a bump at 44°, however in case of aR-SDP-xx a distinct peak is observed suggesting a potential for forming interchain hydrogen bonding as in polyamides.

General Materials Properties of PU Aerogels.

In order to facilitate clear discussion, the mechanical properties are summarized in two tables. Table 3 shows general materials properties data for PU aerogels based on aromatic isocyanate (TIPM), reflecting both the effect of functional group per aromatic ring and the effect of bridging between the aromatic rings. Table 4 shows the material characterization data for selected semi-aromatic PU aerogels.

Macroscopic Properties.

Linear shrinkage of PU aerogels (i.e., change in dimension between their dry and wet-gel states) depends on the concentration of monomers used as well as the functionality of the monomer. Monomers based on trihydroxyl groups per aromatic ring recorded the highest shrinkage as observed in the case of POL, whereas comparatively low shrinkage was observed for aR-DHB-xx aerogels, which may phase separate with larger particles as indicated by their longer gel times. Although only possessing one hydroxyl group per aromatic ring, the trifunctional polyol-based aerogels, aR-HPE-xx, showed lower shrinkage than aerogels based on difunctional monomers. This behavior of aR-HPE-xx indicates that linked monomers in the network do not consolidate or relax due to only having one functional group per aromatic ring and in fact the added spacing between functional groups may act as a spacer that helps overcome the stresses associated with internal crosslinking and drying. Considering observations from the liquid-phase $^{13}$C spectrum (FIG. 4) in the light of the observed shrinkage, we can conclude that the rates of reaction are similar for these different polyols as PU formation rate does not follow a trend as a function of increasing monomer concentration. Given similar reaction rates among the aromatic monomers, it appears that the variables that dictate the assembly of PU nanoparticles are monomer concentration and the nature of monomers in the sol. The highest linear shrinkage is observed in semi-aromatic-based PU aerogels, and is due to the inherent molecular flexibility of N3300A due to the higher degree of van der Waals interactions between the methylene bridges than its aromatic counterparts. Bulk density increases with increasing sol concentration. Skeletal densities fall in the range between 1.23-1.36 g/cm$^3$ and are dependent on the polyol used.

TABLE 3

Materials characterization data for polyurethane aerogels (PU) based on TIPM (aR-ALCOHOL-xx)

| Sample (Isocyanate-Polyol)- % w/w Solids | Linear Shrinkage (%) [a,b] | Bulk Density, $\rho_b$ (g cm$^{-3}$) [a] | Skeletal Density, $\rho_s$ (g cm$^{-3}$) [c] | Porosity, Π (% void space) | BET Surface Area, σ(m$^2$ g$^{-1}$) [d] | Average Pore Diam. (nm) [e] | Average Pore Diam. (nm) | Particle Diam. (nm) [f] |
|---|---|---|---|---|---|---|---|---|
| aR-POL-xx | | | | | | | | |
| aR-POL-5 | 34.8 ± 0.9 | 0.159 ± 0.006 | 1.361 ± 0.007 | 88 | 241 [19] | 18.9 [92.2] | | 18.30 |
| aR-POL-10 | 31.4 ± 0.2 | 0.298 ± 0.004 | 1.355 ± 0.008 | 78 | 239 [21] | 22.4 [43.9] | 53.6 [62.1] [g] | 18.45 |
| aR-POL-15 | 31.9 ± 0.3 | 0.477 ± 0.008 | 1.345 ± 0.010 | 65 | 234 [19] | 18.0 [23.2] | 29.8 [9.9] [g] | 19.00 |
| aR-POL-20 | 30.8 ± 0.3 | 0.640 ± 0.010 | 1.336 ± 0.007 | 52 | 200 [17] | 12.0 [16.3] | 15.2 [3.6] [g] | 22.45 |
| aR-POL-25 | 28.8 ± 0.4 | 0.760 ± 0.050 | 1.340 ± 0.006 | 43 | 225 [17] | 8.3 [10.1] | 9.8 [2.3] [g] | 18.57 |
| aR-HPE-xx | | | | | | | | |
| aR-HPE-5 | 22.4 ± 1.6 | 0.094 ± 0.004 | 1.232 ± 0.015 | 92 | 132 [14] | 11.4 [297.7] | 54.9 [80.8] [g] | 36.95 |
| aR-HPE-10 | 20.6 ± 0.4 | 0.184 ± 0.007 | 1.251 ± 0.007 | 85 | 165 [19] | 13.1 [112.4] | 47.3 [62.1] [g] | 29.09 |
| aR-HPE-15 | 23.9 ± 0.3 | 0.315 ± 0.003 | 1.260 ± 0.009 | 75 | 174 [19] | 17.6 [54.7] | 41.0 [69.1] [g] (56 [h]) | 27.36 |
| aR-HPE-20 | 24.1 ± 0.2 | 0.426 ± 0.008 | 1.276 ± 0.002 | 66 | 192 [21] | 31.9 [32.6] | 43.2 [33.7] [g] | 22.83 |
| aR-HPE-25 | 22.1 ± 0.2 | 0.567 ± 0.002 | 1.260 ± 0.003 | 55 | 235 [20] | 18.2 [16.5] | 43.8 [41.4] [g] | 18.6 |
| aR-RES-xx | | | | | | | | |
| aR-RES-10 | 31.7 ± 0.4 | 0.244 ± 0.005 | 1.307 ± 0.010 | 81 | 33 [1.2] | 22.9 [404] | 59.5 [76.8] [g] | 139.11 |
| aR-RES-15 | 30.7 ± 0.1 | 0.404 ± 0.001 | 1.297 ± 0.022 | 69 | 83 [3.6] | 20.7 [82.1] | 50.6 [66.1] [g] (35 [h]) | 56.92 |
| aR-RES-20 | 30.8 ± 0.01 | 0.565 ± 0.004 | 1.319 ± 0.008 | 57 | 109 [5] | [37.1] | 42.5 [27.6] [g] | 41.73 |
| aR-RES-25 | 28.6 ± 0.2 | 0.680 ± 0.003 | 1.316 ± 0.004 | 48 | 119 [5] | [23.9] | 22.7 [7.4] [g] | 38.31 |
| aR-SDP-xx | | | | | | | | |
| aR-SDP-10 | 27.5 ± 0.7 | 0.190 ± 0.005 | 1.319 ± 0.005 | 86 | 2.8 | 11.3 [6436] | 5226 [h] | 1624.6 |
| aR-SDP-15 | 27.6 ± 0.5 | 0.307 ± 0.007 | 1.319 ± 0.004 | 77 | 4 [0.6] | 11.4 [2499] | 2035 [h] | 1137.2 |
| aR-SDP-20 | 25.7 ± 0.1 | 0.422 ± 0.003 | 1.325 ± 0.005 | 68 | 9 [1.4] | 13.1 [718] | 525 [h] | 503.14 |
| aR-SDP-25 | 24.9 ± 0.2 | 0.541 ± 0.004 | 1.345 ± 0.005 | 60 | 28 [2.3] | 21.4 [158] | 115 [h] | 148.69 |

TABLE 3-continued

Materials characterization data for polyurethane aerogels (PU) based on TIPM (aR-ALCOHOL-xx)

| Sample (Isocyanate-Polyol)- % w/w Solids | Linear Shrinkage (%) [a,b] | Bulk Density, $\rho_b$ (g cm$^{-3}$) [a] | Skeletal Density, $\rho_s$ (g cm$^{-3}$) [c] | Porosity, Π (% void space) | BET Surface Area, $\sigma$ (m$^2$ g$^{-1}$) [d] | Average Pore Diam. (nm) [e] | Average Pore Diam. (nm) | Particle Diam. (nm) [f] |
|---|---|---|---|---|---|---|---|---|
| aR-BPA-xx | | | | | | | | |
| aR-BPA-10 | 24.7 ± 0.3 | 0.194 ± 0.005 | 1.228 ± 0.003 | 84 | 1 [0.0] | — [17361] | 22763 [h] | 4885.99 |
| aR-BPA-15 | 23.7 ± 0.2 | 0.293 ± 0.005 | 1.240 ± 0.006 | 76 | 1 [0.0] | 11.6 [10426] | 8463 [h] | 4838.7 |
| aR-BPA-20 | 29.7 ± 0.2 | 0.460 ± 0.002 | 1.399 ± 0.017 | 67 | 4 [0.2] | 12.1 [1459] | 1080 [h] | 1072.19 |
| aR-BPA-25 | 26.3 ± 0.3 | 0.567 ± 0.005 | 1.232 ± 0.005 | 54 | 49 | 22.1 [78] | 53 [h] | 99.39 |
| aR-DHB-xx | | | | | | | | |
| aR-DHB-15 | 17.2 ± 0.8 | 0.243 ± 0.009 | 1.297 ± 0.008 | 81 | 0.09 | — [148631] | 18587 [h] | |
| aR-DHB-20 | 17.5 ± 0.2 | 0.309 ± 0.003 | 1.349 ± 0.009 | 77 | 0.5 | — [19960] | 13917 [h] | |
| aR-DHB-25 | 18.5 ± 0.4 | 0.432 ± 0.007 | 1.481 ± 0.019 | 70 | 1 | — [6558] | 4559 [h] | |

[a] Average of 5 samples.
[b] Shrinkage = 100 × (mold diameter-sample diameter)/(mold diameter).
[c] Single sample, average of 50 measurements.
[d] First number indicates the BET surface area, the number in the square bracket indicates the micropore area given by t-plot.
[e] By the 4 × $V_{Total}/\sigma$ method. For the first number, $V_{Total}$ was calculated by the single-point adsorption method; for the number in brackets, $V_{Total}$ was calculated via $V_{Total} = (1/\rho_b)-(1/\rho_s)$.
[f] Diameter = 2r, where r = 3/$\rho_s\sigma$ (r = particle radius).
[g] From the BJH plots: the first number are the peak maxima; the numbers in brackets are the width at half maxima of the BJH plots.
[h] By using Hg porosimetry As shown, aR-POL-10 and aR-POL-15 are PU aerogels that demonstrate high specific surface area, small mean particle diameter, and small mean pore diameter. These aerogels also exhibit high compressive modulus, high compressive yield stress, and low thermal conductivity. The aR-BPA-15/aR-BPA-20 aerogels exhibit a high modulus and yield stress, yet exhibit larger pores than those of aR-POL-10 and aR-POL-15. The aR-HPE-10/aR-HPE-15/aR-HPE-20 aerogels exhibit low speeds of sound and are compliant (flexible) and lightweight.

matic ring. As expected, skeletal densities of semi-aromatic PU networks are lower than that of aromatic PU networks. Porosities (% v/v non-solid space) were calculated using bulk densities and skeletal densities of the materials and were found to decrease as the concentration of monomer increases.

The BET surface areas of aR-POL-xx were found to be higher compared to other PU networks irrespective of density. This result indicates that multifunctional groups per aromatic ring generally lead to comparatively smaller sized

TABLE 4

Materials characterization data for polyurethane aerogels (PU) based on N3300A (semi-aromatic PU, aL-ALCOHOL-xx)

| Sample (Isocyanate-Polyol)- % w/w Solids | Linear Shrinkage (%) [a,b] | Bulk Density, $\rho_b$ (g cm$^{-3}$) [a] | Skeletal Density, $\rho_s$ (g cm$^{-3}$) [c] | Porosity, Π (% void space) | BET Surface Area, $\sigma$ (m$^2$ g$^{-1}$) [d] | Average Pore Diam. (nm) [e] | Average Pore Diam. (nm) [f] | Particle Diam. (nm) [g] |
|---|---|---|---|---|---|---|---|---|
| aL-POL-25 | 30.5 ± 1.2 | 0.652 ± 0.028 | 1.284 ± 0.010 | 49 | 57 | 32.9 [53.0] | 34 | 81.98 |
| aL-HPE-25 | 26.9 ± 0.3 | 0.563 ± 0.004 | 1.243 ± 0.009 | 55 | 99 | 36.7 [39.3] | 28 | 48.75 |
| aL-RES-25 | 38.4 ± 0.3 | 0.872 ± 0.008 | 1.206 ± 0.003 | 28 | — | — | 54 | — |
| aL-SDP-25 | 32.5 ± 0.2 | 0.639 ± 0.005 | 1.324 ± 0.006 | 52 | 28 | 66.5 [116] | 54 | 161.85 |
| aL-BPA-25 | −11.6 ± 2.4 [h] | 0.160 ± 0.013 | 1.281 ± 0.015 | 88 | 54 | 53.7 [405] | 80 | 86.73 |
| aL-DHB-25 | 23.6 ± 1.6 | 0.694 ± 0.004 | 1.060 ± 0.013 | 35 | — | — | 167 | — |

[a] Average of 5 samples.
[b] Shrinkage = 100 × (mold diameter-sample diameter)/(mold diameter).
[c] Single sample, average of 50 measurements.
[d] First number indicates the BET surface area, the number in the square bracket indicates the micropore area given by t-plot.
[e] By the 4 × $V_{Total}/\sigma$ method. For the first number, $V_{Total}$ was calculated by the single-point adsorption method; for the number in brackets, $V_{Total}$ was calculated via $V_{Total} = (1/\rho_b)-(1/\rho_s)$.
[f] By using Hg intrusion
[g] Diameter = 2r, where r = 3/$\rho_s\sigma$ (r = particle radius).
[h] sample swells in SCF The skeletal density may have a tendency to increase when increasing the number of functional groups per aromatic ring, whereas in other PU networks surface area may increase as monomer concentration increases and is inversely proportional to the time required for nanoassemblies (particle agglomerations) to phase separate. Notably, aR-DHB-xx showed low surface areas which confirms that the assemblies phase separated with greater sized particles. Semi-aromatic PU aerogels (aL-POLYOL-25) showed lesser surface area than their fully aromatic counter parts. Taking a higher gel time into account, the aL-POLYOL-25 formulations phase separated with larger sized particles than aR-POLYOL-xx. In order to correlate the macroscopic properties with their aggregation mechanism, the inventors investigated the microstructure of PU aerogels.

Structural Characterization of PU Aerogels.

The microstructure of polyurethane aerogels was evaluated in terms of nanomorphology and pore size distribution of their skeletal frameworks. The pore size distribution at the meso- and macroscale was evaluated quantitatively by analysis of $N_2$ sorption data as well as Hg intrusion data in combination with SEM, whereas elementary building blocks of the skeletal framework (including primary and secondary particles) were probed with SAXS.

Figure 9:
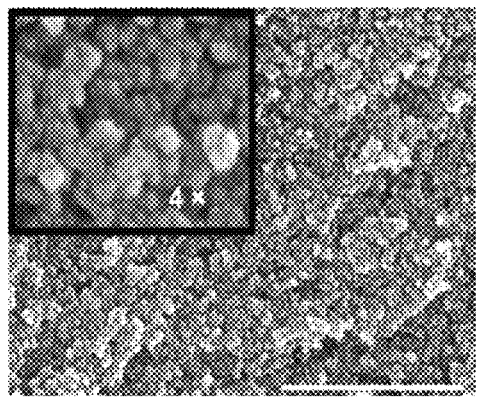
FIG. 9 depicts scanning electron microscopy and $N_2$ sorption data of examples of a polyurethane network in accordance with some embodiments.
Figure 9:
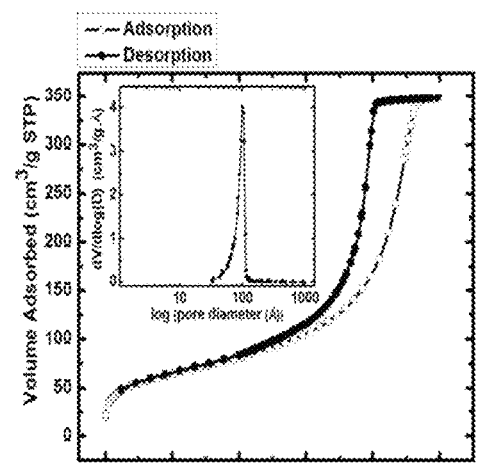
Figure 9:
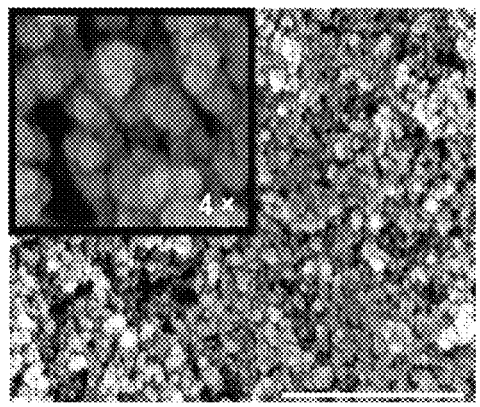
Figure 9:
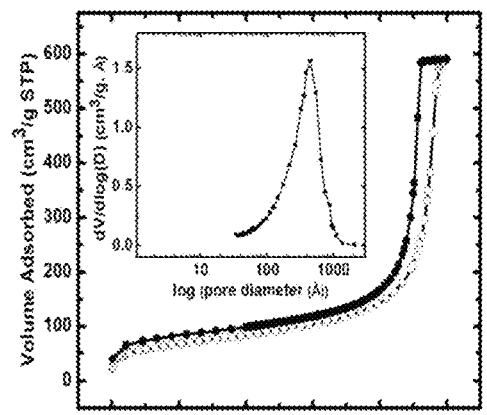
Figure 9:
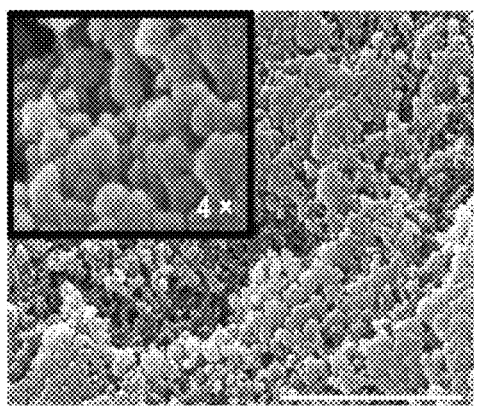
Figure 9:
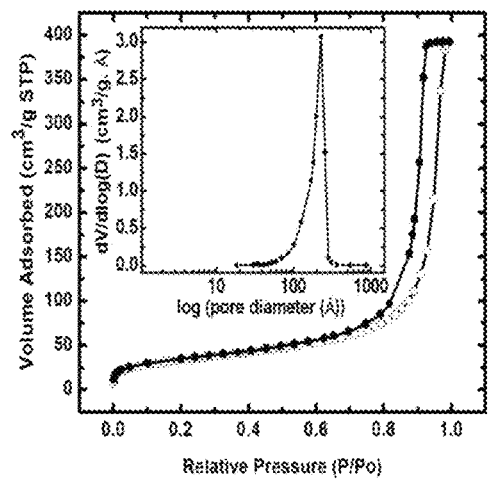
Figure 10:
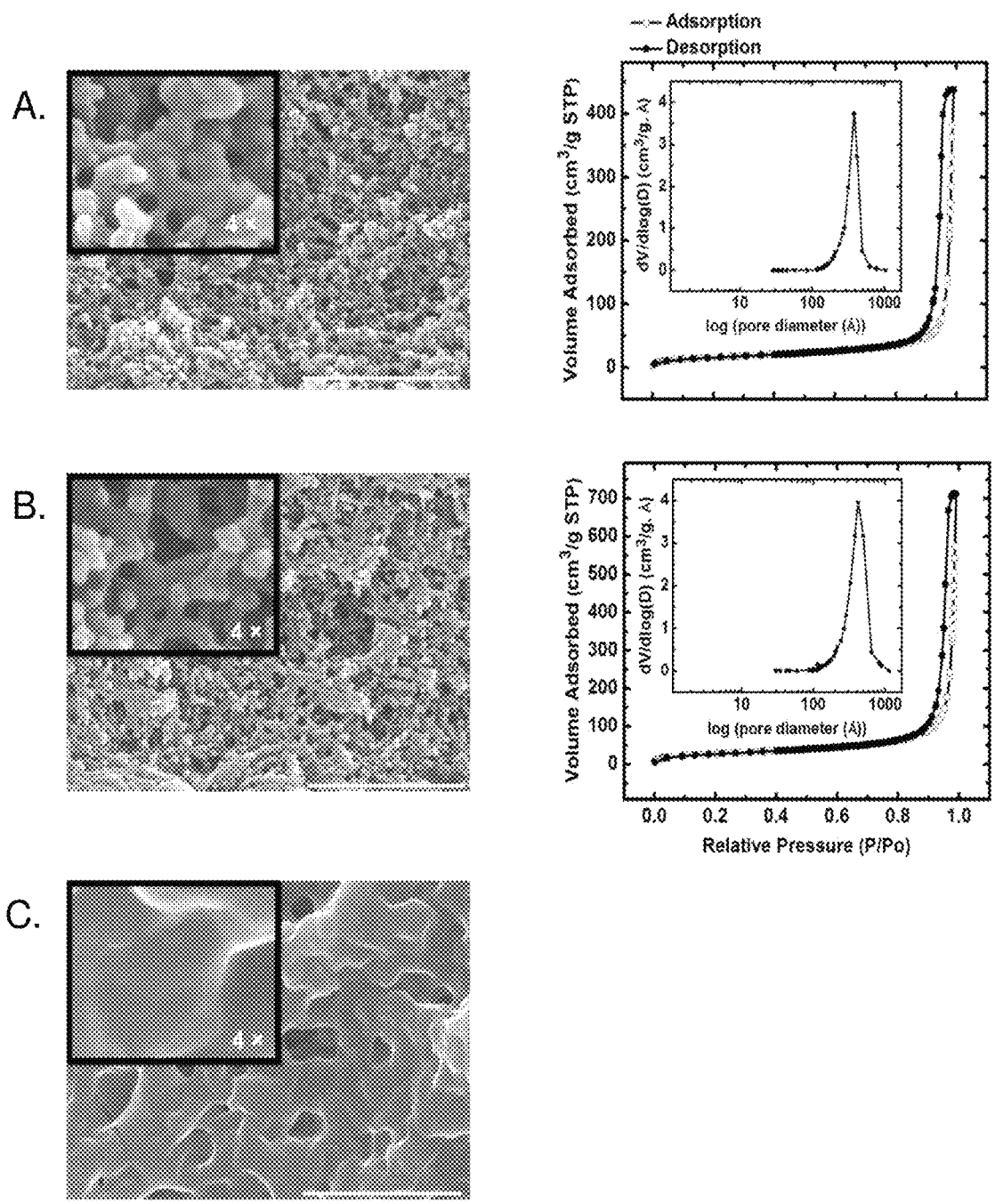
FIG. 10 shows scanning electron microscopy and $N_2$ sorption data of more examples of a polyurethane network in accordance with some embodiments.
Figure 11:
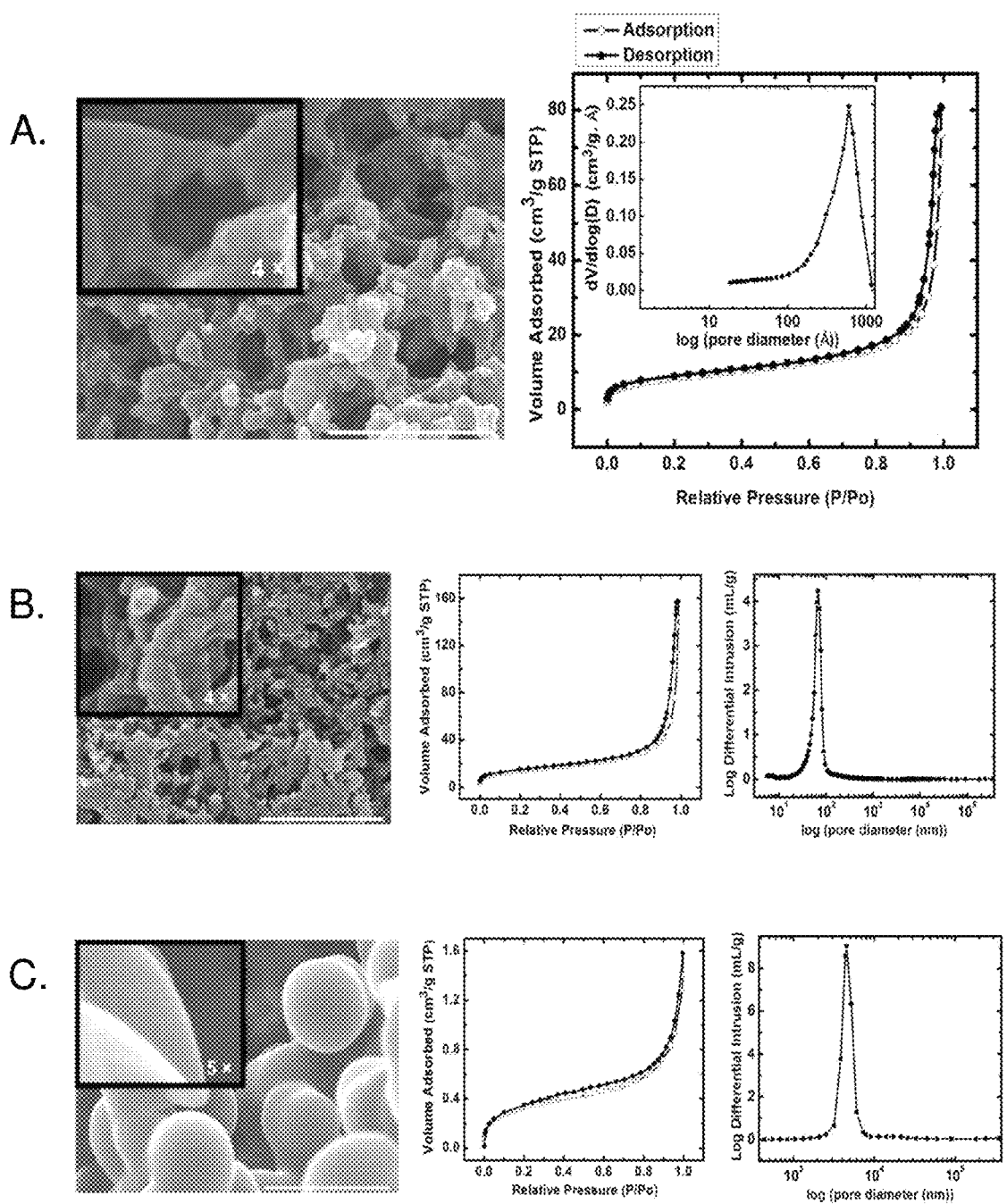
FIG. 11 illustrates scanning electron microscopy and $N_2$ sorption data of further examples of a polyurethane network in accordance with some embodiments.
Figure 12:
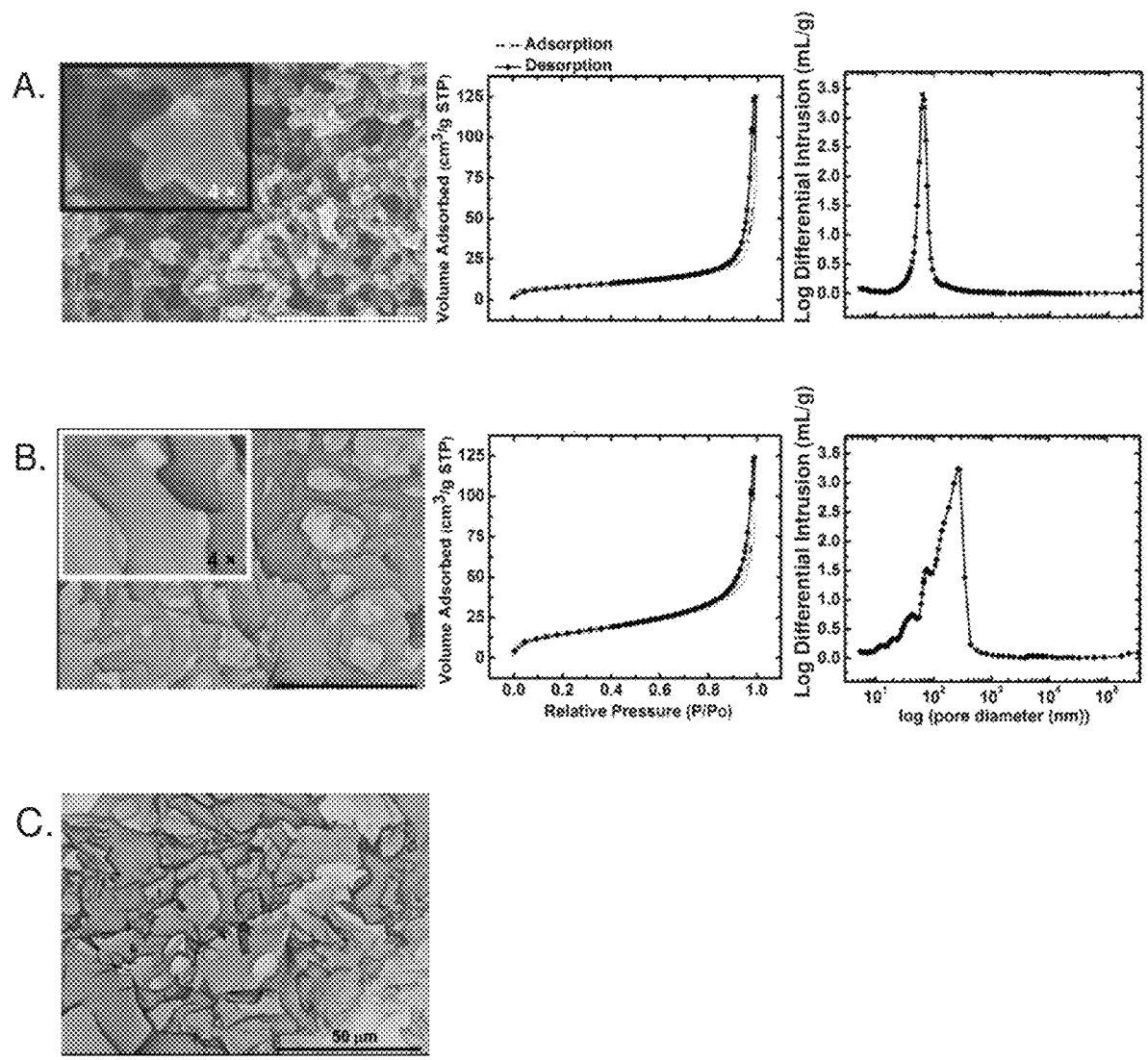
FIG. 12 depicts scanning electron microscopy and $N_2$ sorption data of yet more examples of a polyurethane network in accordance with some embodiments.

SEM shows that fully-aromatic PU aerogels generally appear macroporous (i.e., primarily contain pores>50 nm in diameter) at low densities and eventually turn primarily mesoporous (i.e., primarily contain pores 2-50 nm in diameter) when the concentration of monomer increases in the sol (FIG. 9), whereas the semi-aromatic PU aerogels remain macroporous even at high concentration (FIG. 10). The macroporous-to-mesoporous trend is evident from $N_2$ sorption isotherms. Low-density fully-aromatic as well as semi-aromatic PU aerogels (FIG. 10) show a sharp rise in the adsorption loop above the relative pressure (P/$P_0$) of 0.9 and do not reach saturation; however the presence of narrow hysteresis loops is indicative of the presence of mesoporosity. On the other hand, the adsorption branch of higher density aerogels shows saturation at the condensation point of $N_2$ at (P/$P_0$)≈, 1 which indicates these materials to be mesoporous (FIG. 9) as indicated by the observed type-IV isotherm (as defined by IUPAC). Among the difunctional polyols except RES, all aerogels showed a downward trend in porosity and remain macroporous as density increases. Particularly, the aerogels based on the highly soluble precursor, DHB, were macroporous at high monomer concentrations with porosities much higher than the semi-aromatic-based aerogels (FIG. 11). Because the aL-DHB-25 formulations were collapsed (FIG. 12), it is concluded that the aerogels based on aliphatic PU either phase separate with much larger particles or cannot be dried into aerogels due to their inherent molecular flexibility as already discussed.

BJH plots, which reflect mesoporosity, showed broad distributions for low-density fully-aromatic aerogels, aerogels based on difunctional polyols, and semi-aromatic aerogels. These distributions narrow and fall in the mesoporous regime as density increases. In order to determine the mean pore diameter precisely, the materials showing broader distributions in BJH plots were subjected to Hg porosimetry. Average pore diameters as determined by Hg intrusion (see Table 3) are comparable with those calculated via $4 \times V_{Total}/\sigma$ [where $V_{Total}=(1/\rho_b)-(1/\rho_s)$] obtained from sorptimetry. Combining the average pore diameter of aR-DHB-xx with the features observed by SEM confirms that particles in FIG. 11C are dense with no internal structure. Though the average pore diameter of semi-aromatic PU aerogels by Hg intrusion indicates they are quite mesoporous materials, these data are debatable since the samples undergo a heavy reduction in volume during analysis (Table 4). Since lower density aerogels do not saturate (in $N_2$ absorption), it is more reliable to look at the average pore diameter calculated from $4V/\sigma$ (Table 3), and those values decrease and fall into the mesoporous regime as density increases in accordance with the BJH plots.

Figure 13:
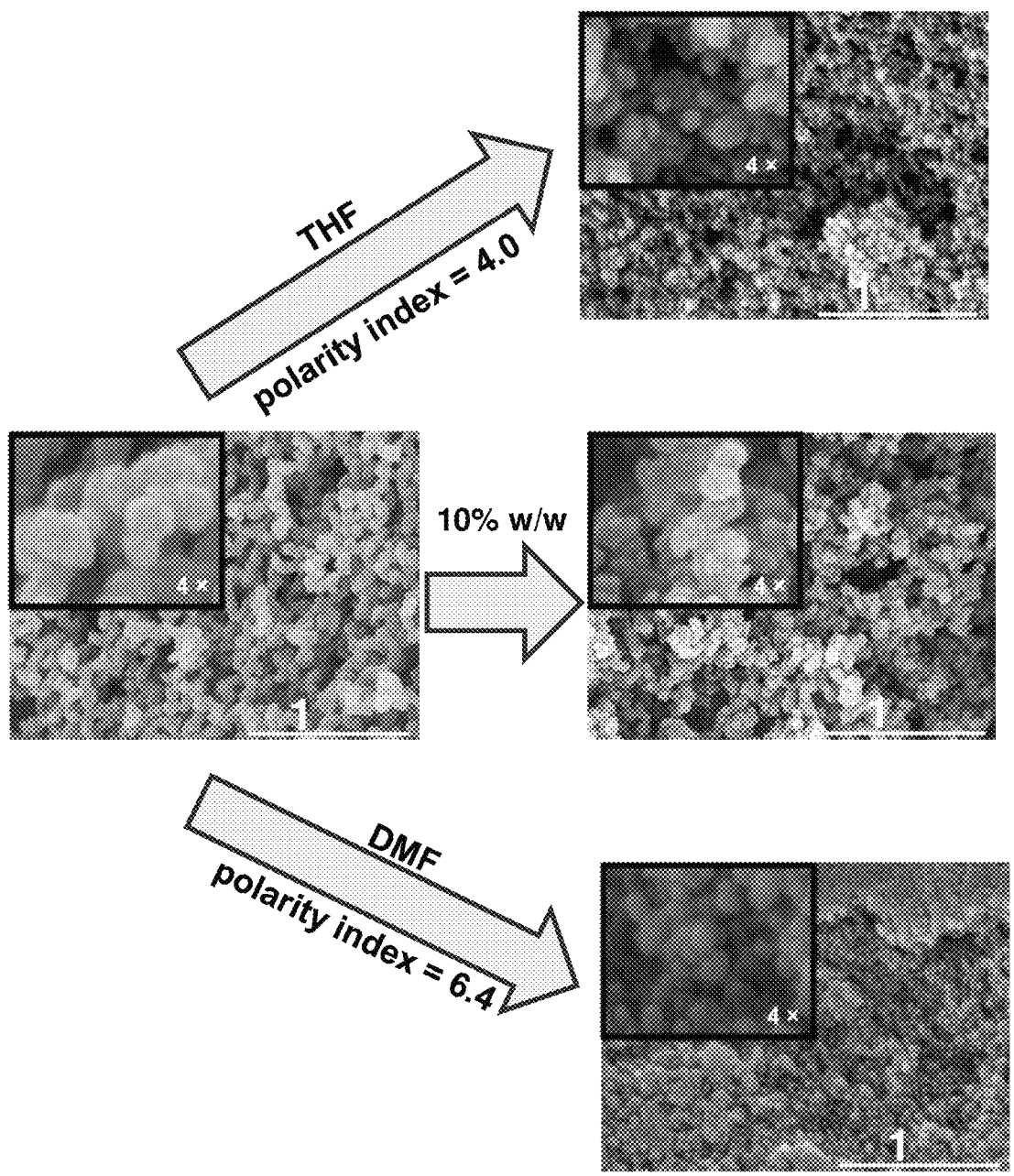
FIG. 13 shows various morphologies of an example of a polyurethane network in acetone as related to concentration and polarity in accordance with some embodiments.

The skeletal framework of all PU aerogels is nanoparticulate except for aR-HPE-5, which shows nanobeads assembled into a fibrous structure. As the concentration of monomer increases in the sol, thereby leading to greater interparticle bonding, the length of fibrils decreases and the network appears to comprise more diffused particles/aggregates, as observed in aR-HPE-10. aR-HPE-5 were also synthesized from THF (polarity index=4) and DMF (polarity index=6.4) using the scheme shown in FIG. 3 showing a nanoparticulate morphology and macroporous pore structure for formulations made in THF, while chemically-identical materials made in DMF appear to have more compact structures rather than the nanobead-like morphology that results when using acetone. Thus it appears the morphology of aR-HPE-5 depends on the polarity of the medium as well as solubility of the PU nanoparticles (FIG. 13). In summary, the crossover from macroporous to mesoporous depends on the assemblies of nanoparticles, which directly relates to the rate of reaction that is dictated by the concentration and nature of monomers. Also, the assembly of nanoparticles can be controlled by the polarity of solvent.

Figure 14:
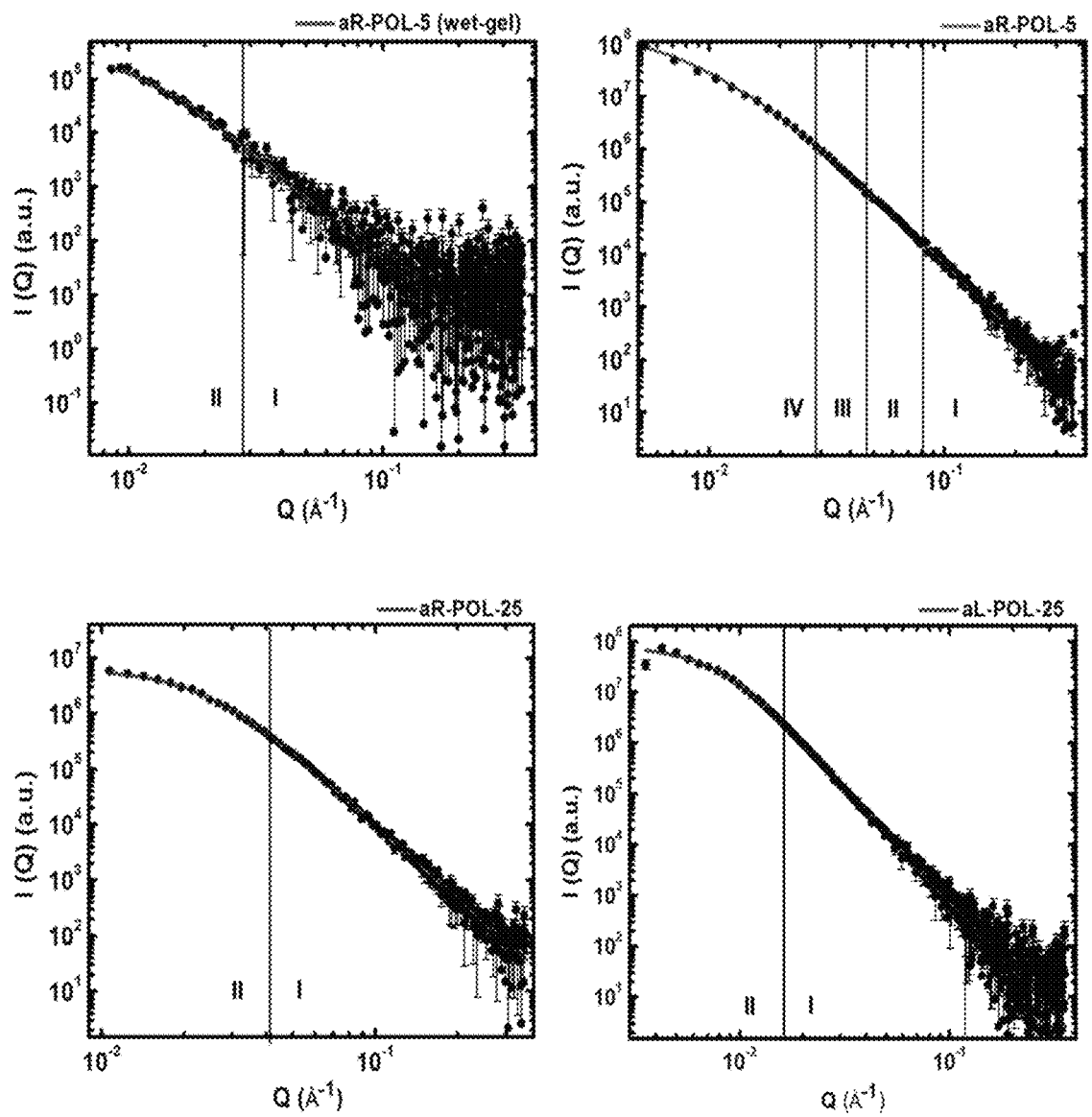
FIG. 14 illustrates small angle X-ray scattering data for examples of a polyurethane network in accordance with some embodiments.

The morphology of a PU aerogel may depend on the surface functional groups of PU nanoparticles. The makeup of skeletal frameworks of PU aerogels were probed quantitatively with SAXS. FIG. 14 shows a typical I vs. Q for aerogels based on POL with both aliphatic and aromatic triisocyanates. The solid lines in the figure are fitted to a unified model (Beaucage), which is used for analyzing data from multiscale structures such as foams. Aerogels of aR-POL-xx display density-dependent multiple length scales. Low-density aerogels (aR-POL-5 and aR-POL-10) show two length scales (region I and III) and two power-law regions (regions II and IV), whereas other materials including semi-aromatic based PU aerogels show one linear region (power-law) and a Guinier knee (attributed to the particle size) either because they might have only one size of particle or higher aggregates are not captured due to instrument limitation. Higher density PU aerogels, in all cases, show a power law exponent>4, which indicate rapidly changing density at the interface, as well as plateau at low-Q region, indicating that elementary building blocks consist of similar-sized particles (FIG. 14, aR-POL-25). From SEM we can clearly observe particles with these sizes (FIG. 9A). Analysis according to the unified model provides the radius of gyration ($R_g$), where for monodisperse spherical particles, $R_g \approx 0.77R$ (where R is the radius of the particles), which is in good agreement with the particle radius calculated from sorptimetry measurements (Table 5).

Although the gelation mechanism is the same, it is noted that the functional group per aromatic ring and the bridging between the aromatic rings have an impact on phase separation and particle size. Since the system has only two variables at a given time (polyol/isocyanate type and monomer concentration), data obtained from SAXS is easily analyzed. Due to high molecular rigidity, the sols based on POL phase separated upon attaining a particular particle diameter (20-40 nm), independent of concentration. A SAXS measurement was performed on an aR-POL-5 wet gel in the presence of acetone, which shows only two regions, as opposed to the four regions observed from aR-POL-5 aerogels (FIG. 14). In a wet gel, the exponent in the power-law region is ≈4 which indicates a sharp (abrupt) interface with a particle radius of (~22 nm). When the gels are dried, they shrink in order to maximize the non-covalent interactions between polymer chains, which makes particles come closer together leading to the fuzzy interface (power law exponent>4) that can be observed from SAXS.

gels have much higher solubility in the system, followed by BPA- and SDP-based Pu aerogels. By combining the gel time with particle radius, it is concluded that aR-HPE-xx and

TABLE 5

SAXS data of PU aerogels

| | Primary Particles | | | Secondary Particles | | | 3 V/σ Particle |
|---|---|---|---|---|---|---|---|
| Formulation | High-Q Slope [a] | $R_G(1)$ [b] (nm) | $R_1$ [c] (nm) | Low-Q Slope [d] | $R_G(1)$ [e] (nm) | $R_2$ [c] (nm) | Radius [f] (nm) |
| aR-POL-5 | 4.29 ± 0.03 | 8.2 ± 2.0 | 10.65 ± 2.59 | 2.45 ± 0.4 | 27.3 ± 6.5 | 35.45 ± 8.44 | 9.15 |
| aR-POL-10 | 4.33 ± 0.03 | 8.8 ± 1.8 | 11.42 ± 2.34 | 2.92 ± 0.4 | 31.5 ± 9.0 | 40.90 ± 11.68 | 9.23 |
| aR-POL-15 | 4.10 ± 0.01 | 15.90 ± 0.24 | 20.65 ± 0.31 | N/A[g] | N/A[g] | N/A[g] | 9.5 |
| aR-POL-20 | 4.30 ± 0.01 | 10.50 ± 0.12 | 13.64 ± 0.15 | N/A[g] | N/A[g] | N/A[g] | 11.22 |
| aR-POL-25 | 4.39 ± 0.02 | 8.10 ± 0.05 | 10.52 ± 0.06 | N/A[g] | N/A[g] | N/A[g] | 9.95 |
| aL-POL-25 | 4.45 ± 0.01 | 24.4 ± 0.3 | 31.69 ± 0.39 | N/A[g] | N/A[g] | N/A[g] | 41 |
| aR-HPE-5 | 4.18 ± 0.01 | 44.60 ± 1.11 | 57.92 ± 1.44 | N/A[g] | N/A[g] | N/A[g] | 18.48 |
| aR-HPE-10 | 4.15 ± 0.01 | 34.1 ± 7.2 | 44.28 ± 9.35 | N/A[g] | N/A[g] | N/A[g] | 14.5 |
| aR-HPE-15 | 4.06 ± 0.01 | 34.2 ± 9.3 | 44.41 ± 12.07 | N/A[g] | N/A[g] | N/A[g] | 13.7 |
| aR-HPE-20 | 4.13 ± 0.01 | 23.6 ± 1.3 | 30.65 ± 1.68 | N/A[g] | N/A[g] | N/A[g] | 12.2 |
| aR-HPE-25 | 4.18 ± 0.01 | 14.5 ± 0.2 | 18.83 ± 0.26 | N/A[g] | N/A[g] | N/A[g] | 10.13 |
| aL-HPE-25 | 4.36 ± 0.01 | 20.8 ± 0.2 | 27.01 ± 0.26 | N/A[g] | N/A[g] | N/A[g] | 24 |
| aR-RES-10 | 4.18 ± 0.02 | 42.8 ± 4.2 | 55.58 ± 5.45 | N/A[g] | N/A[g] | N/A[g] | 69.55 |
| aR-RES-15 | 4.16 ± 0.01 | 30.7 ± 4.5 | 39.87 ± 5.84 | N/A[g] | N/A[g] | N/A[g] | 28.46 |
| aR-RES-20 | 4.11 ± 0.01 | 23.0 ± 1.0 | 29.87 ± 1.29 | N/A[g] | N/A[g] | N/A[g] | 20.86 |
| aR-RES-25 | 4.19 ± 0.01 | 16.8 ± 0.3 | 21.81 ± 0.39 | N/A[g] | N/A[g] | N/A[g] | 19.15 |
| aL-RES-25 | 4.5 ± 0.01 | | | N/A[g] | N/A[g] | N/A[g] | |
| aR-SDP-10 | 4.25 ± 0.02 | 75.5 ± 2.10 | 98.05 ± 2.72 | N/A[g] | N/A[g] | N/A[g] | 812 |
| aR-SDP-15 | 4.29 ± 0.02 | 68.9 ± 9.8 | 89.48 ± 12.72 | N/A[g] | N/A[g] | N/A[g] | 569 |
| aR-SDP-20 | 4.28 ± 0.02 | 53.8 ± 2.5 | 69.87 ± 3.25 | N/A[g] | N/A[g] | N/A[g] | 252 |
| aR-SDP-25 | 2.78 ± 0.01 | 32.3 ± 0.7 | 41.95 ± 0.90 | N/A[g] | N/A[g] | N/A[g] | 74 |
| aL-SDP-25 | 4.42 ± 0.01 | 33.2 ± 0.6 | 43.12 ± 0.78 | N/A[g] | N/A[g] | N/A[g] | 81 |
| aR-BPA-10 | | | | N/A[g] | N/A[g] | N/A[g] | 2443 |
| aR-BPA-15 | 4.29 ± 0.03 | | | N/A[g] | N/A[g] | N/A[g] | 2419 |
| aR-BPA-20 | 4.20 ± 0.02 | 61.3 ± 3.95 | 79.61 ± 5.12 | N/A[g] | N/A[g] | N/A[g] | 536 |
| aR-BPA-25 | 4.20 ± 0.01 | 34.3 ± 1.0 | 44.55 ± 1.30 | N/A[g] | N/A[g] | N/A[g] | 49.5 |
| aL-BPA-25 | 4.29 ± 0.01 | 34.9 ± 0.3 | 45.32 ± 0.39 | N/A[g] | N/A[g] | N/A[g] | 43 |
| aR-DHB-15 | 4.65 ± 0.04 | | | N/A[g] | N/A[g] | N/A[g] | |
| aR-DHB-20 | 4.20 ± 0.03 | 62.1 ± 2.2 | 80.65 ± 2.85 | N/A[g] | N/A[g] | N/A[g] | |
| aR-DHB-25 | 4.35 ± 0.03 | 64.5 ± 8.6 | 83.76 ± 11.16 | N/A[g] | N/A[g] | N/A[g] | |
| aL-DHB-25 | | | | N/A[g] | N/A[g] | N/A[g] | |

Referring to FIG. 11:
[a] From power-law Region I.
[b] From Guinier Region II.
[c] Particle radius = $R_g/0.77$.
[d] From power-law Region III.
[e] From Guinier Region IV.
[f] From Table 3 & 4.
[g] Larger than can be resolved by SAXS.

In region III of aR-POL-5, the power law exponent is >3, indicating surface fractals with fractal dimension $D_s=2.45\pm0.4$ with a particle diameter of ~70 nm. As we move to the next density analyzed (aR-POL-10), the region III exponent increases and falls at the limit between mass and surface fractals. With the region III slope being attributed to surface fractals with $D_s=2.92$ (Table 5), secondary particles of aR-POL-10 are then classified as surface fractal closed-packed objects. As the monomer concentration in the sol increases, we can see the plateau at the low-Q region. The gel time depends on the percolation threshold, which itself directly depends on the concentration of the monomers in the sol, but this behavior clearly supports the hypothesis that functional group on aromatic rings with more than one functional group react slower in comparison to functional groups on aromatic rings containing only one functional group. In all of the other polyols, particle size is inversely proportional to the monomer concentration in the sol, but notably aR-DHB-xx phase separated with large similarly-sized primary particles, indicating that DHB-based PU aeroaR-SDP-xx are highly reactive and their phase separation is faster when compared to other PUs. Jointly considering the chemical and microscopic characterizations together, the structure of PU aerogels seems to be controlled by the nature of the monomer (aliphatic or aromatic), number of functional groups on the monomer, and the presence of and degree of bridging between the aromatic rings. It is informative to categorize PU aerogels into groups and compare; first we examine PU aerogels based on SDP, BPA, and DHB synthesized from both N3300A and TIPM. The synthesized PU nanoparticles from the above monomers are more soluble in the system and phase separate with larger particles (a monomer-cluster-growth-like process), hence, the overall smoother microstructure observed in SEM and the very small BET surface areas. When the polyol monomer is the semi-rigid RES, fully-aromatic PU aerogels phase separate with lower particle sizes than for other difunctional polyols. When the monomer concentration rises, the concentration of nanoparticles may lead to a diffusion-limited cluster-cluster aggregation mechanism and the structure becomes nanoparticulate (FIG. 9C) where formulations with aliphatic isocyanates tend to "collapse," as can be clearly observed by both SEM as well as a lack of BET surface area (Table 3). Triisocyanates and triol (POL and HPE) develop a 3D molecular structure, leading to phase separation with much smaller particles.

In the case of aR-HPE-xx, the evolution of microstructure with increasing density can be explained by fast addition reactions, which fill the sols with primary particles that react with their neighbors in a way that can be described with a bond percolation model. Growth of the secondary particles of aR-HPE-5, which assemble into organized structures (string-like), would be expected to proceed via a reaction-limited cluster aggregation mechanism. The $D_f$ value observed from rheology also supports this observation. For both high-density aR-HPE-xx and aR-POL-xx, the polymer solubility is low, and the fast rise in the concentration of PU nanoparticles leads to a diffusion-limited cluster-cluster aggregation mechanism making the structure progressively more nanoparticulate in a morphology reminiscent of nanostructured silica networks. Additionally, the fractal dimensions of the particles comprising the gel network, as identified by rheology (Table 2, 2.2-2.4), suggest that the gel network is formed by the higher aggregates of secondary particles (mass fractals).

Application-Related Bulk Properties.

Polyurethane (PU) materials have become increasingly important among organic polymer materials for technological applications including biomedical implants, engineering materials, electronics, and coatings in the form of elastomers, rigid and flexible foams, adherent films, powders, and adhesives. As already discussed, polymeric aerogels may be useful as alternatives to polymer cross-linked aerogels for their mechanical properties, thermal insulation, and conversion to porous carbons with applications as electrodes, supercapacitors, and catalyst supports. Unlike previous studies of PU-containing aerogels, in this disclosure the inventors combine the structure of PU at the molecular, nanoscopic, and microscopic level with the inherent properties of resulting PU aerogels and networks. In that regard, the synthesized PU networks were evaluated for compressive stiffness (quantified by Young's modulus, E), compressive yield strength at 0.2% offset strain, ultimate compressive strength at maximum strain (UCS), toughness (T, quantified by the specific energy absorption) under quasi-static compression (i.e. low strain rates), and toughness under high strain rates using the Split-Hopkinson pressure bar test (SHPB). The stress-strain curves of various PU samples (FIG. 15) show very short, almost elastic ranges up to ~3% strain and then exhibit plastic deformation until about 70% compressive strain, followed by densification and inelastic hardening similar to other organic aerogels and polymer-crosslinked silica aerogels under both quasi-static compression and SHPB. Aromatic PU samples do not buckle during quasi-static compression and ultimately break into fragments once their pores have been substantially closed and the samples start to expand radially. Robust formulations of aromatic-based aerogels were also subjected to compression under high strain rate (SHPB). Results of these measurements are summarized in Table 8.

As expected, PU networks of the present invention appear stiffer under dynamic loading conditions and at higher strain rates as the Young's modulus of polymers increases with increase in strain rate. Contradicting the behavior of porous materials under dynamic loading conditions at higher strain rates, some of the PU-based networks have lower ultimate strength and specific energy absorption compared to those obtained under quasi-static compression. This behavior of PU networks under higher strain rate can be explained by their failure mode. Under quasi-static compression, PU networks fail by shattering in fragments with maximum strain, while under dynamic loading they seem to hold themselves together (FIG. 15E). Specifically the Young's modulus follows a power law relationship (FIG. 16A) and the sensitivity is summarized in Table 6 for both SHPB and quasi-static testing.

TABLE 6

Exponent of Young's modulus of PU aerogels as a function of bulk density from both quasi-static compression and at a higher strain rate (SHPB)

| Sample Family | Sensitivity (X)[E ≈ $(\rho_b)^x$] | |
|---|---|---|
| | Quasi-Static | SHPB |
| aR-POL-xx | 3.73 ± 0.35 | 4.00 ± 0.27 |
| aR-HPE-xx | 5.16 ± 1.13 | 4.74 ± 0.13 |
| aR-RES-xx | 3.49 ± 0.02 | 3.62 ± 0.02 |
| aR-SDP-xx | 6.57 ± 1.36 | |
| aR-BPA-xx | 7.75 ± 1.59 | |
| aR-DHB-xx | 4.25 ± 1.41 | |

Figure 16:
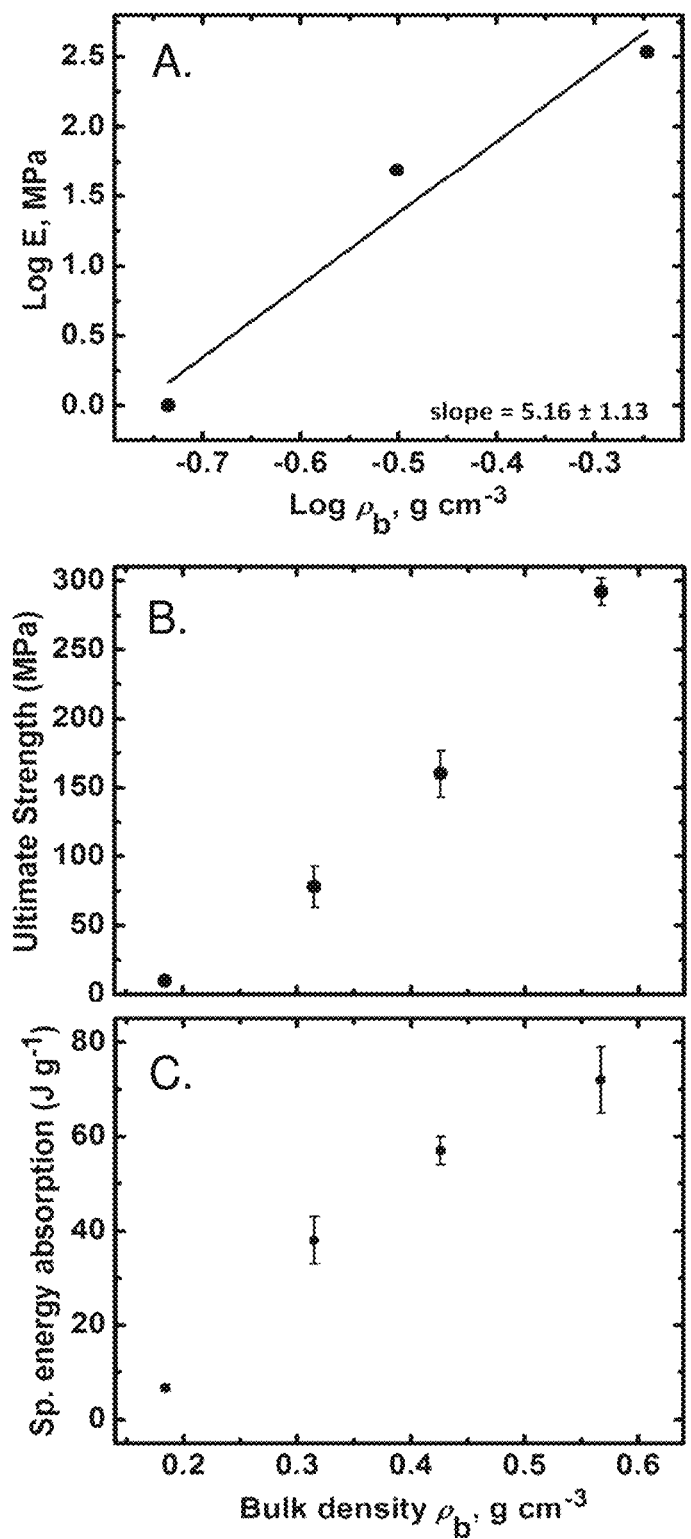
FIG. 16 shows plots of the Young's modulus, ultimate compressive strength, and energy absorption versus bulk density for an example of a polyurethane network in accordance with some embodiments.

The sensitivity (exponent) is higher than that observed with other reported organic aerogels, as well as that of polymer-crosslinked silica. This signifies the importance of interparticle bridging, which is higher for networks based on SDP, BPA, and DHB, indicating that the mechanical properties of these aerogels are dependent on pore structure and morphology. We can conclude that the nature of the pores as a function of density is given by the high exponent. Unlike other PUs, rigid the ultimate strain of aR-POL-xx formulations is a function of porosity. The Young's modulus (E calculated from the slope of the early elastic range), the speed of sound (calculated from the Young's modulus and the bulk density via $(E/\rho_b)^{0.5}$), and the yield stress at 0.2% offset strain all increase as bulk density increases. In case of aR-POL-xx, the ultimate strength, as well as the ability for the material to store energy (toughness), vary non-monotonically with density: as shown in FIGS. 16A-16C, both values increase with density initially then reach a maximum and afterward decline. Both 3v/σ and SAXS (Table 5) shows that the particle diameter of aR-POL-xx is roughly independent of the density. From SEM, it can be seen that the number of contacts per particle increases with increasing density, which is not reflected in the quasi-static compression of aR-POL-25. This is due to the filling of pores achieved at low strain. However, the energy of absorption of aR-POL-25 is higher than the aR-POL-20 when normalized for density (64 J cm$^{-3}$ vs. 55 J cm$^{-3}$). As the composition of the network transitions from fully aromatic to semi-aromatic PU, the Young's modulus, toughness, and ultimate stress decrease for the rigid monomer POL but increase when the number of functional groups per aromatic ring is reduced. Since it is reasonable to compare aL-POL-25 with aR-POL-20 since they have similar monomer concentrations (see Experimental Details, Tables 10 & 11) it can be observed (from Table 7) that there is not much change in the ultimate stress between these two network formulations.

Figure 15:
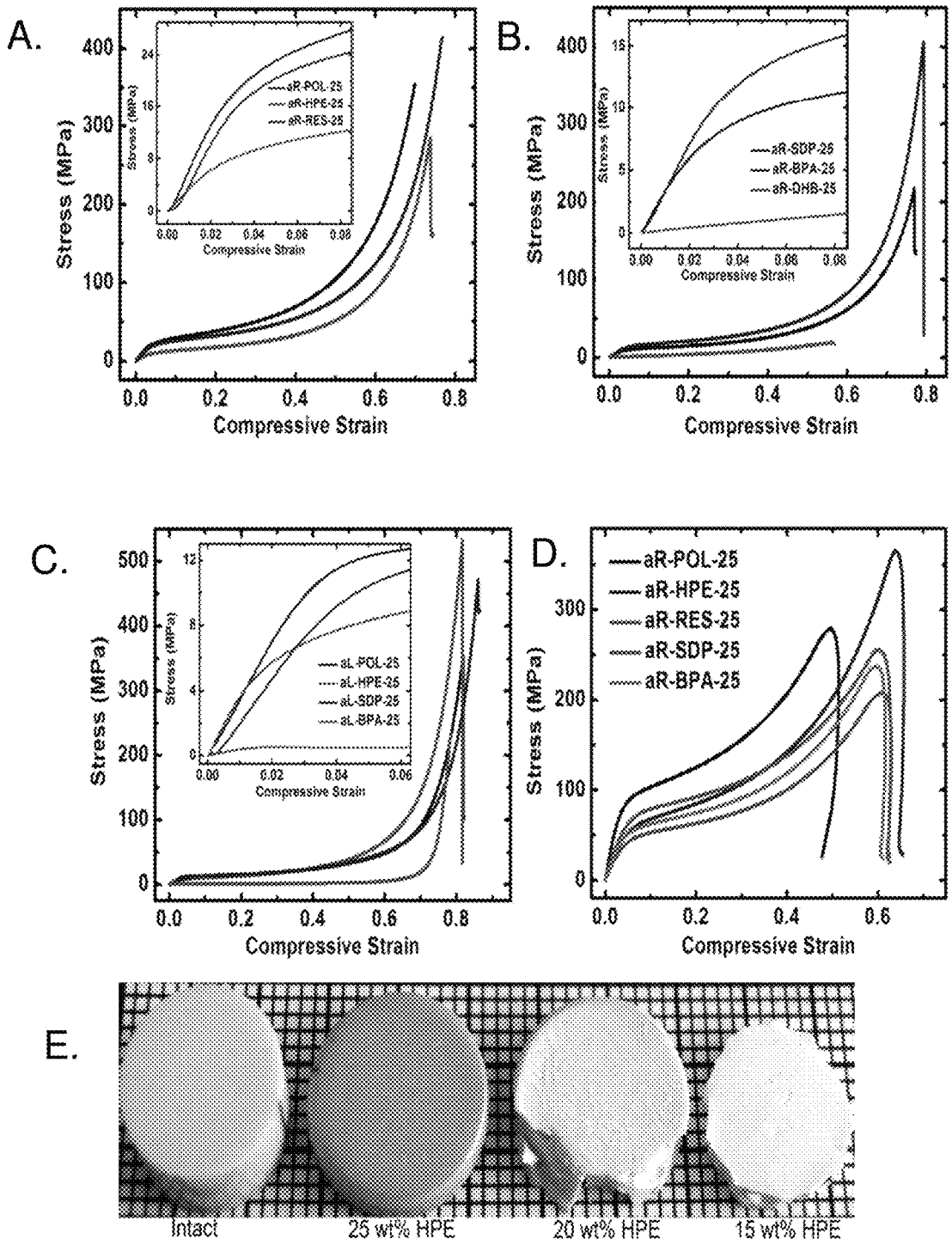
FIG. 15 shows stress-strain curves of examples of a polyurethane network and photographs before and after dynamic compression in accordance with some embodiments.
Figure 17:
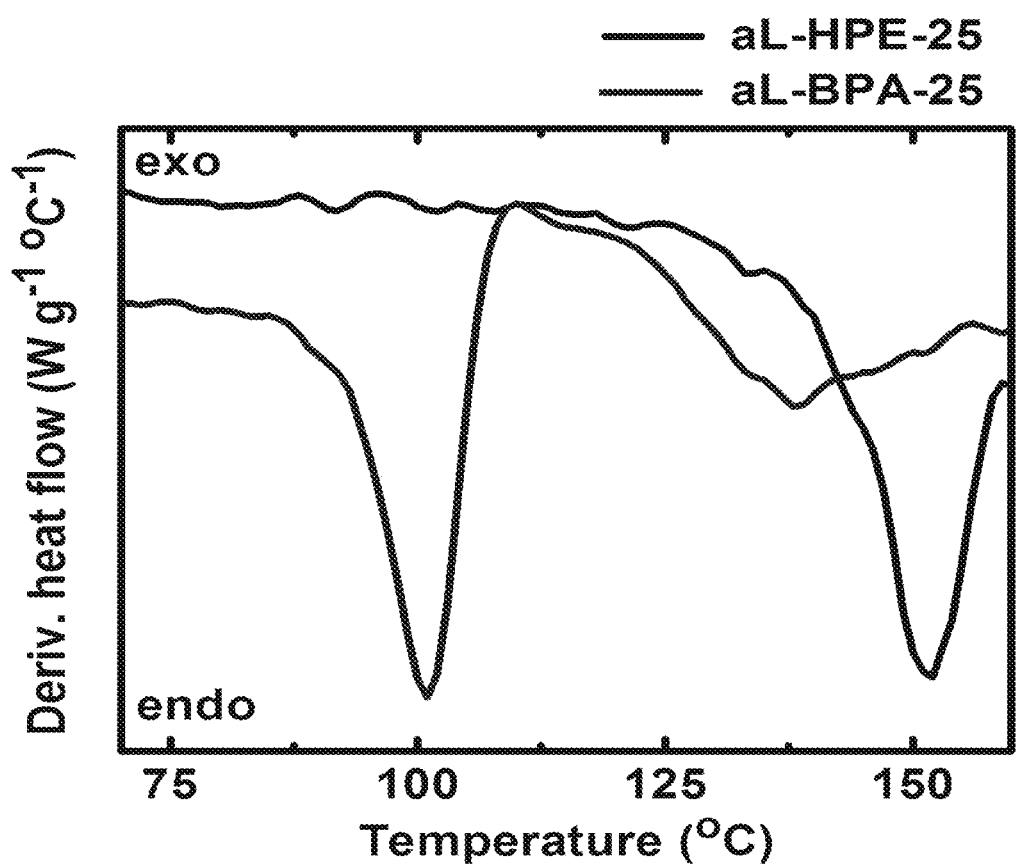
FIG. 17 illustrates modulated differential scanning calorimetry thermogram under $N_2$ at 10° C. $min^{-1}$ showing the Tg as a function of crosslinking density in accordance with some embodiments.

The highest ultimate strain was observed with semi-aromatic PU aerogels. This increase in the ultimate strain of semi-aromatic PU aerogels can be explained by their failure mechanism; N3300A-based materials do not shatter into fragments but instead act similarly to polyurea and polymer-crosslinked vanadia aerogels. Upon compression, the stress (pressure) is converted into thermal energy and causes local softening of the polymer. The glass transition temperature ($T_g$) of N3300A-based PU is between 100° C.-150° C. depending on polyol used (FIG. 17). Once the $T_g$ is attained, softening of the PU nanoparticle leads to absorbance of PU into its own pores and only at the final stage of compression where all of the pores are nearly close-packed does the material grow radially and shatter. More insight is provided by considering the case of other semi-aromatic PU aerogels based on monomers such as HPE, SDP, and BPA (FIG. 15). Except aL-BPA-25, the mechanical properties achieved with semi-aromatic-PU networks surpass aromatic-PU networks, making these materials suitable for ballistic applications. With their aromatic counterparts, they follow a trend similar to aR-POL-xx, where all mechanical properties monotonically vary with density.

Figure 18:
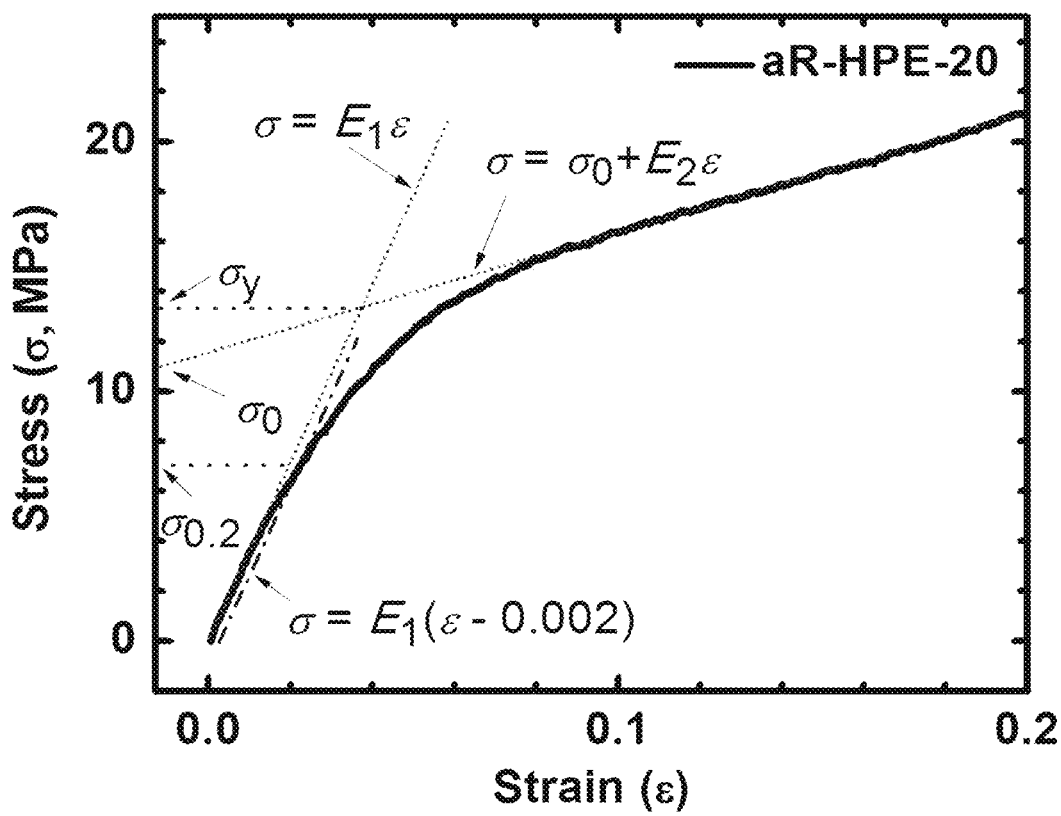
FIG. 18 shows stress strain curves from dynamic compression for examples of a polyurethane network in accordance with some embodiments.

It is noted that the yield strength of aR-HPE-20 is low, similar to what is observed in SHPB. By looking at the energy absorption and ultimate strength, an alternate approach for considering this value is presented. FIG. 18 shows a linear elastic region of aR-HPE-20 from SHPB, and upon inspection of the intersection of the tangent lines emanating from the loading portion in the elastic range and the hardening portion in the plastic deformation stage, as well as the 0.2% offset yield strength, the inventors define a new yield strength ($\sigma_y$), specifically for aerogel and other porous network materials. Here, the initial plastic hardening stage can be considered linear plastic following $\sigma=\sigma_0+E_2\varepsilon$ and the linear elastic stage following $\sigma=E_1\varepsilon$, where $E_1$ is the Young's modulus in the elastic stage, $E_2$ is the plastic modulus in the hardened stage, and $\sigma_0$ is the intercept stress for the linear plastic stage. The yield strength represents the preconsolidation pressure, a similar definition of compression as used in soil mechanics. This new yield strength value is calculated for the materials tested under SHPB (Table 8), which increases with increasing density. For aR-RES-xx networks, the higher density networks recorded high ultimate strength and energy absorption compared to aR-POL-xx upon quasi-static compression.

These impressive mechanical properties can be correlated to the pore diameter and particle size of the aerogels/networks. Upon comparison, similar-density aR-RES-xx formulations have particle sizes (Table 5) and pore sizes (Table 3) two times greater than the rigid aR-POL-xx formulations, which can be attributed to the lesser number of particles and large volume of pores per unit volume, also reflected in the ultimate strain and in the higher ultimate strength and energy absorption of the aR-RES-xx formulations. From SEM, the high density aR-RES-xx based aerogels/networks have wider interparticle necks connecting the particles, again explaining the high strength of these materials.

Overall, it can be concluded that the mechanical properties of PU aerogels and networks depends on the initial monomers. The stiffness and yield strength depend highly on monomer rigidity. On the other hand, ultimate strain, and therefore ultimate strength and energy absorption, is controlled by the flexibility of the monomers, as reflected in semi-aromatic PU aerogels.

Owing to their macroporosities, low-density aerogels and networks from both SDP and BPA (10 and 15%) as well as all densities of aR-DHB-xx should be excellent acoustic attenuators as indicated from the empirical calculation of speed of sound from the square root of compressive modulus over bulk density $(E/\rho)^{1/2}$ in these materials. Additionally, due to their high flexibility, lower-density PU aerogels, especially aR-HPE-5, aR-HPE-10, and aR-SDP-10, can be used as lightweight flexible insulation for clothing and can be used as a backing material for padding thanks to their ability to flex with the body. Flexible aerogels are also desirable for insulation that can be wrapped around structures such as cryotanks, cryogenic transfer lines, boilers, and pipes. Another possible use for flexible aerogels includes application in an inflatable decelerator for slowing spacecraft upon reentry, descent, and landing.

TABLE 7

Mechanical characterization data under quasi-static compression at room (23° C.) temperature of polyurethane (PU) aerogels

| Sample | Bulk Density ($\rho_b$, g cm$^{-3}$) (UCS, MPa) | Strain Rate (s$^{-1}$) | Young's Modulus (E, MPa) | Speed of Sound (m s$^{-1}$) | Yield Stress at 0.2% Offset Strain (MPa) | Ultimate Strength (MPa) | Ultimate Strain (%) | Specific Energy Abs. (T, J g$^{-1}$) |
|---|---|---|---|---|---|---|---|---|
| aR-POL-xx | | | | | | | | |
| aR-POL-5 | 0.159 ± 0.006 | 0.006 | — | | | 11.3 ± 4.5 | 80 ± 4 | 10 ± 4 |
| aR-POL-10 | 0.298 ± 0.004 | 0.006 | 22.7 ± 1.2 | 276 | 0.27 ± 0.04 | 57 ± 7 | 76 ± 2 | 28 ± 1 |
| aR-POL-15 | 0.477 ± 0.008 | 0.006 | 203 ± 4 | 652 | 3.42 ± 0.97 | 247 ± 4 | 76 ± 1 | 68 ± 10 |
| aR-POL-20 | 0.640 ± 0.010 | 0.006 | 447 ± 12 | 836 | 9.10 ± 0.14 | 360 ± 18 | 76 ± 0 | 86 ± 7 |
| aR-POL-25 | 0.760 ± 0.050 | 0.006 | 750 ± 0 | 993 | 14.00 ± 1.32 | 342 ± 10 | 69 ± 1 | 84 ± 2 |
| aL-POL-xx | | | | | | | | |
| aL-POL-25 | 0.652 ± 0.028 | 0.006 | 380 ± 28 | 763 | 10.06 ± 0.64 | 339 ± 23 | 84 ± 1 | 66 ± 1 |
| aR-HPE-xx | | | | | | | | |
| aR-HPE-10 | 0.184 ± 0.007 | 0.005 | 1.0 ± 0.2 | 74 | 0.04 ± 0.01 | 10 ± 1 | 75 ± 0 | 6.7 ± 0.7 |
| aR-HPE-15 | 0.315 ± 0.003 | 0.005 | 48.8 ± 1.8 | 394 | 0.72 ± 0.10 | 78 ± 15 | 79 ± 1 | 38 ± 5 |
| aR-HPE-20 | 0.426 ± 0.008 | 0.005 | 1.4 ± 0.0 | 57 | | 160 ± 17 | 75 ± 1 | 57 ± 3 |
| aR-HPE-25 | 0.567 ± 0.002 | 0.005 | 343 ± 12 | 778 | 5.25 ± 1.09 | 292 ± 10 | 74 ± 1 | 72 ± 7 |
| aL-HPE-xx | | | | | | | | |
| aL-HPE-25 | 0.563 ± 0.004 | 0.006 | 363 ± 18 | 803 | 5.50 ± 0.70 | 505 ± 40 | 82 ± 1 | 103 ± 3 |
| aR-RES-xx | | | | | | | | |
| aR-RES-10 | 0.244 ± 0.005 | 0.005 | — | | | 14 ± 1 | 68 ± 5 | 14.54 ± |
| aR-RES-15 | 0.404 ± 0.001 | 0.005 | 108 ± 12 | 517 | 2.75 ± 0.48 | 204 ± 5 | 82 ± 1 | 59 ± 10 |

TABLE 7-continued

Mechanical characterization data under quasi-static compression at room (23° C.) temperature of polyurethane (PU) aerogels

| Sample | Bulk Density ($\rho_b$, g cm$^{-3}$) (UCS, MPa) | Strain Rate (s$^{-1}$) | Young's Modulus (E, MPa) | Speed of Sound (m s$^{-1}$) | Yield Stress at 0.2% Offset Strain (MPa) | Ultimate Strength (MPa) | Ultimate Strain (%) | Specific Energy Abs. (T, J g$^{-1}$) |
|---|---|---|---|---|---|---|---|---|
| aR-RES-20 | 0.565 ± 0.004 | 0.005 | 390 ± 14 | 831 | 6.05 ± 0.77 | 313 ± 10 | 76 ± 3 | 77 ± 6 |
| aR-RES-25 | 0.680 ± 0.003 | 0.005 | 650 ± 0 | 978 | 13.75 ± 1.06 | 390 ± 24 | 77 ± 1 | 102 ± 10 |
| aR-SDP-xx | | | | | | | | |
| aR-SDP-15 | 0.307 ± 0.007 | 0.006 | 8.7 ± 1.5 | 168 | 0.24 ± 0.01 | 15 ± 3 | 71 ± 1 | 8.8 ± 0.7 |
| aR-SDP-20 | 0.422 ± 0.003 | 0.006 | 133 ± 6 | 561 | 2.63 ± 0.40 | 85 ± 14 | 74 ± 2 | 37 ± 3 |
| aR-SDP-25 | 0.541 ± 0.004 | 0.005 | 340 ± 17 | 793 | 5.50 ± 1.50 | 200 ± 18 | 76 ± 2 | 61 ± 6 |
| aL-SDP-xx | | | | | | | | |
| aL-SDP-25 | 0.639 ± 0.005 | 0.006 | 315 ± 15 | 702 | 4.93 ± 0.23 | 493 ± 30 | 85 ± 2 | 91 ± 6 |
| aR-BPA-xx | | | | | | | | |
| aR-BPA-15 | 0.293 ± 0.005 | 0.005 | 3.0 ± 0.7 | 101 | 0.12 ± 0.01 | 4.6 ± 0.5 | 60 ± 1 | 3.2 ± 0.5 |
| aR-BPA-20 | 0.460 ± 0.002 | 0.005 | 220 ± 17 | 692 | 5.83 ± 0.40 | 214 ± 16 | 79 ± 1 | 81 ± 8 |
| aR-BPA-25 | 0.567 ± 0.005 | 0.005 | 400 ± 0 | 840 | 9.88 ± 0.53 | 396 ± 30 | 80 ± 1 | 98 ± 6 |
| aL-BPA-xx | | | | | | | | |
| aL-BPA-25 | 0.160 ± 0.013 | 0.003 | 49 ± 9 | 553 | 0.58 ± 0.08 | 230 ± 8 | 76 ± 3 | 55 ± 1 |
| aR-DHB-xx | | | | | | | | |
| aR-DHB-15 | 0.243 ± 0.009 | 0.005 | 1.2 ± 0.2 | 70 | 0.07 ± 0.01 | 0.70 ± 0.07 | 52 ± 4 | 0.75 ± 0.03 |
| aR-DHB-20 | 0.309 ± 0.003 | 0.005 | 7 ± 2 | 151 | 0.25 ± 0.04 | 5.6 ± 0.7 | 59 ± 3 | 4.2 ± 0.8 |
| aR-DHB-25 | 0.432 ± 0.007 | 0.005 | 15 ± 1 | 186 | 0.85 ± 0.02 | 17.5 ± 1.5 | 57 ± 2 | 8.9 ± 0.8 |

TABLE 8

Compression data at room (23° C.) temperature for selected formulations of polyurethane (PU) aerogels at high strain rates

| bulk density ($\rho_b$, g cm$^{-3}$) | strain rate (s$^{-1}$) | Youngs modulus ($E_1$, MPa) | plastic modulus ($E_2$, MPa) | yield ($\sigma_{0.2}$, MPa) | yield ($\sigma_y$, MPa) | ultimate strength (MPa) | ultimate strain (%) | intercept ($\sigma_0$, MPa) | sp. energy absorption (J/g) |
|---|---|---|---|---|---|---|---|---|---|
| aR-POL-xx | | | | | | | | | |
| 0.298 ± 0.004 | 1491 ± 257 | 37 ± 3 | 16 ± 2 | 2.7 ± 1.1 | 2.8 ± 1.1 | 149 ± 86 | 84 ± 4 | 1.1 ± 0.6 | 71 ± 6 |
| 0.477 ± 0.008 | 1220 ± 168 | 325 ± 8 | 60 ± 1 | 10.3 ± 1.0 | 13.4 ± 1.2 | 142 ± 60 | 69 ± 5 | 10.9 ± 1.1 | 69 ± 3 |
| 0.640 ± 0.010 | 1053 ± 75 | 855 ± 23 | 123 ± 18 | 30 ± 1 | 40 ± 2 | 181 ± 45 | 56 ± 3 | 34 ± 1 | 68 ± 9 |
| 0.760 ± 0.050 | 969 ± 39 | 2224 ± 437 | 171 ± 12 | 48 ± 8 | 71 ± 9 | 224 ± 30 | 50 ± 1 | 66 ± 9 | 74 ± 10 |
| aR-HPE-xx | | | | | | | | | |
| 0.315 ± 0.003 | 1121 ± 41 | 99 ± 12 | 24 ± 3 | 3.7 ± 0.4 | 4.6 ± 0.5 | 55 ± 9 | 74 ± 3 | 3.4 ± 0.4 | 43 ± 5 |
| 0.426 ± 0.008 | 1139 ± 61 | 342 ± 20 | 47 ± 3 | 8.9 ± 0.6 | 13.5 ± 0.9 | 109 ± 19 | 65 ± 4 | 11.7 ± 0.8 | 61 ± 4 |
| 0.567 ± 0.002 | 1218 ± 114 | 708 ± 27 | 85 ± 3 | 19 ± 1 | 31 ± 1 | 187 ± 29 | 64 ± 3 | 26.4 ± 1.2 | 89 ± 3 |
| aR-RES-xx | | | | | | | | | |
| 0.404 ± 0.001 | 1132 ± 90 | 248 ± 68 | 41 ± 11 | 9 ± 2 | 11.4 ± 2.5 | 101 ± 21 | 68 ± 4 | 10.1 ± 2.2 | 59 ± 14 |
| 0.565 ± 0.004 | 1064 ± 53 | 697 ± 65 | 73 ± 7 | 21 ± 2 | 30 ± 2 | 137 ± 20 | 63 ± 1 | 27 ± 2 | 67 ± 6 |
| 0.680 ± 0.003 | 1095 ± 82 | 1145 ± 129 | 88 ± 10 | 30 ± 3 | 48 ± 5 | 172 ± 39 | 60 ± 2 | 45 ± 4 | 75 ± 8 |
| aR-SDP-xx | | | | | | | | | |
| 0.422 ± 0.003 | 1196 ± 24 | 270 ± 32 | 29 ± 3 | 8.2 ± 0.6 | 11.4 ± 0.8 | 86 ± 11 | 75 ± 1 | 10.1 ± 0.7 | 55 ± 6 |
| 0.541 ± 0.004 | 1036 ± 60 | 695 ± 75 | 60 ± 7 | 19 ± 2 | 27 ± 3 | 123 ± 21 | 61 ± 3 | 25 ± 3 | 56 ± 6 |
| aR-BPA-xx | | | | | | | | | |
| 0.460 ± 0.002 | 1143 ± 38 | 116 ± 14 | 42 ± 5 | 4.2 ± 0.4 | 5.4 ± 0.5 | 68 ± 5 | 77 ± 2 | 3.3 ± 0.3 | 41 ± 2 |
| 0.567 ± 0.005 | 1049 ± 82 | 857 ± 22 | 74 ± 2 | 22.5 ± 0.2 | 34.1 ± 0.3 | 146 ± 21 | 60 ± 3 | 31.1 ± 0.3 | 64 ± 2 |

Figure 19:
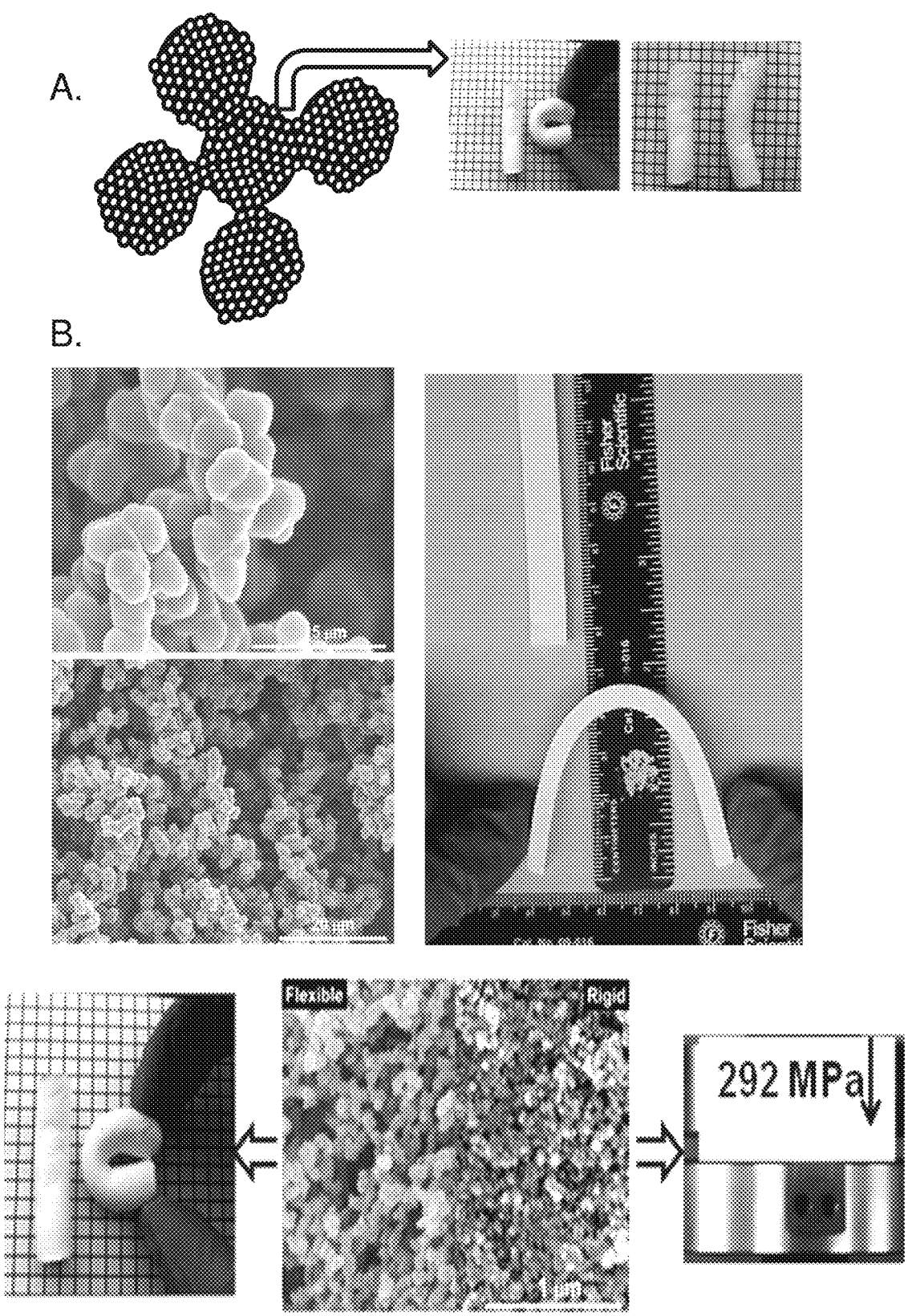
FIG. 19 depicts flexibility of examples of polyurethane networks as related to nanomorphology and interparticle connectivity in accordance with some embodiments.

The flexibility of PU aerogels, in several instances, is dependent on the monomer, crosslinking density, and the way in which the constituent nanoparticles assemble. Both HPE and SDP have only one functional group per aromatic ring making aR-HPE-xx and aR-SDP-xx macroporous at low monomer concentrations with nanomorphologies that facilitate their flexing mechanism. As nanoparticles in aR-SDP-10 phase separate with smoother primary particles possessing a radius of ~90 nm (by SAXS) and the fact that SAXS is unable to resolve secondary particles in this formulation indicates that in this formulation particles diffuse into one another and make the material more like an open-pore macrocellular PU foams. At the time of flexing, there is no distinct interparticle neck between two particles, which reduces the friction that leads to brittleness when bending some samples. On the other hand, in aR-HPE-5, the nanoparticles assemble into a string of nanobeads. In this configuration, the nanoparticles can develop multiple contacts at the joints between two strings and make the neck wider and stronger as depicted with solid circles in FIG. 19. When the material is bent, the nanoparticles squeeze into one another making the neck wider and preventing chipping off of network material arising from the flexible nature of the ester linkages as depicted in FIG. 19. Overall, it can be clearly observed that this new flexible capability is possible because of high porosity (refer to Table 3), a special aggregation mechanism, compliant stiffness, and the flexibility of the urethane linkage.

In summary, the mechanical properties of PU aerogels and networks can be tailored easily by selectively choosing the monomers. Many PU aerogels and networks possess high strength and their high energy-absorbing and acoustic attenuation properties make them suitable for various structural and transportation applications. Due to their high flexibility, flexible nanostructured PU networks fabricated into a film can find applications as backing materials for protective clothing including defense applications.

Thermal Conductivity ($\lambda$).

The thermal diffusivity was measured using a flash method (see the Experimental Section), where the sample is heated from one side and the temperature rise is observed as a function of time on the other side. The thermal conductivities were calculated from the thermal diffusivity (R) and the heat capacity ($c_P$) of PU aerogel/network discs ~2.0-3.0 mm thick, using the following equation, $$\lambda = \rho_b \times c_P \times R$$

Samples were coated with gold and carbon on both faces to minimize radiative heat transfer and ensure complete absorption of the heat pulse. Typical data from the instrument are shown in the FIG. 20A. Data have been fitted with the pulse-corrected Cowan model to approximate the heat-transfer equation, using an initial value for the thermal diffusivity estimated using the time it takes for the detector voltage to reach its half-maximum value (marked with a dashed reference line and indicated by $t_{50}$ in FIG. 20A). Table 9 summarizes the data.

TABLE 9

Thermal conductivity data of polyurethane (PU) aerogels at 23° C. from laser flash method.

| Bulk Density ($\rho_b$, g cm$^{-3}$) | Heat Capacity ($c_P$, J g$^{-1}$ K$^{-1}$) | Thermal Diffusivity (R, mm$^2$ s$^{-1}$) | Thermal Conductivity ($\lambda$, W m$^{-1}$ K$^{-1}$) |
|---|---|---|---|
| aR-POL-xx | | | |
| 0.159 ± 0.006 | 1.007 ± 0.016 | 0.319 ± 0.008 | 0.051 ± 0.002 |
| 0.298 ± 0.004 | 0.840 ± 0.038 | 0.125 ± 0.001 | 0.031 ± 0.001 |
| 0.477 ± 0.008 | 0.977 ± 0.019 | 0.102 ± 0.002 | 0.047 ± 0.001 |
| 0.640 ± 0.010 | 1.028 ± 0.037 | 0.113 ± 0.006 | 0.074 ± 0.004 |
| 0.760 ± 0.050 | 1.000 ± 0.032 | 0.136 ± 0.002 | 0.103 ± 0.007 |
| aR-HPE-xx | | | |
| 0.094 ± 0.004 | 1.019 ± 0.019 | 0.424 ± 0.018 | 0.041 ± 0.002 |
| 0.184 ± 0.007 | 0.997 ± 0.017 | 0.221 ± 0.018 | 0.040 ± 0.003 |
| 0.315 ± 0.003 | 1.022 ± 0.026 | 0.136 ± 0.011 | 0.044 ± 0.003 |
| 0.426 ± 0.008 | 1.009 ± 0.079 | 0.112 ± 0.002 | 0.052 ± 0.003 |
| 0.567 ± 0.002 | 0.932 ± 0.037 | 0.128 ± 0.001 | 0.067 ± 0.002 |
| aR-RES-xx | | | |
| 0.244 ± 0.005 | 0.616 ± 0.047 | | |
| 0.404 ± 0.001 | 0.926 ± 0.038 | 0.114 ± 0.009 | 0.042 ± 0.003 |
| 0.565 ± 0.004 | 0.955 ± 0.012 | 0.111 ± 0.001 | 0.059 ± 0.001 |
| 0.680 ± 0.003 | 0.901 ± 0.041 | 0.117 ± 0.002 | 0.071 ± 0.003 |
| aR-SDP-xx | | | |
| 0.190 ± 0.005 | 0.954 ± 0.035 | 0.487 ± 0.013 | 0.088 ± 0.004 |
| 0.307 ± 0.007 | 1.009 ± 0.015 | 0.262 ± 0.013 | 0.081 ± 0.004 |
| 0.422 ± 0.003 | 0.849 ± 0.043 | 0.191 ± 0.008 | 0.068 ± 0.004 |
| 0.541 ± 0.004 | 0.943 ± 0.003 | 0.143 ± 0.003 | 0.072 ± 0.001 |
| aR-BPA-xx | | | |
| 0.194 ± 0.005 | 1.098 ± 0.021 | | |
| 0.293 ± 0.005 | 0.883 ± 0.025 | 0.127 ± 0.001 | 0.032 ± 0.001 |
| 0.460 ± 0.002 | 1.053 ± 0.069 | 0.201 ± 0.006 | 0.097 ± 0.006 |
| 0.567 ± 0.005 | 1.169 ± 0.009 | 0.134 ± 0.004 | 0.088 ± 0.002 |
| aR-DHB-xx | | | |
| 0.243 ± 0.009 | 0.949 ± 0.065 | 0.396 ± 0.003 | 0.091 ± 0.006 |
| 0.309 ± 0.003 | 0.807 ± 0.092 | 0.349 ± 0.015 | 0.087 ± 0.009 |
| 0.432 ± 0.007 | 0.849 ± 0.028 | 0.243 ± 0.009 | 0.089 ± 0.004 |

Figure 20:
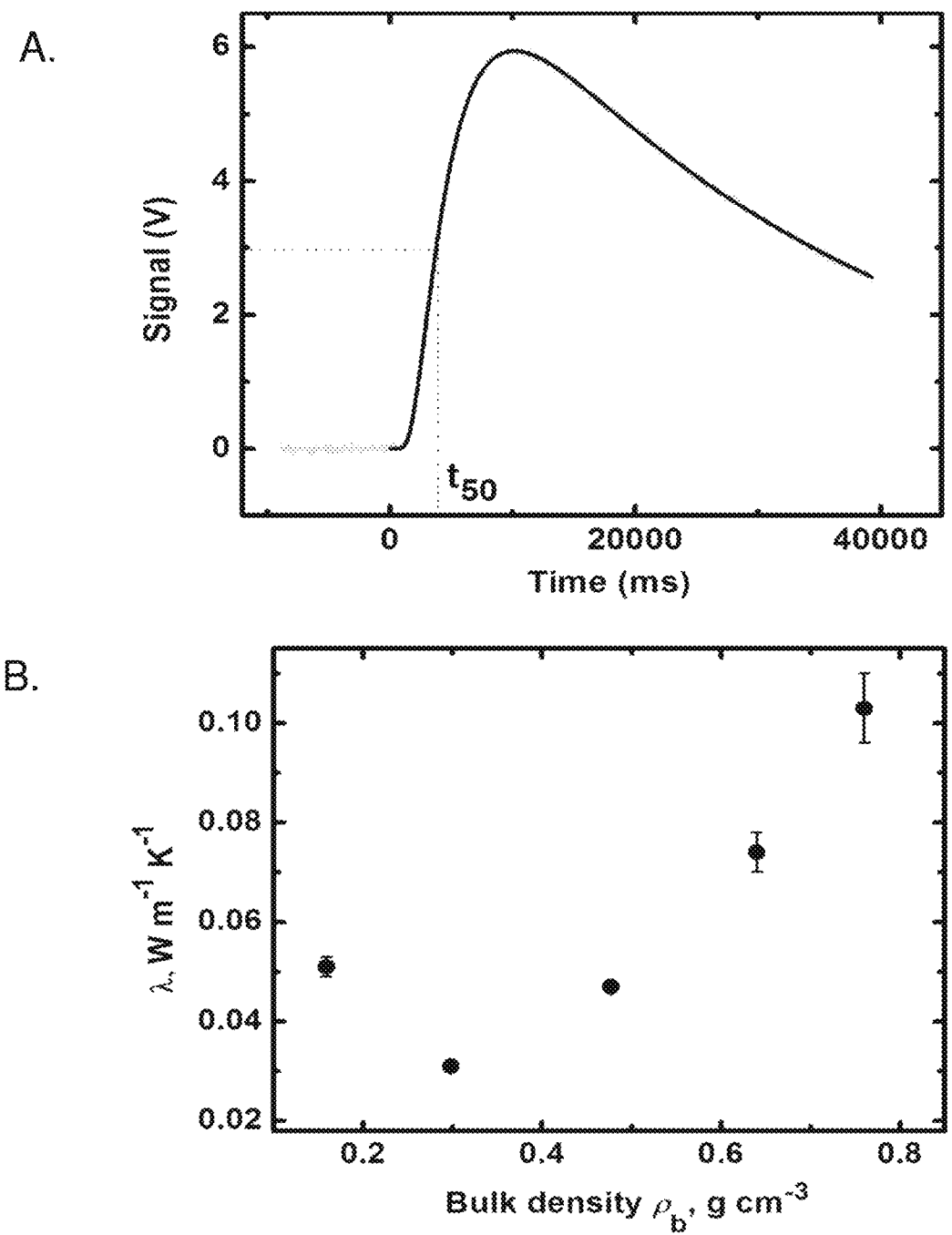
FIG. 20 illustrates A) temperature rise versus time of an example of a polyurethane network, and B) thermal conductivity versus bulk density in accordance with some embodiments.

As expected, thermal diffusivity decreases with increasing density until a particular point after which it rises. The trend decreases with increasing density for macroporous materials like aR-SDP-xx and aR-DHB-xx. Thermal conductivities calculated in air at room temperature as a function of density for aR-POL-xx aerogels/networks are shown in FIG. 20B. Unlike diffusivity, we can clearly observe a local minimum for each polyol used when plotted against the density. The minimum occurs because the solid conductivity increases with density, while gaseous and radiative conductivities decrease with increasing density. The minima appear to depend on the polyol structure and the time at which the constituent nanoparticles phase separate. This has direct impact on pore size as well as particle size. For constant diffusivity (Refer to Table 9 for aR-POL-20, aR-HPE-20 and aR-RES-20), thermal conductivity increases with increased functionality per aromatic ring. In both the categories of PU, i.e., PU based on multiple functional groups per aromatic ring, as well as the presence and degree of bridging in the monomers used, the lowest thermal conductivity is attained with the high-rigidity monomers. The thermal conductivity of both the rigid systems (aR-POL-xx and aR-BPA-xx) is determined to be 0.031 W m$^{-1}$ K$^{-1}$, which compares favorably with that of polyurea cross-linked silica aerogels (0.041 W m$^{-1}$ K$^{-1}$ at 0.451 g cm$^{-3}$), glass wool (0.040 W m$^{-1}$ K$^{-1}$), expanded polystyrene (0.030 W m$^{-1}$ K$^{-1}$), ROMP-derived polyimide aerogels (0.031 W m$^{-1}$ K$^{-1}$ at 0.338 g cm$^3$), polyurea aerogels (0.034 W m$^{-1}$ K$^{-1}$ at 0.236 g cm$^{-3}$), and PU-containing aerogels reported by Lee et al. (0.027 W m$^{-1}$ K$^{-1}$ at 0.451 g cm$^{-3}$).

Flexible PU aerogels and networks from aR-HPE-xx and aR-SDP-xx also show good thermal resistance. The thermal conductivity values of low density aR-HPE-xx aerogels are comparable to polyurea cross-linked silica aerogels and can be used in refrigerant, casing, building, and piping applications. Overall, it is clearly evident that the thermal conductivity of PU aerogels and networks depends on monomer rigidity, density, and interparticle connectivity. The combination of thermal insulation and strong mechanical properties make PU multifunctional materials suitable for various applications including structural superinsulation.

Precursor to Porous Carbons:

Earlier research on PU-containing aerogels was focused mainly on insulation and, to a limited extent, potential precursors to porous carbons. In order to carbonize a polymer, it should contain aromatic moieties or be aromatizable (usually by oxidation). In the case of aromatic polymers, there should be no more than one carbon between aromatic rings; otherwise, pyrolytic chain scission will prevail leading to loss of fragments. In examples presented herein, TIPM is an isocyanate which satisfies the above criteria.

Figure 21:
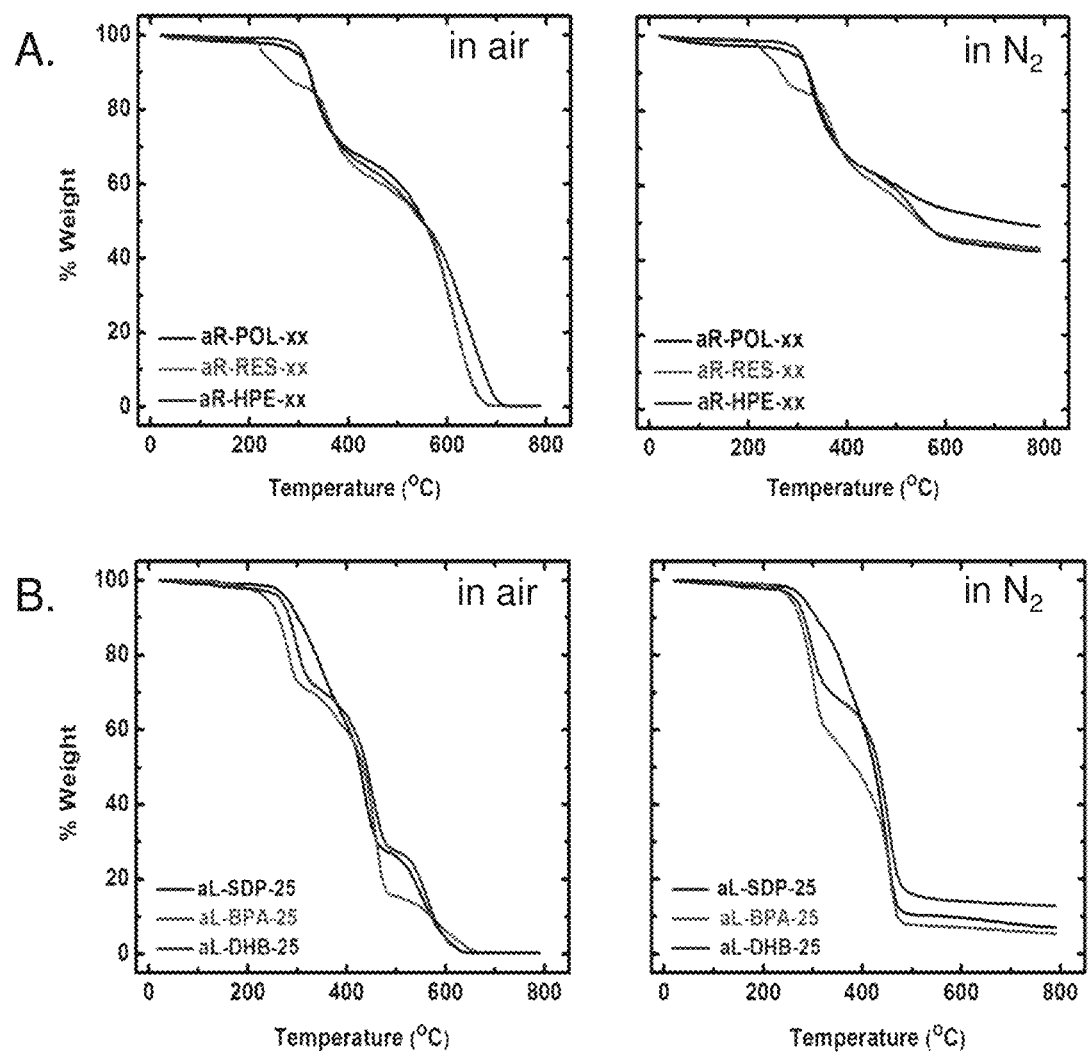
FIG. 21 shows thermogravimetric analysis data for examples of a polyurethane network in accordance with some embodiments.

Conversion of PU aerogels and networks into PU-derived carbon aerogels and networks was explored. With TGA under $N_2$ (see FIG. 21A), PU aerogels based on TIPM are observed to leave substantial amounts of residue (35-50%) at 800° C. It appears that the amount of residue depends on the structure of the polyol used. The highest residue (50%) was obtained with the most rigid multifunctional polyol, POL. On the other hand, PU aerogels based on N3300A decompose completely leaving only slight residues. Upon burning in air, PU aerogels completely decompose in a two-step process; nevertheless, these materials are stable up to 300° C. depending on crosslinking density. Urethane bonds were decomposed first that can be attributed to the first step in the TGA plot, followed by ester decomposition (FIG. 21B). In case of aL-DHB-25, a three-step mass loss was observed, the first being the same as above, i.e., urethane decomposition. The second and third were considered consecutive and related to the decomposition of ester groups. Previously reported PU-containing aerogels foam during pyrolysis, leading to non-monolithic carbon aerogels. Unlike other carbon aerogels derived from PU-containing materials such as aerogels, PU aerogels and networks based on aR-POL-xx described here result in sturdy monoliths after pyrolysis and exhibit similar morphologies to the precursor PU aerogel/network.

Materials.

Reagents and solvents were used as received unless noted otherwise. Tris(4-isocyanatophenyl)methane (TIPM) and 1,3,5-tris(6-isocyanatohexyl)-1,3,5-triazinane-2,4,6-trione (N3300A) were provided from Bayer Corp. USA. TIPM was supplied as a 27% w/w solution in anhydrous ethyl acetate (Desmodur RE). N3300A was supplied as a neat compound (Desmodur N3300A). Resorcinol (RES), 1,1,1-tris(4-hydroxy phenyl)ethane (HPE), phloroglucinol (POL), 4,4'-sulfonyldiphenol (SDP) and 4,4'-dihydroxy benzophenone (DHB) were provided from Aldrich Chemical Co. USA. 4,4'-isopropylidenediphenol (BPA), anhydrous acetone, dimethylformamide (DMF), dibutyltin dilaurate (DBTDL), tetrahydrofuran (THF), and HPLC-grade acetone were purchased from Acros Chemicals, USA. Deuterated chloroform ($CDCl_3$), dimethyl sulfoxide (DMSO-$d_6$) and acetone (acetone-$d_6$) were obtained from Cambridge Isotope Laboratories, Inc.

Synthesis of PU Aerogels and Networks from TIPM (aR-POLYOL-xx).

Formulations and gel times are summarized in Table 1. Samples are referred to by the abbreviation of the nature of isocyanate followed by polyol (see above) followed by a number, e.g., aR-POL-xx, where aR indicates aromatic isocyanate and xx denotes the solids % w/w used in making the sol. In a typical process, a solution of TIPM as received (Desmodur RE, 1.36 g, 1.00 mmol), and the respective polyol in 1.0:1.0 mol ratio to TIPM for trifunctional alcohols (POL and HPE), or in 1.5:1.0 mol ratio for difunctional alcohols (RES, SDP, BPA and DHB) in variable amounts of anhydrous acetone depending on the desirable percent weight of solids (i.e., TIPM plus alcohol) in the sol (see Table 1) was stirred for 10 min in a three-neck round-bottom flask at 23° C. under N2. At that point, DBTDL (5 µL) was added and the resulting sol was stirred for 5-20 min depending on the concentration (lower concentration sols were stirred longer).

Subsequently, the sol was poured into polypropylene molds (6.5 ml Polypropylene Scintillation Vials, General Purpose, Sigma-Aldrich Cat No. Z376825, 1.27 cm in inner diameter) which were sealed with their caps wrapped with Parafilm™ and kept at room temperature for 12-16 h. The gel time (included in Table 1) varies from 5 min to 3 h depending on the concentration of the monomers and the chemical identity of the polyol. (When the effects of functional groups per aromatic ring, higher concentration sols, and sols made with triols are compared, gelation takes place in the order HPE>POL>RES; in terms of the bridging rigidity, gelation takes place faster with SDP followed by BPA and DHB). Subsequently, gels were removed from the molds, washed with acetone (6x, using 4x the volume of the gel) and dried in an autoclave with $CO_2$ taken out as a supercritical fluid (SCF).

Synthesis of PU Aerogels from N3300A (aL-POLYOL-xx).

In order to investigate the effect of the isocyanate molecular rigidity on the properties of the aerogels, sols were formulated using Desmodur N3300A (an aliphatic triisocyanate, see above) in such a way so that the molar concentration (M) of the isocyanate in the sol could be correlated directly with the molar concentration of TIPM in a specific formulation. Gels at low solid concentrations (5% and 10% w/w) could not be obtained at room temperature either because of precipitation or no gelation. Thus, higher solids concentrations were evaluated and all formulations with N3300A we report on are based on 25% w/w solids (N3300A plus polyol), molar concentration-wise corresponding to the 20% w/w samples formulated with TIMP (see above). These parameters together with respective gel times are summarized in Table 2 In a typical reaction a solution of N3300A as received (Desmodur N3300A, 0.504 g, 1.00 mmol), and the respective polyol (e.g., 1.00 mmol of HPE, or POL; or, 1.50 mmol for RES, SDP, BPA and DHB) in anhydrous acetone (e.g., 2.39 mL for aL-POL-25; 3.07 mL for aL-HPE-25; 2.54 mL for aL-RES-25; 3.33 mL for aL-SDP-25; 3.21 mL for aL-BPA-25; and, 3.13 mL for aL-DHB-25) was stirred in a three-neck round-bottom flask at 23° C. under $N_2$ for 10 min and DBTDL (5 µL) was added. The resulting sol was stirred for 20 min, and was poured into polypropylene molds as in the case of the TIPM-based sols, which were sealed and kept at room temperature. The gel time varied from 1 h 20 min to 5 h 30 min depending on the chemical identity of the polyol. (It was observed that DHB-based samples precipitated and formed a hard mass at the bottom of the mold, but these samples were processed further and analyzed anyway.) In general, the gel times of N3300A-based PU gels are longer compared to those of TIPM-based PU gels. All gels were aged for 24 h in their molds at room temperature, and significant shrinkage (syneresis) was observed at that point. Subsequently, gels were removed from the molds, washed with acetone (6x, using 4x the volume of the gel) and dried with $CO_2$ taken out as a supercritical fluid (SCF).

TABLE 10

Formulations and gel times of TIPM-based PU aerogels

| Sample (aR-ALCOHOL-xx) | Alcohol | | | TIPM | | | | ethylacetate | | acetone | | gel time (min) |
|---|---|---|---|---|---|---|---|---|---|---|---|---|
| | G | Mmol | C (M) | mL | g | Mmol | C (M) | g | mL | g | mL | |
| aR-POL-5 | 0.126 | 1.00 | 0.0828 | 1.33 | 0.367 | 1.00 | 0.0828 | 0.993 | 1.10 | 8.37 | 10.58 | 180 |
| aR-POL-10 | 0.126 | 1.00 | 0.1711 | 1.33 | 0.367 | 1.00 | 0.1711 | 0.993 | 1.10 | 3.44 | 4.35 | 60 |
| aR-POL-15 | 0.126 | 1.00 | 0.2657 | 1.33 | 0.367 | 1.00 | 0.2657 | 0.993 | 1.10 | 1.8 | 2.27 | 40 |
| aR-POL-20 | 0.126 | 1.00 | 0.3659 | 1.33 | 0.367 | 1.00 | 0.3659 | 0.993 | 1.10 | 0.98 | 1.24 | 25 |
| aR-POL-25 | 0.126 | 1.00 | 0.4755 | 1.33 | 0.367 | 1.00 | 0.4755 | 0.993 | 1.10 | 0.49 | 0.61 | 20 |
| aR-HPE-5 | 0.306 | 1.00 | 0.0604 | 1.33 | 0.367 | 1.00 | 0.0604 | 0.993 | 1.10 | 11.8 | 14.9 | 90 |
| aR-HPE-7.5 | 0.306 | 1.00 | 0.0918 | 1.33 | 0.367 | 1.00 | 0.0918 | 0.993 | 1.10 | 7.31 | 9.24 | 70 |
| aR-HPE-10 | 0.306 | 1.00 | 0.1242 | 1.33 | 0.367 | 1.00 | 0.1242 | 0.993 | 1.10 | 5.06 | 6.4 | 50 |
| aR-HPE-15 | 0.306 | 1.00 | 0.1915 | 1.33 | 0.367 | 1.00 | 0.1915 | 0.993 | 1.10 | 2.82 | 3.57 | 25 |
| aR-HPE-20 | 0.306 | 1.00 | 0.2630 | 1.33 | 0.367 | 1.00 | 0.2630 | 0.993 | 1.10 | 1.7 | 2.15 | 15 |
| aR-HPE-25 | 0.306 | 1.00 | 0.3387 | 1.33 | 0.367 | 1.00 | 0.3387 | 0.993 | 1.10 | 1.03 | 1.3 | 4 |
| aR-RES-10 | 0.165 | 1.50 | 0.2366 | 1.33 | 0.367 | 1.00 | 0.1578 | 0.993 | 1.10 | 3.8 | 4.8 | 145 |
| aR-RES-15 | 0.165 | 1.50 | 0.3660 | 1.33 | 0.367 | 1.00 | 0.2440 | 0.993 | 1.10 | 2.02 | 2.56 | 25 |
| aR-RES-20 | 0.165 | 1.50 | 0.5036 | 1.33 | 0.367 | 1.00 | 0.3358 | 0.993 | 1.10 | 1.14 | 1.44 | 25 |
| aR-RES-25 | 0.165 | 1.50 | 0.6526 | 1.33 | 0.367 | 1.00 | 0.4351 | 0.993 | 1.10 | 0.6 | 0.76 | 15 |
| aR-SDP-10 | 0.375 | 1.50 | 0.1695 | 1.33 | 0.367 | 1.00 | 0.1130 | 0.993 | 1.10 | 5.69 | 7.18 | 25 |
| aR-SDP-15 | 0.375 | 1.50 | 0.2600 | 1.33 | 0.367 | 1.00 | 0.1733 | 0.993 | 1.10 | 3.21 | 4.1 | 15 |
| aR-SDP-20 | 0.375 | 1.50 | 0.3597 | 1.33 | 0.367 | 1.00 | 0.2398 | 0.993 | 1.10 | 1.98 | 2.5 | 10 |
| aR-SDP-25 | 0.375 | 1.50 | 0.4644 | 1.33 | 0.367 | 1.00 | 0.3096 | 0.993 | 1.10 | 1.23 | 1.56 | 7 |
| aR-BPA-10 | 0.342 | 1.50 | 0.1764 | 1.33 | 0.367 | 1.00 | 0.1176 | 0.993 | 1.10 | 5.39 | 6.81 | 90 |
| aR-BPA-15 | 0.342 | 1.50 | 0.2720 | 1.33 | 0.367 | 1.00 | 0.1813 | 0.993 | 1.10 | 3.03 | 3.82 | 55 |
| aR-BPA-20 | 0.342 | 1.50 | 0.3727 | 1.33 | 0.367 | 1.00 | 0.2485 | 0.993 | 1.10 | 1.84 | 2.33 | 30 |
| aR-BPA-25 | 0.342 | 1.50 | 0.4801 | 1.33 | 0.367 | 1.00 | 0.3200 | 0.993 | 1.10 | 1.13 | 1.43 | 15 |
| aR-DHB-15 | 0.321 | 1.50 | 0.2817 | 1.33 | 0.367 | 1.00 | 0.1878 | 0.993 | 1.10 | 2.91 | 3.67 | 60 |
| aR-DHB-20 | 0.321 | 1.50 | 0.3871 | 1.33 | 0.367 | 1.00 | 0.2581 | 0.993 | 1.10 | 1.76 | 2.22 | 40 |
| aR-DHB-25 | 0.321 | 1.50 | 0.4992 | 1.33 | 0.367 | 1.00 | 0.3328 | 0.993 | 1.10 | 1.07 | 1.35 | 15 |

TABLE 11

Formulations and gel times of N3300A-based PU aerogels

| Sample (aL-ALCOHOL-xx) | Alcohol | | | N3300A | | | acetone | | gel time |
|---|---|---|---|---|---|---|---|---|---|
| | g | mmol | C (M) | g | mmol | C (M) | g | mL | |
| aL-POL-25 | 0.126 | 1.00 | 0.3442 | 0.504 | 1.00 | 0.3442 | 1.89 | 2.39 | 3h |
| aL-HPE-25 | 0.306 | 1.00 | 0.2670 | 0.504 | 1.00 | 0.2670 | 2.43 | 3.07 | 1 h 20 min |
| aL-RES-25 | 0.165 | 1.50 | 0.4665 | 0.504 | 1.00 | 0.3110 | 2.01 | 2.54 | 5 h 30 min |
| aL-SDP-25 | 0.375 | 1.50 | 0.3729 | 0.504 | 1.00 | 0.2486 | 2.64 | 3.33 | 1 h 20 min |
| aL-BPA-25 | 0.342 | 1.50 | 0.3820 | 0.504 | 1.00 | 0.2546 | 2.54 | 3.21 | 5 h 15 min |
| aL-DHB-25 | 0.321 | 1.50 | 0.3940 | 0.504 | 1.00 | 0.2627 | 2.48 | 3.13 | 5 h 30 min |

Methods.

Sol-Gel Transition:

The rheological behavior of PU sols was recorded with a TA Instruments AR 2000ex Rheometer using an aluminum cone (60 mm diameter, 2° angle) and a Peltier plate geometry with a 1-mm gap between them at 20° C. The instrument was operated in the continuous oscillation mode and time-sweep experiments were performed with a fixed strain amplitude until gelation. The gel point was determined using a dynamic multiwave method with three superimposed harmonics with frequencies 1, 2, 4, and 8 rad s$^{-1}$. The strain of the fundamental oscillation (1 rad s$^{-1}$) was set at 5%.

SCF Drying:

Supercritical fluid (SCF) $CO_2$ drying was carried out in an autoclave (Spe-ed SFE system, Applied Separations, Allentown, Pa.).

Physical Characterization:

Bulk densities, $\rho_b$, were calculated from the sample weight and dimensions. Skeletal densities, $\rho_s$, were determined by helium pycnometry using a Micromeritics Accu-Pyc II 1340. Porosities, H, were determined from $\rho_b$ and $\rho_s$.

Chemical Characterization:

Chemical characterization of PU aerogels was conducted with infrared (IR) and solid-state $^{13}C$ NMR spectroscopy. IR spectra were obtained in KBr pellets with a Nicolet-FTIR Model 750 Spectrometer.

Liquid-phase $^1H$ and $^{13}C$ NMR of monomers were recorded with a 400 MHz Varian Unity Inova NMR instrument (100 MHz carbon frequency). Solid-state $^{13}C$ NMR spectra were obtained with samples ground into fine powders on a Brucker Avance 300 Spectrometer with a 75.475 MHz carbon frequency using magic angle spinning (at 7 kHz) with broadband proton suppression and the CPMAS TOSS pulse sequence for spin sideband suppression.

The degree of crystallinity of all PU aerogels was determined using powder X-ray diffraction (XRD) with a PANalytical X'Pert Pro Multi-Purpose Diffractometer (MPD) with a Cu Kα radiation source (λ=1.54 Å).

Structural Characterization:

$N_2$ sorption porosimetry was conducted with a Micromeritics ASAP 2020 surface area and porosity analyzer. Pore size analysis was also carried out with Hg intrusion using Micromeritics AutoPore IV 9500 instrument. In preparation for surface area and skeletal density determination, samples were outgassed for 24 h at 80° C. (for TIPM based PU samples) and 40° C. (for N3300A based PU samples) under vacuum. Average pore diameters were determined by the $4 \times V_{Total}/\sigma$ method, where $V_{Total}$ is the total pore volume per gram of sample and $\sigma$, the surface area determined by the Brunauer-Emmett-Teller (BET) method from the $N_2$ adsorption isotherm. The value of $V_{Total}$ can be calculated either from the single highest volume of $N_2$ adsorbed along the adsorption isotherm or from the relationship $V_{Total}=(1/\rho_b)-(1/\rho_s)$. Average pore diameter values calculated by both methods cited herewith; if those values converge, it is considered as indication that the material is mesoporous. If the average pore diameter calculated using $V_{Total}=(1/\rho_b)-(1/\rho_s)$ is significantly higher, that is taken as evidence for macroporosity.

The morphology of PU aerogels were determined by scanning electron microscopy (SEM) using Au-coated samples on a Hitachi S-4700 field emission microscope.

The structure of the fundamental building blocks of the materials was probed with small-angle X-ray scattering (SAXS) using 2-3 mm-thick disks, 0.7-1.0 mm in diameter. SAXS was carried out with a PANalytical X'Pert Pro multipurpose diffractometer (MPD), configured for SAXS using Cu Kα radiation ($\lambda$=1.54 Å) and a ⅟₃₂° SAXS slit and a ⅟₁₆° anti-scatter slit on the incident beam side, and 0.1 mm anti-scatter slit and Ni 0.125 mm automatic beam attenuator on the diffracted beam side. Samples were placed in circular holders between thin Mylar™ sheets and scattering intensities were measured with a point detector in transmission geometry by 2 Theta scans ranging from −0.1 up to 5°. All scattering data are reported in arbitrary units as a function of Q ($=4\pi \sin \theta/\lambda$), the momentum transferred during a scattering event. Data analysis was conducted with the Irena SAS tool for modeling and analysis of small angle scattering, within the commercial Igor Pro application (scientific graphing, image processing, and data analysis software from WaveMetrics, Portland, Oreg.).

Mechanical Characterization:

Quasi-static compression testing was performed according to the ASTM D1621-04a (Standard Test Method for Compressive Properties of Rigid Cellular Plastics) on cylindrical specimens using an Instron 4469 universal testing machine frame, following the testing procedures and specimen length (2.0 cm) to diameter (1.0 cm) ratio specified in the ASTM standard.

Compressive experiments at high strain rates (969-1,491 $s^{-1}$) were conducted on a long split-Hopkinson pressure bar (SHPB) under ambient condition at room temperature. The SHPB consists of a steel striker bar, incident and transmission bars, and a strain data acquisition system. The disc-shaped PU samples were sandwiched between the incident and transmission bars. The incident and transmission bars made of 304L stainless steel had lengths 7.514 and 4,049 mm, respectively with an outer diameter equal to 19 mm. A hollow transmission bar was used to reach high signal-to-noise ratio for the transmitted signal. The inner diameter of the transmission bar was 14.1 mm. At the end of the transmission bar, an end-cap made of hard tool steel was press fitted into hollow tubing to support the specimen. Appropriate pulse shaping can remove the end cap effect on 1D stress wave propagation. A new pulse shaper, consisting either a metal tubing placed inside another one, or two pieces of copper tubing, was used to help reach dynamic stress equilibrium state and constant strain rate, reducing the dispersion of the incident wave due to the bar geometry necessary for a valid SHPB experiment. Prior work determined that the wave dispersion under 1D wave propagation is negligible when appropriate pulse shaping is used. The working principle of SHPB has been well documented in literature. Under a valid SHPB experiment, formulas of stress, strain rate and strain in a specimen have been also reported.

Thermal Characterization:

Thermal diffusivity, R, was determined with a Netzsch NanoFlash Model LFA 447 flash diffusivity instrument using disk samples ~1 cm in diameter, 1.8-2.5 mm thick.

Heat capacities, $c_P$, at 23° C. of powders (4-8 mg), needed for the determination of their thermal conductivity, $\lambda$, were measured using a TA Instruments Differential Scanning calorimeter Model Q2000 calibrated against a sapphire standard and run from 0° C. to 40° C. at 0.5° C. $\min^{-1}$ in the modulated T4P mode. Raw $c_P$ data were multiplied by a factor of 1.10 based on measuring the heat capacities of rutile, graphite and corundum just before running our samples and compared with literature values. Semi-aromatic based PU samples were subjected to two heating scans and one cooling scan from 0° C. to 170° C. $T_g$ values were determined from the second heating scan.

Thermogravimetric analysis (TGA) was conducted with a TA Instrument, model Q50, under air or $N_2$ at a heating rate of 10° C. $\min^{-1}$.

More strong and flexible PU aerogels were synthesized. Anhydrous acetone and dibutyltin dilaurate (DBTDL) were obtained from Acros. Phloroglucinol and 4,4'-sulfonyldiphenol were obtained from Sigma-Aldrich. Desmodur RE was courtesy of Bayer Corporation USA.

Synthesis of Strong Polyurethane Aerogels and Networks.

A solution of TIPM as received (Desmodur RE, 17.3 mL (17.68 g), containing 4.77 g of TIPM in anhydrous ethylacetate, 0.013 mol) and phloroglucinol (1.64 g, 0.013 mol) in variable amounts of anhydrous acetone (e.g., 16.12 mL (12.75 g) for 20% w/w solids) was stirred at 23° C. under $N_2$ for 20 min. Then 65 μL of DBTDL was added. The sol was poured into polypropylene molds (Sigma polypropylene scintillation vials, general purpose, Cat No. Z376825, 1.6 cm diameter), which were sealed and kept at room temperature for 12-16 h (O/N). (The 20% w/w sol gels in 30-40 min from mixing.) Gels were washed with acetone (4× with each solvent, using 4× the volume of the gel) and dried with $CO_2$ taken out as a supercritical fluid (SCF). In another formulation, A solution of TIPM as received (Desmodur RE, 0.367 g, 0.001 mol), and phloroglucinol (0.126 g, 0.001 mol) in variable amounts of anhydrous acetone (e.g., 1.24 mL or 0.61 ml for 20% and 25% w/w solids, respectively) was stirred in a three-neck flask at 23° C. under $N_2$ for 5 min. Then 5 μL DBTDL was added. The sol was poured into polypropylene molds, which were sealed and kept at room temperature for 12-16 h (overnight). (Both sols gelled in 20 min from mixing.) Gels were washed with acetone (6×, using 4× the volume of the gel ech time) and dried with $CO_2$ taken out as a supercritical fluid (SCF). In yet another formulation, a solution of TIPM as received (Desmodur RE, 0.367 g, 0.001 mol), and 1,1,1-tris-(4-hydroxyphenyl ethane) (0.306 g, 0.001 mol) in variable amounts of anhydrous acetone (e.g., 2.15 mL or 1.3 mL for 20% and 25% w/w solids, respectively) was stirred in a three-neck flask at 23° C. under $N_2$ for 5 min. Then 5 μL DBTDL was added. The sol was poured into polypropylene molds, which were sealed and kept at room temperature for 12-16 h (overnight). (Both sols gels less than 25 min from mixing). Gels were washed with acetone (6×, using 4× the volume of the gel each time) and dried with $CO_2$ taken out as a supercritical fluid (SCF).

Synthesis of Flexible Polyurethane Aerogels.

A solution of TIPM as received (Desmodur RE, 5.33 mL (5.44 g), containing 1.47 g of TIPM in anhydrous ethylacetate, 0.004 mol) and 4,4'-sulfonyldiphenol (1.5 g, 0.006 mol) in variable amounts of anhydrous acetone (e.g., 28.72 mL (22.71 g) for 10% w/w solids) was stirred at 23° C. under $N_2$ for 5 min. Then 20 µL DBTDL was added. The sol was poured into polypropylene molds (Sigma polypropylene scintillation vials, general purpose, Cat No. Z376825, 1.6 cm diameter), which were sealed and kept at room temperature for 12-16 h (O/N). (The 10% w/w sol gels in 20 min from mixing.) Gels were washed with acetone (4× with each solvent, using 4× the volume of the gel) and dried with $CO_2$ taken out as a supercritical fluid (SCF). In another formulation, a solution of TIPM as received (Desmodur RE, 5.44 g, 0.004 mol), and sulfonyldiphenol (1.5 g, 0.006 mol) in variable amounts of anhydrous acetone (e.g., 28.72 mL for 10% w/w solids) was stirred in three-neck flask at 23° C. under $N_2$ for 5 min. Then, 20 µL DBTDL was added. The sol was poured into polypropylene molds, which were sealed and kept at room temperature for 12-16 h (overnight). (The 10% w/w sol gels in 20 min from mixing.) Gels were washed with acetone (6×, using 4× the volume of the gel each time) and dried with $CO_2$ taken out as a supercritical fluid (SCF). In yet another formulation, a solution of TIPM as received (Desmodur RE, 0.367 g, 0.001 mol), and 1,1,1-tris-(4-hydroxyphenyl ethane) (0.306 g, 0.001 mol) in variable amounts of anhydrous acetone (e.g., 14.91 mL or 6.4 mL for 5% and 10% w/w solids, respectively) was stirred in a three-neck flask at 23° C. under $N_2$ for 5 min. Then 5 µL DBTDL was added. The sol was poured into polypropylene molds, which were sealed and kept at room temperature for 12-16 h (overnight). (The 10% w/w sol gels in 70 min from mixing.) Gels were washed with acetone (6×, using 4× the volume of the gel each time) and dried with $CO_2$ taken out as a supercritical fluid (SCF).

TABLE 12

Materials characterization data for polyurethane aerogels from TIPM and Phloroglucinol

| sample-% w/w solids | linear shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ(m$^2$ g$^{-1}$) [d] | average pore diam. (nm) [e] | particle diam. (nm) [f] |
|---|---|---|---|---|---|---|---|
| PU-5  | 34.8 ± 0.9 | 0.159 ± 0.006 | 1.361 ± 0.007 | 88 | 241 [19] | 18.9 [92.2] | 18.30 |
| PU-10 | 31.4 ± 0.2 | 0.298 ± 0.004 | 1.355 ± 0.008 | 78 | 239 [21] | 22.4 [43.9] | 18.45 |
| PU-15 | 31.9 ± 0.3 | 0.477 ± 0.008 | 1.345 ± 0.010 | 65 | 234 [19] | 18.0 [23.2] | 19.00 |
| PU-20 | 30.8 ± 0.3 | 0.640 ± 0.010 | 1.336 ± 0.007 | 52 | 250 [24] | 10.6 [13.1] | 17.91 |
| PU-25 | 28.8 ± 0.4 | 0.760 ± 0.050 | 1.340 ± 0.006 | 43 | 241 [25] | 7.6 [9.5]   | 18.57 |

PU: Polyurethane aerogles

[a] Average of 5 samples.

[b] Shrinkage = 100 × (mold diameter-sample diameter)/(mold diameter).

[c] Single sample, average of 50 measurements.

[d] First number indicates the BET surface area, the number in the square bracket indicates the micropore area given by t-plot.

[e] By the 4 × $V_{Total}/\sigma$ method. For the first number, $V_{Total}$ was calculated by the single-point adsorption method; for the number in brackets, $V_{Total}$ was calculated via $V_{Total} = (1/\rho_b)-(1/\rho_s)$.

[f] Diameter = 2r, where r = 3/$\rho_s\sigma$ (r = particle radius).

TABLE 13

Materials characterization data for polyurethane aerogels from TIPM and Tris Hydroxy Phenyl ethane

| sample-% w/w solids | linear shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ(m$^2$ g$^{-1}$) [d] | average pore diam. (nm) [e] | particle diam. (nm) [f] |
|---|---|---|---|---|---|---|---|
| PU-5  | 22.4 ± 1.6 | 0.094 ± 0.004 | 1.232 ± 0.015 | 92 | 132 [14] | 11.4 [297.7] | 36.95 |
| PU-10 | 20.6 ± 0.4 | 0.184 ± 0.007 | 1.251 ± 0.007 | 85 | 165 [19] | 13.1 [112.4] | 29.09 |
| PU-15 | 23.9 ± 0.3 | 0.315 ± 0.003 | 1.260 ± 0.009 | 75 | 174 [19] | 17.6 [54.7]  | 27.36 |
| PU-20 | 24.1 ± 0.2 | 0.426 ± 0.008 | 1.276 ± 0.002 | 66 | 206 [21] | 25.7 [30.4]  | 22.83 |
| PU-25 | 22.1 ± 0.2 | 0.567 ± 0.002 | 1.260 ± 0.003 | 55 | 256 [29] | 16.2 [15.2]  | 18.6  |

PU: Polyurethane aerogles

[a] Average of 5 samples.

[b] Shrinkage = 100 × (mold diameter-sample diameter)/(mold diameter).

[c] Single sample, average of 50 measurements.

[d] First number indicates the BET surface area, the number in the square bracket indicates the micropore area given by t-plot.

[e] By the 4 × $V_{Total}/\sigma$ method. For the first number, $V_{Total}$ was calculated by the single-point adsorption method; for the number in brackets, $V_{Total}$ was calculated via $V_{Total} = (1/\rho_b)-(1/\rho_s)$.

[f] Diameter = 2r, where r = 3/$\rho_s\sigma$ (r = particle radius).

TABLE 14

Materials characterization data for polyurethane aerogels from TIPM and Resorcinol

| sample-% w/w solids | linear shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ(m$^2$ g$^{-1}$) [d] | average pore diam. (nm) [e] | particle diam. (nm) [f] |
|---|---|---|---|---|---|---|---|
| PU-10 | 31.7 ± 0.4  | 0.244 ± 0.005 | 1.307 ± 0.010 | 81 | 33 [1.2]  | 22.9 [404]  | 139.11 |
| PU-15 | 30.7 ± 0.1  | 0.404 ± 0.001 | 1.297 ± 0.022 | 69 | 83 [3.6]  | 20.7 [82.1] | 56.92 |
| PU-20 | 30.8 ± 0.01 | 0.565 ± 0.004 | 1.319 ± 0.008 | 57 | 109 [5]   | [37.1]      | 41.73 |
| PU-25 | 28.6 ± 0.2  | 0.680 ± 0.003 | 1.316 ± 0.004 | 48 | 119 [5]   | [23.9]      | 38.31 |

PU: Polyurethane aerogles

[a.] Average of 5 samples.
[b.] Shrinkage = 100 × (mold diameter-sample diameter)/(mold diameter).
[c.] Single sample, average of 50 measurements.
[d.] First number indicates the BET surface area, the number in the square bracket indicates the micropore area given by t-plot.
[e.] By the 4 × $V_{Total}$/σ method. For the first number, $V_{Total}$ was calculated by the single-point adsorption method; for the number in brackets, $V_{Total}$ was calculated via $V_{Total}$ = (1/$\rho_b$)-(1/$\rho_s$).
[f.] Diameter = 2r, where r = 3/$\rho_s$σ (r = particle radius).

TABLE 15

Materials characterization data for polyurethane aerogels from TIPM and Sulfonyl diphenol

| sample-% w/w solids | linear shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ(m$^2$ g$^{-1}$) [d] | average pore diam. (nm) [e] | particle diam. (nm) [f] |
|---|---|---|---|---|---|---|---|
| PU-10 | 27.5 ± 0.7 | 0.190 ± 0.005 | 1.319 ± 0.005 | 86 | 2.8     | 11.3 | 1624.6 |
| PU-15 | 27.6 ± 0.5 | 0.307 ± 0.007 | 1.319 ± 0.004 | 77 | 4 [0.6] | 11.4 | 1137.2 |
| PU-20 | 25.7 ± 0.1 | 0.422 ± 0.003 | 1.325 ± 0.005 | 68 | 9 [1.4] | 13.1 | 503.14 |
| PU-25 | 24.9 ± 0.2 | 0.541 ± 0.004 | 1.345 ± 0.005 | 60 | 30 [3.2]| 21.3 | 148.69 |

PU: Polyurethane aerogles a. Average of 5 samples.
b. Shrinkage = 100 × (mold diameter-sample diameter)/(mold diameter).
c. Single sample, average of 50 measurements.
d. First number indicates the BET surface area, the number in the square bracket indicates the micropore area given by t-plot.
e. By the 4 × $V_{Total}$/σ method. For the first number, $V_{Total}$ was calculated by the single-point adsorption method; for the number in brackets, $V_{Total}$ was calculated via $V_{Total}$ = (1/$\rho_b$)-(1/$\rho_s$).
f. Diameter = 2r, where r = 3/$\rho_s$σ (r = particle radius).

TABLE 16

Materials characterization data for polyurethane aerogels from TIPM and Bisphenol A

| sample-% w/w solids | linear shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, σ(m$^2$ g$^{-1}$) [d] | average pore diam. (nm) [e] | particle diam. (nm) [f] |
|---|---|---|---|---|---|---|---|
| PU-10 | 24.7 ± 0.3 | 0.194 ± 0.005 | 1.228 ± 0.003 | 84 | 1 [0.0] |      | 4885.99 |
| PU-15 | 23.7 ± 0.2 | 0.293 ± 0.005 | 1.240 ± 0.006 | 76 | 1 [0.0] | 11.6 | 4838.7  |
| PU-20 | 29.7 ± 0.2 | 0.460 ± 0.002 | 1.399 ± 0.017 | 67 | 4 [0.2] | 12.1 | 1072.19 |
| PU-25 | 26.3 ± 0.3 | 0.567 ± 0.005 | 1.232 ± 0.005 | 54 | 49      | 22.1 | 99.39   |

PU: Polyurethane aerogles

[a.] Average of 5 samples.
[b.] Shrinkage = 100 × (mold diameter-sample diameter)/(mold diameter).
[c.] Single sample, average of 50 measurements.
[d.] First number indicates the BET surface area, the number in the square bracket indicates the micropore area given by t-plot.
[e.] By the 4 × $V_{Total}$/σ method. For the first number, $V_{Total}$ was calculated by the single-point adsorption method; for the number in brackets, $V_{Total}$ was calculated via $V_{Total}$ = (1/$\rho_b$)-(1/$\rho_s$).
[f.] Diameter = 2r, where r = 3/$\rho_s$σ (r = particle radius).

TABLE 17

Materials characterization data for polyurethane aerogels from TIPM and Dihydroxy benzophenone

| sample-% w/w solids | linear shrinkage (%) [a,b] | bulk density, $\rho_b$ (g cm$^{-3}$) [a] | skeletal density, $\rho_s$ (g cm$^{-3}$) [c] | porosity, Π (% void space) | BET surface area, $\sigma$(m$^2$ g$^{-1}$) [d] | average pore diam. (nm) [e] | particle diam. (nm) [f] |
|---|---|---|---|---|---|---|---|
| PU-15 | 17.2 ± 0.8 | 0.243 ± 0.009 | 1.297 ± 0.008 | 81 | 0.09 | | |
| PU-20 | 17.5 ± 0.2 | 0.309 ± 0.003 | 1.349 ± 0.009 | 77 | 0.5 | | |
| PU-25 | 18.5 ± 0.4 | 0.432 ± 0.007 | 1.481 ± 0.019 | 70 | 1 | | |

PU: Polyurethane aerogles
[a] Average of 5 samples.
[b] Shrinkage = 100 × (mold diameter-sample diameter)/(mold diameter).
[c] Single sample, average of 50 measurements.
[d] First number indicates the BET surface area, the number in the square bracket indicates the micropore area given by t-plot.
[e] By the 4 × $V_{Total}/\sigma$ method. For the first number, $V_{Total}$ was calculated by the single-point adsorption method; for the number in brackets, $V_{Total}$ was calculated via $V_{Total} = (1/\rho_b)-(1/\rho_s)$.
[f] Diameter = 2r, where r = 3/$\rho_s\sigma$ (r = particle radius).

TABLE 18

| Sample | thickness (mm) | Thermal Conductivity (W/mK) | | | Resistance (m^2K/W) | | |
|---|---|---|---|---|---|---|---|
| | | 21 C | 49 C | 98.5 C | 21 C | 49 C | 98.5 C |
| 1 | 1.32 | 0.047 | 0.048 | 0.048 | 2.81E−02 | 2.76E−02 | 2.74E−02 |
| 2 | 5.3 | 0.0737 | 0.0517 | 0.0388 | 7.19E−02 | 1.02E−01 | 1.37E−01 |
| 3 | 2.03 | 0.0416 | 0.0465 | 0.0455 | 4.88E−02 | 4.37E−02 | 4.46E−02 |
| 2.a | 4.24 | 0.0515 | 0.0465 | 0.0394 | 8.24E−02 | 9.11E−02 | 1.08E−01 |
| SS ref | 6.35 | 16.8 | 12.347 | 11.245 | | | |

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

Having thus described several aspects of at least one embodiment of this invention, it is to be appreciated various alterations, modifications, and improvements will readily occur to those skilled in the art. Such alterations, modification, and improvements are intended to be part of this disclosure, and are intended to be within the spirit and scope of the invention. Accordingly, the foregoing description and drawings are by way of example only.

What is claimed is:

1. A polyurethane aerogel comprising an isocyanurate and a urethane, wherein each of the isocyanurate and the urethane are bound to an R group, wherein the R group is an alkyl group or an aromatic group.

2. The polyurethane aerogel of claim 1, wherein the R group is a hexyl group.

3. The polyurethane aerogel of claim 1, wherein the R group is a phenyl group.

4. The polyurethane aerogel of claim 1, wherein the R group is a toluyl group.

5. The polyurethane aerogel of claim 1, wherein the polyurethane aerogel is flexible.

6. The polyurethane aerogel of claim 1, wherein the polyurethane aerogel is configured such that a 0.4-inch thick sample of the polyurethane aerogel can be deformed such that a surface of the sample forms a 0.9-inch radius of curvature.

* * * * *

UNITED STATES PATENT AND TRADEMARK OFFICE
CERTIFICATE OF CORRECTION

PATENT NO. : 10,822,466 B2
APPLICATION NO. : 16/220091
DATED : November 3, 2020
INVENTOR(S) : Nicholas Leventis et al.

Page 1 of 1

It is certified that error appears in the above-identified patent and that said Letters Patent is hereby corrected as shown below:

In the Specification

At Column 1, Line 14, replace the paragraph titled "FEDERALLY SPONSORED RESEARCH" with the following paragraph:

FEDERALLY SPONSORED RESEARCH
This invention was made with government support under Grant Number CHE-0809562 awarded by the National Science Foundation and Grant Number W911NF-10-1-0476 awarded by the U.S. Department of the Army. The government has certain rights in the invention.

Signed and Sealed this
Twenty-third Day of March, 2021

Drew Hirshfeld
*Performing the Functions and Duties of the*
*Under Secretary of Commerce for Intellectual Property and*
*Director of the United States Patent and Trademark Office*